US012801240B2

(12) United States Patent
Lee et al.

(10) Patent No.: US 12,801,240 B2
(45) Date of Patent: Nov. 17, 2026

(54) TOUCH DISPLAY DEVICE AND DRIVING METHOD USING DIFFERENTIAL SENSING

(71) Applicant: LG Display Co., Ltd., Seoul (KR)

(72) Inventors: DeukSu Lee, Paju-si (KR); Taeyun Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/180,859

(22) Filed: Apr. 16, 2025

(65) Prior Publication Data

US 2026/0161250 A1 Jun. 11, 2026

(30) Foreign Application Priority Data

Oct. 31, 2024 (KR) ........................ 10-2024-0152269

(51) Int. Cl.
*G06F 3/041* (2006.01)
*G06F 3/044* (2006.01)

(52) U.S. Cl.
CPC .......... *G06F 3/0418* (2013.01); *G06F 3/0412* (2013.01); *G06F 3/044* (2013.01)

(58) Field of Classification Search
CPC ...... G06F 3/0418; G06F 3/0412; G06F 3/044; G06F 3/04182; G06F 3/041; G06F 3/04184; G06F 3/04164; G06F 3/04166; G06F 3/016; G09G 3/006; G09G 3/3677; G09G 3/3233; G09G 3/2007; G02F 1/13338; H10K 59/124; H10H 29/37
See application file for complete search history.

(56) References Cited

U.S. PATENT DOCUMENTS

2011/0084923 A1* 4/2011 Chang ..................... G06F 3/041 345/173
2018/0307337 A1* 10/2018 Ahn ........................ G06F 3/044
2019/0265835 A1* 8/2019 Shin ...................... G09G 3/3233
2019/0385551 A1* 12/2019 Kim .................... G02F 1/13338
2020/0050310 A1* 2/2020 Lee ........................ G06F 3/0412
2020/0210022 A1* 7/2020 Kim ....................... G06F 3/0418
2021/0064170 A1* 3/2021 Hwang ................... G06F 3/016
2021/0200413 A1* 7/2021 Jang .................... G06F 3/04182
2021/0318771 A1* 10/2021 Lee ....................... G09G 3/3677
2022/0066594 A1* 3/2022 Shim ................... G06F 3/04166
2023/0229251 A1* 7/2023 Lee ....................... G09G 3/3677 345/174
2023/0384885 A1* 11/2023 Kim .................... G06F 3/04164
2024/0215374 A1* 6/2024 Lee ....................... H10K 59/124
2026/0029876 A1* 1/2026 Kim .................... G06F 3/04184
2026/0031026 A1* 1/2026 Kim ....................... G09G 3/006
2026/0038411 A1* 2/2026 Yu ......................... G09G 3/2007
2026/0047257 A1* 2/2026 Kim ....................... H10H 29/37

* cited by examiner

*Primary Examiner* — Richard J Hong
(74) *Attorney, Agent, or Firm* — Morgan, Lewis & Bockius LLP

(57) ABSTRACT

One or more examples provide a driving method of a display device including a first touch driving signal supply operation in which a first touch electrode receives a first touch driving signal, a second touch electrode and a third touch electrode do not receive the first touch driving signal, and a fourth touch electrode receives a second touch driving signal different from the first touch driving signal, and a first touch sensing operation in which a touch circuit generates sensing data based on a difference value between a first sensing value for the second touch electrode and a second sensing value for the third touch electrode, thereby accurately detecting a touch action by controlling noise.

20 Claims, 29 Drawing Sheets

TOUCH DISPLAY DEVICE AND DRIVING METHOD USING DIFFERENTIAL SENSING

CROSS REFERENCE TO RELATED APPLICATION

This application claims the benefit of and priority to Korean Patent Application No. 10-2024-0152269, filed on Oct. 31, 2024, the entire contents of which are incorporated herein by reference for all purposes as if fully set forth herein.

BACKGROUND

1. Technical Field

Embodiments of the present disclosure relate to a display device and a driving method of the same.

2. Description of the Related Art

As the information society develops, the demand for display devices for displaying images is increasing in various forms, and recently, various display devices such as a liquid crystal display device and an organic light-emitting display device are being utilized.

A display device may display images, and also may detect touch actions.

The touch action may not be detected accurately due to external noise during detecting a touch action.

The description of the related art should not be assumed to be prior art merely because it is mentioned in or associated with this section. The description of the related art includes information that describes one or more aspects of the subject technology, and the description in this section does not limit the invention.

SUMMARY

Embodiments of the present disclosure may provide a display device capable of accurately sensing touch actions through differential sensing.

Embodiments of the present disclosure may provide a display device capable of removing noise from sensing data for determining touch actions through differential sensing.

Embodiments of the present disclosure may provide a display device capable of enabling low power consumption by accurately sensing touch actions through differential sensing.

Embodiments of the present disclosure may provide a driving method of a display device including a first touch driving signal supply operation in which a first touch electrode receives a first touch driving signal, a second touch electrode and a third touch electrode do not receive the first touch driving signal, and a fourth touch electrode receives a second touch driving signal different from the first touch driving signal, and a first touch sensing operation in which a touch circuit generates sensing data based on a difference value between a first sensing value for the second touch electrode and a second sensing value for the third touch electrode.

Embodiments of the present disclosure may provide a display device including a first touch electrode configured to be supplied with a first touch driving signal, a second touch electrode positioned apart from the first touch electrode in a first direction, a third touch electrode positioned apart from the first touch electrode in a second direction, and a fourth touch electrode that is configured to be supplied with a second touch driving signal different from the first touch driving signal, is positioned apart from the second touch electrode in the second direction, and is positioned apart from the third touch electrode in the first direction, and a touch circuit configured to generate sensing data based on a difference value between a first sensing value for the second touch electrode and a second sensing value for the third touch electrode.

Embodiments of the present disclosure may provide a display device including a first touch electrode configured to receive a first touch driving signal in a first touch driving period and a second touch driving period different from the first touch driving period, a second touch electrode configured to not receive the first touch driving signal in the first touch driving period, and configured to receive the first touch driving signal in the second touch driving period, a third touch electrode configured to not receive the first touch driving signal in the first touch driving period, and configured to receive the first touch driving signal in the second touch driving period, and a fourth touch electrode configured to receive a second touch driving signal in the first touch driving period, and configured to receive the first touch driving signal in the second touch driving period.

According to embodiments of the present disclosure, it is possible to provide a display device capable of accurately sensing touch actions through differential sensing.

According to embodiments of the present disclosure, it is possible to provide a display device capable of removing noise from sensing data for determining touch actions through differential sensing.

According to embodiments of the present disclosure, it is possible to provide a display device capable of enabling low power consumption by accurately sensing touch actions through differential sensing.

Additional features, advantages, and aspects of the present disclosure are set forth in part in the description that follows and in part will become apparent from the present disclosure or may be learned by practice of the inventive concepts provided herein. Other features, advantages, and aspects of the present disclosure may be realized and attained by the descriptions provided in the present disclosure, or derivable therefrom, and the claims hereof as well as the drawings. It is intended that all such features, advantages, and aspects be included within this description, be within the scope of the present disclosure, and be protected by the following claims. Nothing in this section should be taken as a limitation on those claims. Further aspects and advantages are discussed below in conjunction with embodiments of the present disclosure.

It is to be understood that both the foregoing description and the following description of the present disclosure are examples, and are intended to provide further explanation of the disclosure as claimed.

BRIEF DESCRIPTION OF THE DRAWINGS

The accompanying drawings, which are included to provide a further understanding of the present disclosure, are incorporated in and constitute a part of this present disclosure, illustrate aspects and embodiments of the present disclosure, and together with the description serve to explain principles and examples of the disclosure.

Figure 1:
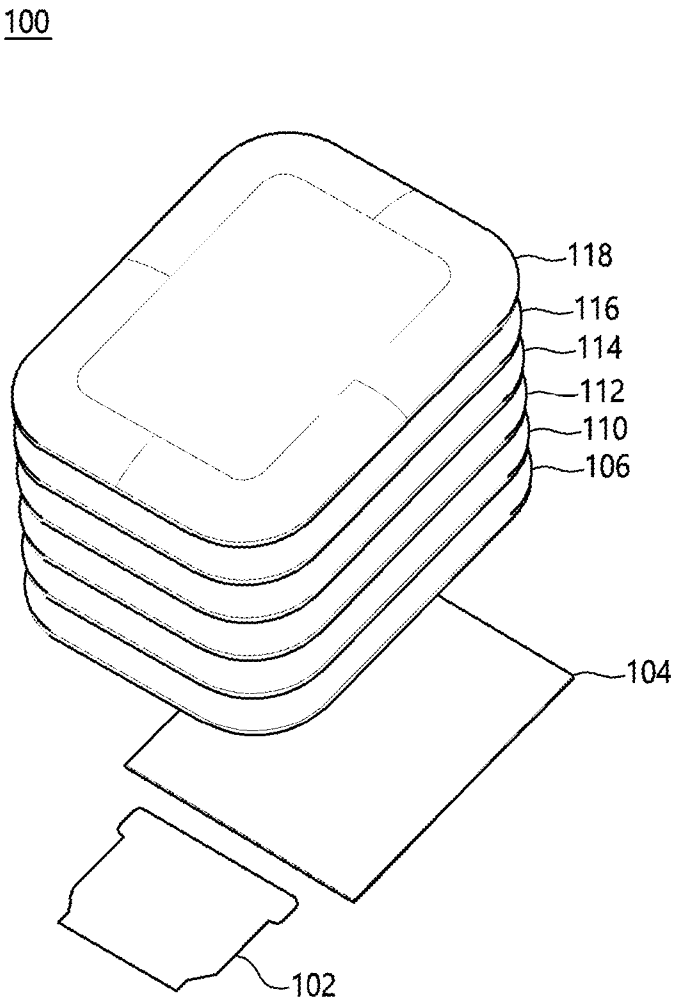
FIG. 1 illustrates a display device according to embodiments of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction thereof may be exaggerated for clarity, illustration, and/or convenience.

DETAILED DESCRIPTION

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description may make the subject matter in some embodiments of the present invention rather unclear. The terms such as "including," "having," "containing," "constituting" "make up of," and "formed of" used herein are generally intended to allow other components to be added unless the terms are used with the term "only." As used herein, singular forms are intended to include plural forms unless the context clearly indicates otherwise. For example, an element may be one or more elements. An element may include a plurality of elements. The word "exemplary" is used to mean serving as an example or illustration. Embodiments are example embodiments. Aspects are example aspects. In one or more implementations, "embodiments," "examples," "aspects," and the like should not be construed to be preferred or advantageous over other implementations. An embodiment, an example, an example embodiment, an aspect, or the like may refer to one or more embodiments, one or more examples, one or more example embodiments, one or more aspects, or the like, unless stated otherwise.

Terms, such as "first," "second," "A," "B," "(A)," or "(B)" may be used herein to describe elements of the present invention. Each of these terms is not used to define essence, order, sequence, or number of elements etc., but is used merely to distinguish the corresponding element from other elements.

When it is mentioned that a first element "is connected or coupled to," "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc. each other via a fourth element. Here, the second element may be included in at least one of two or more elements that "are connected or coupled to," "contact or overlap," etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can."

Hereinafter, various embodiments of the disclosure are described in detail with reference to the accompanying drawings.

The advantages and features of the present disclosure and the method for achieving them will become clear with reference to the embodiments described in detail below together with the accompanying drawings. However, the present disclosure is not limited to the embodiments disclosed below, but may be implemented in various different forms, and these embodiments are provided only to make the disclosure of the present disclosure complete and to fully inform a person having ordinary skill in the art to which the present disclosure belongs of the scope of the invention.

The shapes, sizes, ratios, angles, numbers, etc. disclosed in the drawings for explaining the embodiments of this disclosure are examples, and therefore this disclosure is not limited to the matters illustrated. In assigning reference numerals to components of each drawing, the same components may be assigned the same numerals even when they are shown on different drawings. When determined to make the subject matter of the disclosure unclear, the detailed of the known art or functions may be skipped. As used herein, when a component "includes," "has," or "is composed of" another component, other components may be added unless "only" is used. When a component is expressed in the singular, it includes cases where the plural is included unless otherwise explicitly stated.

In interpreting a component, even if there is no separate explicit description of the error range, it is interpreted as including the error range.

In the case of a description of a positional relationship, for example, if the positional relationship between two parts is described as "on," "over," "below," "next to," or "adjacent," one or more other parts may be located between the two parts unless "directly," "nearly" or the like is used.

In describing a temporal relationship, if the temporal continuity is described as "after," "following," "next to," or "before," it may also include cases where it is not continuous, unless "right away," "directly," or the like is used.

Although the terms first, second, etc. are used to describe various elements, these components are not limited by these terms. These terms are only used to distinguish one component from another. Therefore, the first element mentioned below may also be the second element within the technical scope of this disclosure.

In describing the components of this disclosure, terms such as first, second, A, B, (a), or (b) may be used. These terms are only intended to distinguish the components from other components, and the nature, order, sequence, or number of the components are not limited by the terms.

If a component is described as being "connected," "coupled," "linked," or "attached," to another component, it should be understood that the component may be directly connected, coupled, linked, or attached to the other component, but that other components may be interposed between each component that may be indirectly connected, coupled, linked, or attached without any specific explicit description.

When a component or layer is described as being "contacted," or "overlapping," to another component or layer, it should be understood that the component or layer may directly contact or overlap the other component or layer, but that other components may be interposed between each component that may be indirectly contacted or overlapped without any specific explicit description.

"At least one" should be understood to include any combination of one or more of the associated components. For example, "at least one of the first, second, and third components" can be interpreted to include not only the first, second, or third components, but also any combination of two or more of the first, second, and third components.

"First direction," "Second direction," "Third direction," "X-axis direction," "Y-axis direction," and "Z-axis direction" should not be interpreted as merely geometric relationships in which the relationship between them is perpendicular to each other, but can mean a wider directionality within the range in which the configuration of the present disclosure can function functionally.

Each feature of the various embodiments of the present disclosure can be partially or wholly combined or combined with each other, and various technical connections and operations are possible, and each embodiment can be implemented independently of each other or can be implemented together in a related relationship.

Hereinafter, various embodiments of the disclosure are described in detail with reference to the accompanying drawings.

Figure 2:
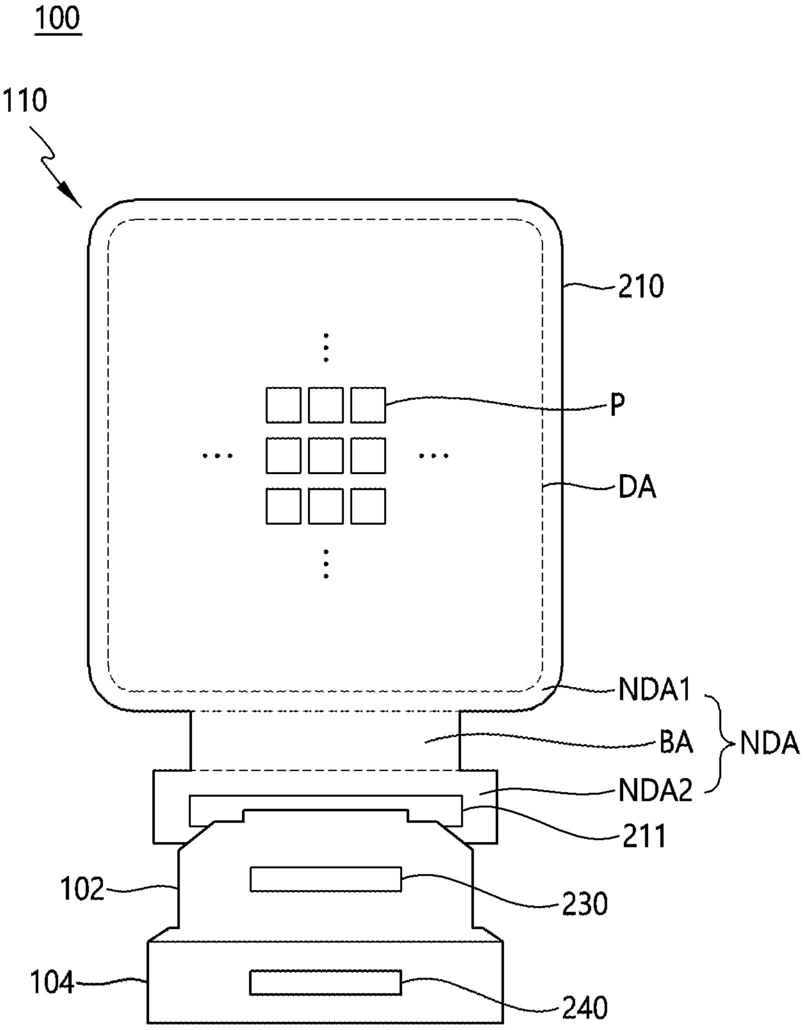
FIG. 2 is a plan view of a display device according to embodiments of the present disclosure.

FIG. 1 illustrates a display device 100 according to embodiments of the present disclosure, and FIG. 2 is a plan view of a display device 100 according to embodiments of the present disclosure.

Referring to FIG. 1, a display device 100 according to the embodiments of the present disclosure may include a display panel 110, a cover member 118 disposed on the display panel 110, a flexible printed circuit 102 connected to the display panel 110, and a printed circuit board 104 connected to the flexible printed circuit 102.

The display device 100 according to the embodiments of the present disclosure may further include a support substrate 106 disposed under the display panel 110 and supporting the lower portion of the display panel 110, a polarizing layer 114 disposed on the display panel 110, a first adhesive layer 112 disposed between the display panel 110 and the polarizing layer 114, and a second adhesive layer 116 disposed between the polarizing layer 114 and the cover member 118.

The display panel 110 may include a substrate 210. The substrate 210 may be a member on which various components such as a plurality of metal layers and a plurality of insulating material layers are formed. The substrate 210 may be made of an insulating material. For example, the substrate 210 may be made of glass or resin. In addition, the substrate 210 may be made of a flexible material. For example, the substrate 210 may be made of a flexible plastic material such as polyimide (PI). However, the embodiments of the present disclosure are not limited thereto.

The display panel 110 may display information, images, and/or images provided to a user. For example, the display panel 110 may include a display area DA and a non-display area NDA. For example, the substrate 210 may include a display area DA and a non-display area NDA. The display area DA and the non-display area NDA are not limited to the substrate 210, but can be described throughout the entire display device 100.

The display area DA may be an area where an image is displayed. The display area DA may include a plurality of pixels P. Each of the plurality of pixels P may be composed of a plurality of sub-pixels. At least one light emitting device may be arranged in each of the plurality of sub-pixels. The light emitting device may be configured differently depending on the type of the display device 100. For example, if the display device 100 is an inorganic light emitting display device, the light emitting device may be an inorganic-based light emitting device, such as a light emitting diode (LED), a micro LED, or a mini LED, but the embodiments of the present disclosure are not limited thereto.

The non-display area NDA may be an area where an image is not displayed. In the non-display area NDA, various wirings, and circuits for driving a plurality of pixels P of the display area DA may be arranged. For example, various driving circuits and various wirings may be arranged in the non-display area NDA, and a pad section 211 to which an integrated circuit and a printed circuit are connected may be arranged, but the embodiments of the present disclosure are not limited thereto.

According to the present embodiments, the non-display area NDA may include a first non-display area NDA1, a bending area BA, and a second non-display area NDA2.

The display area DA of the substrate 210 or the display device 100 may be configured in various shapes according to the design of the display device 100.

According to the embodiments of the present disclosure, a width of the second non-display area NDA2 where the pad section 211 is arranged may be wider than a width of the bending area BA. In addition, a width of the display area DA may be wider than the width of the bending area BA. In the drawing, the width of the bending area BA is depicted as being narrower than the width of other areas of the substrate 210, but the shape of the substrate 210 including the bending area BA is an example, and the embodiments of the present disclosure are not limited thereto.

Referring to FIG. 1 and FIG. 2, a flexible printed circuit 102 and a printed circuit board 104 may be disposed at a lower portion of the display panel 110. The flexible printed circuit 102 and the printed circuit board 104 may be arranged at one edge of the display panel 100, but the embodiments of the present disclosure are not limited thereto. One side of the flexible printed circuit 102 may be connected to the display panel 110, and the other side may be connected to the printed circuit board 104, but the embodiments of the present disclosure are not limited thereto. The flexible printed circuit 102 may be a flexible film, but the embodiments of the present disclosure are not limited thereto.

The pad section 211 disposed in the second non-display area NDA2 includes a plurality of pads, and a driving component including one or more flexible printed circuits 102 and a printed circuit board 104 can be attached or bonded. The plurality of pads included in the pad section 211 are electrically connected to one or more flexible printed circuits 102, and may transmit various signals (or power) from the printed circuit board 104 and one or more flexible printed circuits 102 to a driving circuit (for example, a driver DRV of FIG. 3) arranged in the display area DA.

The flexible printed circuit 102 may be a film in which various components are arranged on a flexible base film. For example, a first circuit component 230, such as a gate drive integrated circuit and/or a data drive integrated circuit, may be arranged on one or more flexible printed circuits 102, but the embodiments of the present disclosure are not limited thereto. The first circuit component 230 may be a component that processes data and a driving signal for displaying an image.

The printed circuit board 104 may be a component that is electrically connected to the flexible printed circuit 102 and supplies a signal to the first circuit component 230. The printed circuit board 104 may be arranged on one side of the flexible printed circuit 102 and may be electrically connected to the flexible printed circuit 102. Various components for supplying various signals to the first circuit component 230 may be arranged on the printed circuit board 104.

The printed circuit board 104 may include at least one hole, but the embodiments of the present disclosure are not limited thereto. An internal component detecting ambient light or temperature, such as a plurality of sensors, may be arranged in an area corresponding to at least one hole.

Referring to FIG. 1, a polarizing layer 114 may be arranged on a display panel 110 and may prevent or reduce light generated from an external light source from entering the display panel 110 and affecting a light emitting device.

A cover member 118 may be arranged on a polarizing layer 114 and may be a member for protecting the display panel 110.

A second adhesive layer 116 may be disposed between the polarizing layer 114 and the cover member 118. The second adhesive layer 116 may attach the cover member 118 to the display panel 110 or the polarizing layer 114.

A first adhesive layer 112 may be disposed between the display panel 110 and the polarizing layer 114. The first adhesive layer 112 may attach the polarizing layer 114 to the display panel 110. The first adhesive layer 112 may be omitted.

Each of the first adhesive layer 112 and the second adhesive layer 116 may include an optically clear adhesive (OCA), an optically clear resin (OCR), or a pressure sensitive adhesive (PSA), but the embodiments of the present disclosure are not limited thereto.

The support substrate 106 is disposed between the display panel 110 and the printed circuit board 104 to reinforce the rigidity of the display panel 110. The support substrate 106 may be a back plate, but the embodiments of the present disclosure are not limited thereto.

Figure 3:
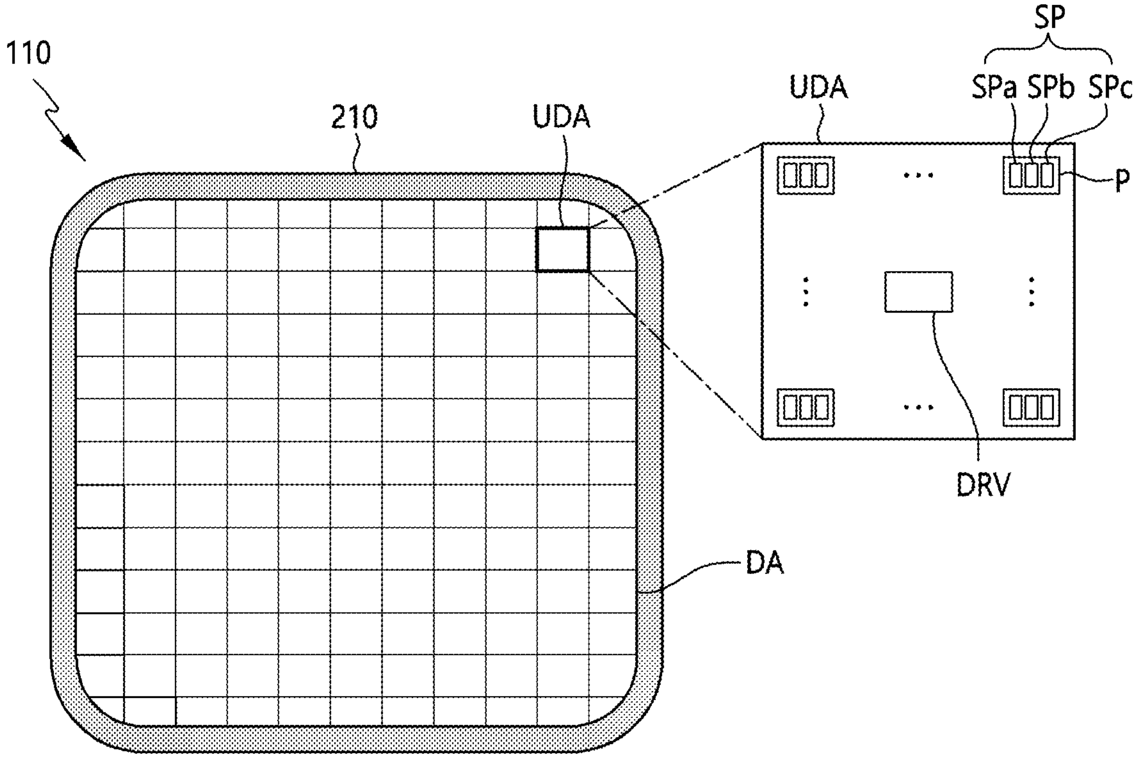
FIG. 3 is a plan view of a display panel according to embodiments of the present disclosure.
Figure 4:
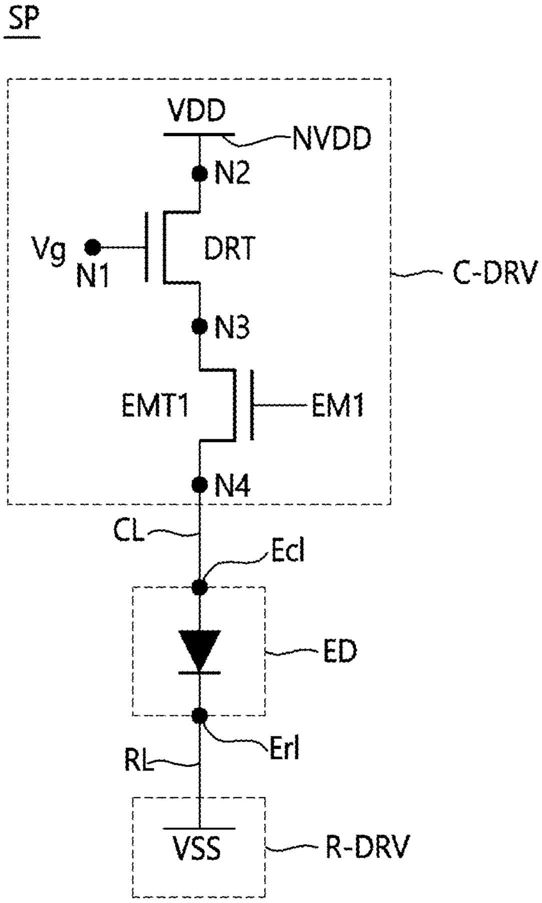
FIG. 4 illustrates a sub-pixel of a display panel according to embodiments of the present disclosure.

FIG. 3 is a plan view of a display panel 110 according to embodiments of the present disclosure, and FIG. 4 is a plan view of a unit driving area UDA of a display panel 110 according to embodiments of the present disclosure.

Referring to FIG. 3, the display area DA of the display panel 110 according to the embodiments of the present disclosure may include a plurality of unit driving areas UDA.

Referring to FIG. 3, the display panel 110 according to the embodiments of the present disclosure may include a driver DRV arranged in each of the plurality of unit driving areas UDA.

Referring to FIG. 3, each of the plurality of unit driving areas UDA may be a driving area driven by one driver DRV. That is, the plurality of unit driving areas UDA may be independent driving areas driven by different drivers DRV.

Referring to FIG. 3, the display panel 110 according to the embodiments of the present disclosure may include a substrate 210 including a display area DA, and a plurality of pixels P arranged in a matrix form in the display area DA.

A plurality of pixels P may be arranged in each of the plurality of unit driving areas UDA. Each of the plurality of pixels P may include a plurality of sub-pixels SP. Each of the plurality of sub-pixels SP may include at least one light emitting device.

FIG. 4 illustrates a sub-pixel SP of a display panel 110 according to embodiments of the present disclosure.

Referring to FIG. 4, the sub-pixel SP according to embodiments of the present disclosure may include a light emitting device ED including a first electrode Ecl and a second electrode Erl, a column driver C-DRV for driving a column line CL electrically connected to the first electrode Ecl of the light emitting device ED, and a row driver R-DRV for driving a row line RL electrically connected to the second electrode Erl of the light emitting device ED.

Referring to FIG. 4, the light emitting device ED may include a first electrode Ecl and a second electrode Erl. The first electrode Ecl may be electrically connected to a column line CL, and the second electrode Erl may be electrically connected to a row line RL. For example, the first electrode Ecl may be an anode electrode, and the second electrode Erl may be a cathode electrode. For another example, the first electrode Ecl may be a cathode electrode, and the second electrode Erl may be an anode electrode.

Referring to FIG. 4, a column driver C-DRV included in a unit driving area UDA may be connected to a plurality of column lines CL included in the unit driving area UDA, and may drive a plurality of column lines CL included in the unit driving area UDA. Each of the plurality of column lines CL may be commonly connected to the first electrode Ecl of each of the plurality of light emitting devices ED included in the plurality of sub-pixels SP arranged in the corresponding column.

Referring to FIG. 4, a row driver R-DRV included in a unit driving area UDA may be connected to a plurality of row lines RL included in the unit driving area UDA and may drive a plurality of row lines RL included in the unit driving area UDA. Each of the plurality of row lines RL may be commonly connected to a second electrode Erl of each of a plurality of light emitting devices ED included in a plurality of sub-pixels SP arranged in the corresponding row.

Referring to FIG. 4, the column driver C-DRV may include main nodes including a first node N1, a second node N2, a third node N3, and a fourth node N4. The column driver C-DRV may include a driving transistor DRT and a first emission control transistor EMT1.

The first node N1 may be a node to which a voltage Vg for controlling the on-off of the driving transistor DRT is applied. The second node N2 may be a node electrically connected to a high-potential voltage node NVDD to which a high-potential voltage VDD is applied. The third node N3 may be a node to which the driving transistor DRT and the first emission control transistor EMT1 are connected. The fourth node N4 may be a node to which the first emission control transistor EMT1 and the light emitting device ED are electrically connected, and may be a node to which the column line CL is electrically connected. Here, a source electrode or a drain electrode of the first emission control transistor EMT1 and the first electrode Ecl of the light emitting device ED may be commonly connected to the column line CL.

The driving transistor DRT supplies a driving current to make the light emitting device ED emit light, is connected between the second node N2 and the third node N3, and may control the connection between the second node N2 and the third node N3 according to the voltage of the first node N1.

The gate electrode of the driving transistor DRT is electrically connected to the first node N1, and a gate voltage Vg may be applied thereto. The drain electrode or the source electrode of the driving transistor DRT may be electrically connected to the second node N2. The source electrode or the drain electrode of the driving transistor DRT may be electrically connected to the third node N3.

The first emission control transistor EMT1 may control a connection of a path through which the driving current flows, and may play a role in controlling an emission of the light emitting device ED.

If the driving transistor DRT and the first emission control transistor EMT1 are turned on between a high potential voltage VDD and a low-potential voltage VSS, the driving current can be supplied to the light emitting device ED through the driving transistor DRT and the first emission control transistor EMT1. Accordingly, the light emitting device ED can emit light.

The first emission control transistor EMT1 is connected between the third node N3 and the fourth node N4, and can control the connection between the third node N3 and the fourth node N4 according to a first emission control signal EM1. The first emission control signal EM1 may be applied to the gate electrode of the first emission control transistor EMT1. The drain electrode or the source electrode of the first emission control transistor EMT1 may be electrically connected to the third node N3. The source electrode or drain electrode of the first emission control transistor EMT1 may be electrically connected to the fourth node N4.

The first emission control signal EM1 may be a pulse width modulation signal that varies at a predefined time (for example, each frame, or each sub-frame included in one frame), but the embodiments of the present disclosure are not limited thereto.

The first emission control signal EM1 may be generated by the driver DRV, or may be supplied to the driver DRV from a driving-related circuit such as a timing controller. For example, if the first emission control signal EM1 is a pulse width modulation signal, the first emission control signal EM1 may have a pulse width corresponding to an image signal (e.g., data voltage, data signal). For example, if the pulse width of the first emission control signal EM1 is large, the emission luminance of the light emitting device ED may be high. If the pulse width of the first emission control signal EM1 is small, the emission luminance of the light emitting device ED may be low.

Referring to FIG. 4, the row driver R-DRV may drive at least one row line RL by supplying a low-potential voltage VSS to at least one row line RL.

The row driver R-DRV may perform display-on driving or display-off driving for one row line RL.

The row driver R-DRV may supply a low-potential voltage for display-on driving to one row line RL in order to perform display-on driving for one row line RL. The row driver R-DRV may supply a low-potential voltage for display-off driving to one row line RL in order to perform display-off driving for one row line RL.

A low-potential voltage for display-on driving and a low-potential voltage for display-off driving may be different. For example, the low-potential voltage for display-on driving may be lower than the low-potential voltage for display-off driving. In the embodiments of the present disclosure, the "low-potential voltage for display-on driving" is also referred to as the "first low-potential voltage," and the "low-potential voltage for display-off driving" is also referred to as the "second low-potential voltage."

Referring to FIG. 4, the column driver C-DRV may further include at least one switching element and/or at least one transistor in addition to the driving transistor DRT and the first emission control transistor EMT1. Each of the transistors included in the column driver C-DRV may be an n-type transistor or a p-type transistor.

Figure 5:
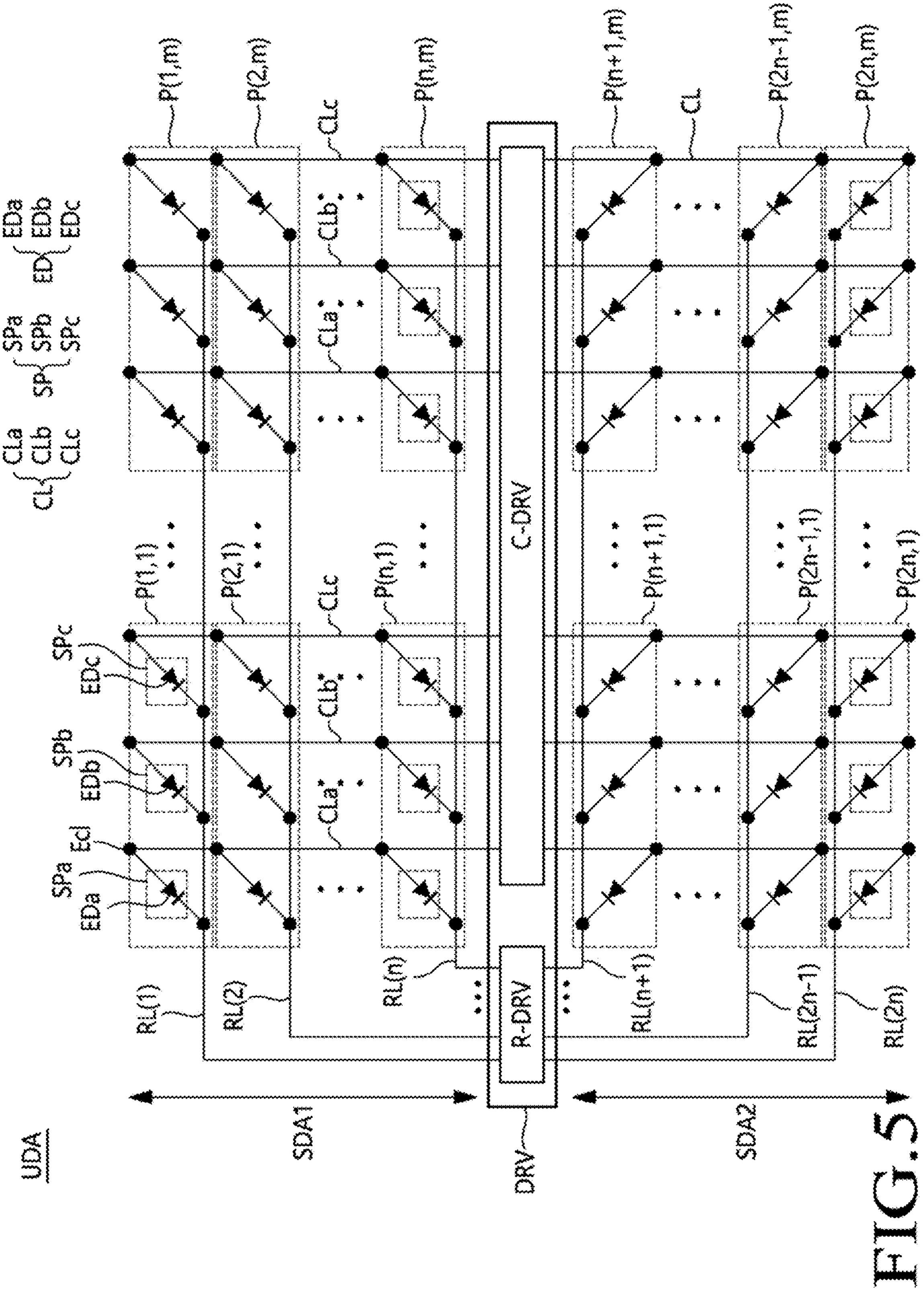
FIG. 5 is an equivalent circuit diagram of a unit driving area of a display panel according to embodiments of the present disclosure.

FIG. 5 is an equivalent circuit diagram of a unit driving area UDA of a display panel 110 according to embodiments of the present disclosure. FIG. 4 is are also referred to in the following description.

Referring to FIG. 5, each of the plurality of unit driving areas UDA may correspond to one driver DRV among the plurality of drivers DRV. For example, one driver DRV among the plurality of drivers DRV may be arranged in each of the plurality of unit driving areas UDAs.

Referring to FIG. 5, each of the plurality of unit driving areas UDAs may include two or more row lines RL(1) to RL(2n) among all row lines RL arranged in the display panel 110 and two or more column lines CL among all column lines CL arranged in the display panel 110.

Referring to FIG. 5, each of the plurality of unit driving areas UDAs may include a first sub-driving area SDA1 and a second sub-driving area SDA2. Some of the two or more row lines RL(1) to RL(2n) may be arranged in the first sub-driving area SDA1, and the rest may be arranged in the second sub-driving area SDA2. Some of the two or more column lines CL may be arranged in the first sub-driving area SDA1, and the rest may be arranged in the second sub-driving area SDA2.

Referring to FIG. 5, each of the plurality of unit driving areas UDAs may include a plurality of pixels P(1, 1), . . . , P(1, m), P(2, 1), . . . , P(2, m), . . . , P(2n, 1), . . . , P(2n, m) arranged in a matrix form.

Each of the plurality of pixels P(1, 1), . . . , P(1, m), P(2, 1), . . . , P(2, m), . . . , P(2n, 1), . . . , P(2n, m) may include k sub-pixels SPa, SPb and SPc. The k sub-pixels SPa, SPb and SPc may include k light emitting devices EDa, EDb and EDc.

Some of the plurality of pixels P(1, 1), . . . , P(1, m), P(2, 1), . . . , P(2, m), . . . , P(2n, 1), . . . , P(2n, m) may be arranged in the first sub-driving area SDA1, and the rest may be arranged in the second sub-driving area SDA2.

The k is the number of sub-pixels included in one pixel. In the example of FIG. 5, k is 3. That is, one pixel may include three sub-pixels SPa, SPb and SPc. Hereinafter, it will be described the structure of the unit driving area UDA is an illustration explained based on an example where K is 3.

The unit driving area UDA may include (2n×m) pixels P(1, 1), . . . , P(1, m), P(2, 1), . . . , P(2, m), . . . , P(2n, 1), . . . , P(2n, m). The (2n×m) pixels P(1, 1), . . . , P(1, m), P(2, 1), . . . , P(2, m), . . . , P(2n, 1), . . . , P(2n, m) may be arranged in 2n rows and m columns.

According to the example of FIG. 5, each of the (2n×m) pixels P(1, 1), . . . , P(1, m), P(2, 1), . . . , P(2, m), . . . , P(2n, 1), . . . , P(2n, m) may include three sub-pixels SPa, SPb and SPc.

According to the example of FIG. 5, three sub-pixels may include a first sub-pixel SPa including a first light emitting device EDa, a second sub-pixel SPb including a second light emitting device EDb, and a third sub-pixel SPc including a third light emitting device EDc.

Half of the (2n×m) pixels P(1, 1), . . . , P(1, m), P(2, 1), . . . , P(2, m), . . . , P(2n, 1), . . . , P(2n, m), which are (n×m) pixels P(1, 1), . . . , P(1, m), . . . , P(n, 1), . . . , P(n, m), may be arranged in the first sub-driving area SDA1.

Among the (2n×m) pixels P(1, 1), . . . , P(1, m), P(2, 1), . . . , P(2, m), . . . , P(2n, 1), . . . , P(2n, m), the remaining half (n×m) pixels P(n+1, 1), . . . , P(n+1, m), . . . , P(2n, 1), . . . , P(2n, m) may be arranged in the second sub-driving area SDA2.

According to the example of FIG. 5, the unit driving area UDA may include 2n row lines RL(1) to RL(2n) and (m×3×2) column lines CL.

Referring to FIG. 5, n row lines RL(1) to RL(n), which are half of 2n row lines RL(1) to RL(2n), may be arranged in the first sub-driving area SDA1, and n row lines RL(n+1) to RL(2n), which are the remaining half of 2n row lines RL(1) to RL(2n), may be arranged in the second sub-driving area SDA2.

The n row lines RL(1)~RL(n) arranged in the first sub-driving area SDA1 may correspond to (n×m) pixels P(1, 1), . . . , P(1, m), . . . , P(n, 1), . . . , P(n, m arranged in the first sub-driving area SDA1 by row (i.e., pixel row).

For example, among the n row lines RL(1) to RL(n) arranged in the first sub-driving area SDA1, the first row line RL(1) arranged in the first row (i.e., the first pixel row) may correspond to m pixels P(1, 1), . . . , P(1, m) included in the first pixel row. The first row line RL(1) may be electrically connected to all of the second electrodes Erl of each of the 3m light emitting devices ED included in the first pixel row.

For another example, among the n row lines RL(1) to RL(n) arranged in the first sub-driving area SDA1, the second row line RL(2) arranged in the second row (i.e., the second pixel row) may correspond to m pixels P(2, 1), . . . , P(2, m) included in the second pixel row. The second row line RL(2) may be electrically connected to all of the second electrodes Erl of each of the 3m light emitting devices ED included in the second pixel row.

For another example, among the n row lines RL(1) to RL(n) arranged in the first sub-driving area SDA1, the n-th row line RL(n) arranged in the n-th row (i.e., the n-th pixel row) may correspond to the m pixels P(n, 1), . . . , P(n, m) included in the n-th pixel row. The n-th row line RL(n) may be electrically connected to all of the second electrodes Erl of each of the 3m light emitting devices ED included in the n-th pixel row.

The n rows RL(n+1) to RL(2n) arranged in the second sub-driving area SDA2 may correspond to the (n×m) pixels P(n+1, 1), . . . , P(n+1, m), . . . , P(2n, 1), . . . , P(2n, m) arranged in the second sub-driving area SDA2 by row (i.e., pixel row).

For example, among the n row lines RL(n+1) to RL(2n) arranged in the second sub-driving area SDA2, the (n+1)-th row line RL(n+1) arranged in the (n+1)-th row (i.e., the (n+1)-th pixel row) may correspond to the m pixels P(n+1, 1), . . . , P(n+1, m) included in the (n+1)-th pixel row. The (n+1)-th row line RL(n+1) may be electrically connected to all of the second electrodes Er of each of the 3m light emitting devices ED included in the (n+1)-th pixel row.

For another example, among the n row lines RL(n+1) to RL(2n) arranged in the second sub-driving area SDA2, the (2n-1)-th row line RL(2n-1) arranged in the (2n-1)-th row (i.e., he (n+2)-th pixel row) may correspond to the m pixels P(2n-1, 1), . . . , P(2n-1, m) included in the (n+2)-th pixel row. The (2n-1)-th row line RL(2n-1) may be electrically connected to all of the second electrodes Erl of each of the 3m light emitting devices ED included in the (2n-1)-th pixel row.

For another example, among the n row lines RL(n+1) to RL(2n) arranged in the second sub-driving area SDA2, the 2n-th row line RL(2n) arranged in the 2n-th row (i.e., 2n-th pixel row) may correspond to the m pixels P(2n, 1), . . . , P(2n, m) included in the 2n-th pixel row. The 2n-th row line RL(2n) may be electrically connected to all of the second electrodes Erl of each of the 3m light emitting devices ED included in the 2n-th pixel row.

Referring to FIG. 5, 3m column lines CL, which are half of the (m×3×2) column lines CL, may be arranged in the first sub-driving area SDA1, and the remaining half of the (m×3×2) column lines CL, which are 3m column lines CL, may be arranged in the second sub-driving area SDA2.

Referring to FIG. 5, 3m column lines CL arranged in the first sub-driving area SDA1 may correspond to (n×m) pixels P(1, 1), . . . , P(1, m), . . . , P(n, 1), . . . , P(n, m) placed in the first sub-driving area SDA1 by column (i.e., pixel column).

For example, among the 3m column lines CL arranged in the first sub-driving area SDA1, three first column lines CLa, CLb and CLc arranged in a first column (i.e., the first pixel column) may correspond to n pixels P(1, 1), P(2, 1), . . . , P(n, 1) arranged in the first pixel column.

In the first sub-driving area SDA1, three first column lines CLa, CLb and CLc arranged in the first pixel column may be connected to three sub-pixels SPa, SPb and SPc included in each of n pixels P(1, 1), P(2, 1), . . . , P(n, 1) arranged in the first pixel column.

In the first sub-driving area SDA1, three first column lines CLa, CLb and CLc arranged in the first pixel column may be electrically connected to all of the first electrodes Ecl of three light emitting devices EDa, EDb and EDc included in each of n pixels P(1, 1), P(2, 1), . . . , P(n, 1) arranged in the first pixel column.

For example, among the 3m column lines CL arranged in the first sub-driving area SDA1, three m-th column lines CLa, CLb and CLc arranged in a m-th column (i.e., m-th pixel column) may correspond to n pixels P(1, m), P(2, m), . . . , P(n, m) arranged in the m-th pixel column.

In the first sub-driving area SDA1, three m-th column lines CLa, CLb and CLc arranged in the m-th pixel column may be connected to three sub-pixels SPa, SPb and SPc included in each of n pixels P(1, m), P(2, m), . . . , P(n, m) arranged in the m-th pixel column.

In the first sub-driving area SDA1, three m-th column lines CLa, CLb and CLc arranged in the m-th pixel column may be electrically connected to all of the first electrodes Ecl of three light emitting devices EDa, EDb and EDc included in each of n pixels P(1, m), P(2, m), . . . , P(n, m) arranged in the m-th pixel column.

Referring to FIG. 5, 3m column lines CL arranged in the second sub-driving area SDA2 may correspond to (n×m) pixels P(n+1, 1), . . . , P(n+1, m), . . . , P(2n, 1), . . . , P(2n, m) arranged in the second sub-driving area SDA2 by column (i.e., pixel column).

For example, among the 3m column lines CL arranged in the second sub-driving area SDA2, three first column lines CLa, CLb and CLc arranged in the first column (i.e., the first pixel column) may correspond to n pixels P(n+1, 1), . . . , P(2n-1, 1), P(2n, 1) arranged in the first pixel column.

In the second sub-driving area SDA2, three first column lines CLa, CLb and CLc arranged in the first pixel column may be connected to three sub-pixels SPa, SPb and SPc included in each of n pixels P(n+1, 1), . . . , P(2n-1, 1), P(2n, 1) arranged in the first pixel column.

In the second sub-driving area SDA2, the three first column lines CLa, CLb and CLc arranged in the first pixel column may be electrically connected to all of the first electrodes Ecl of the three light emitting devices EDa, EDb and EDc included in each of the n pixels P(n+1, 1), . . . , P(2n-1, 1), P(2n, 1) arranged in the first pixel column.

For example, among the 3m column lines CL arranged in the second sub-driving area SDA2, the three m-th column lines CLa, CLb and CLc arranged in the m-th column (i.e., the m-th pixel column) may correspond to the n pixels P(n+1, m), . . . , P(2n-1, m), P(2n, m) arranged in the m-th pixel column.

In the second sub-driving area SDA2, three m-th column lines CLa, CLb and CLc arranged in the m-th pixel column can be connected to three sub-pixels SPa, SPb and SPc included in each of n pixels P(n+1, m), . . . , P(2n-1, m), P(2n, m) arranged in the m-th pixel column.

In the second sub-driving area SDA2, three m-th column lines CLa, CLb and CLc arranged in the m-th pixel column may be electrically connected to all of the first electrodes Ecl of three light emitting devices EDa, EDb and EDc included in each of n pixels P(n+1, m), . . . , P(2n-1, m), P(2n, m) arranged in the m-th pixel column.

Referring to FIG. 5, two or more row lines RL(1) to RL(2n) arranged in the unit driving area UDA may be electrically connected to the row driver R-DRV included in the driver DRV of the unit driving area UDA. Two or more column lines CL arranged in the unit driving area UDA may be electrically connected to the column driver C-DRV included in the driver DRV of the unit driving area UDA.

Referring to FIG. 5, the driver DRV may be arranged between the first sub-driving area SDA1 and the second sub-driving area SDA2.

Figure 6:
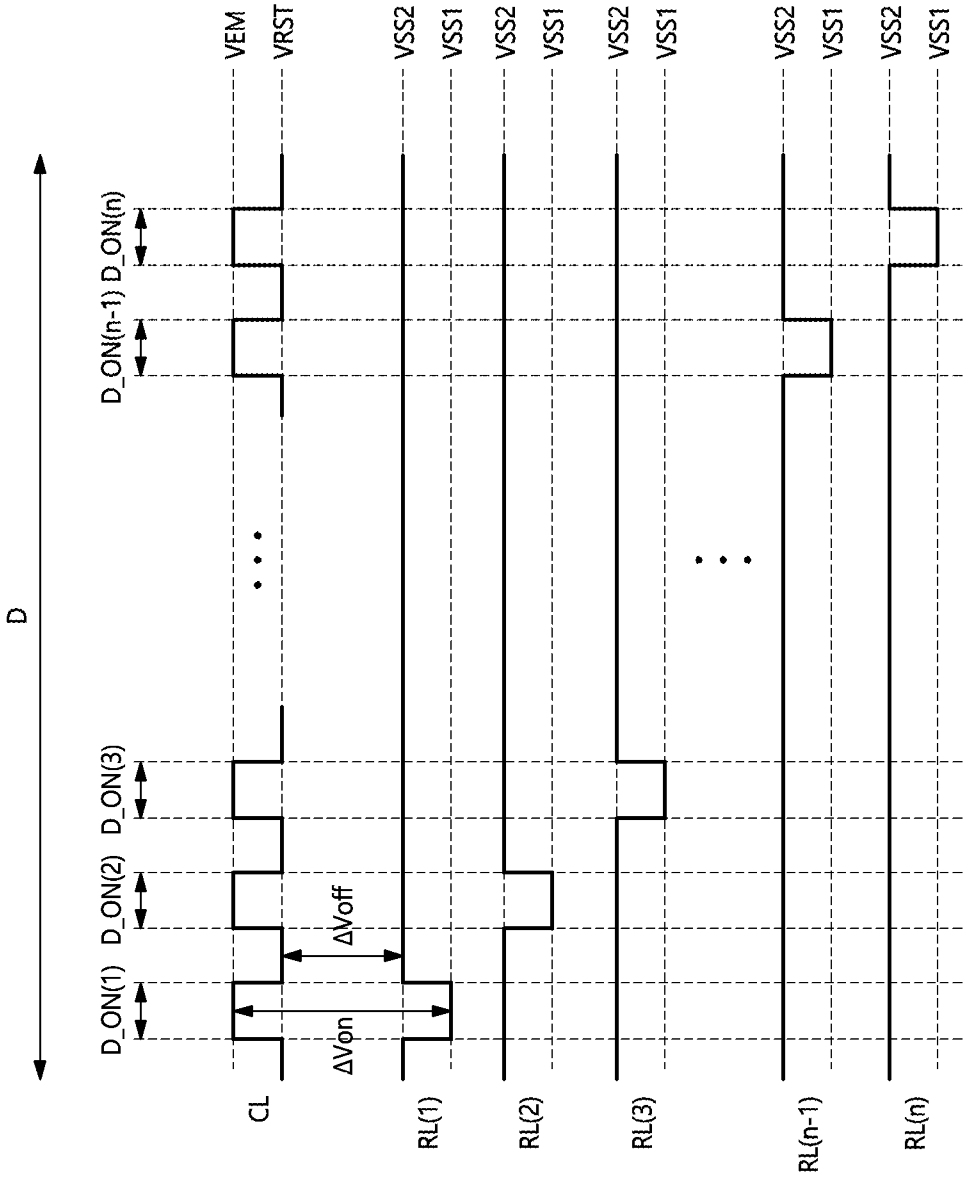
FIG. 6 illustrates a driving timing diagram for n row lines and one column line included in a first sub-driving area of a display panel according to embodiments of the present disclosure.

FIG. 6 illustrates a driving timing diagram for n row lines RL(1) to RL(n) and one column line CL included in a first sub-driving area SDA1 of a display panel 110 according to embodiments of the present disclosure. However, FIG. 5 is also referred to in the following description.

The row driver R-DRV of the driver DRV may drive n row lines RL(1) to RL(n) arranged in the first sub-driving area SDA1.

The driving for each of the n row lines RL(1) to RL(n) arranged in the first sub-driving area SDA1 may include display-on driving for emitting light emitting devices ED arranged in each of the n row lines RL(1) to RL(n) and display-off driving for not emitting light emitting devices EDs arranged in each of the n row lines RL(1) to RL(n).

Hereinafter, it will be exemplified the driving sequence for each of the n row lines RL(1) to RL(n) arranged in the first sub-driving area SDA1.

For example, display-on driving for each of the plurality of row lines RL may be performed sequentially. As another example, display-on driving for each of the plurality of row lines RL may be performed simultaneously. As another example, display-on driving for each of two or more row lines RL among the plurality of row lines RL may be performed simultaneously. Hereinafter, for convenience of explanation, it will be described as an example a case in which display-on driving for each of the plurality of row lines RL is performed sequentially. However, it is not limited thereto.

The row driver R-DRV of the driver DRV may sequentially drive n row lines RL(1) to RL(n) arranged in the first sub-driving area SDA1. That is, display-on driving periods D_ON(1) to D_ON(n) for n row lines RL(1) to RL(n) arranged in the first sub-driving area SDA1 may be sequential.

Among the n row lines RL(1) to RL(n) arranged in the first sub-driving area SDA1, for any one row line RL, during the display driving period D, the display-on driving period D_ON(1) for the corresponding row line RL may exist at least once. During the display driving period D, all remaining times except the display-on driving period D_ON(1) for the corresponding row line RL may be display-off driving periods.

Referring to FIG. 6, during any one display driving period D, among the n row lines RL(1) to RL(n) arranged in the unit driving area UDA, the display-on driving may be performed for at least one row line RL, and the display-on driving may not be performed for the remaining row lines RL, but the display-off driving may be performed.

For example, during any one display driving period D, among the n row lines RL(1) to RL(n) arranged in the unit driving area UDA, display-on driving may be performed for a first row line RL(1), and display-off driving may be performed for the second to n-th row lines RL(2) to RL(n).

For another example, during any one display driving period D, among the n row lines RL(1) to RL(n) arranged in the unit driving area UDA, display-on driving may be performed for the second row line RL(2), and display-on driving may not be performed for the first row line RL(1) and a third to n-th row lines RL(3) to RL(n).

For another example, during any one display driving period D, among the n row lines RL(1) to RL(n) arranged in the unit driving area UDA, display-on driving may be performed for the third row line RL(3), and display-off driving may be performed instead of display-on driving for the first and second row lines RL(1), RL(2) and the fourth to n-th row lines RL(4) to RL(n).

For another example, during any one display driving period D, among the n row lines RL(1) to RL(n) arranged in the unit driving area UDA, display-on driving may be performed for the (n-1)-th row line RL(n-1), and display-off driving may be performed instead of display-on driving for the first to (n−2)-th row lines RL(1) to RL(n−2) and the n-th row line RL(n).

For another example, during any one display driving period D, among the n row lines RL(1) to RL(n) arranged in the unit driving area UDA, display-on driving may be performed for the n-th row line RL(n), and display-off driving may be performed instead of display-on driving for the first to (n-1)-th row lines RL(1) to RL(n-1).

Referring to FIG. 6, if display-on driving is performed for any row line RL among the n row lines RL(1) to RL(n) arranged in the unit driving area UDA, it may mean that a first low-potential voltage VSS1 of a predefined level is supplied to the corresponding row line RL. When display-on driving is performed for any row line RL, the light emitting devices ED arranged corresponding to the corresponding row line RL may emit light.

When display-off driving is performed for any row line RL among the n row lines RL(1) to RL(n) arranged in the unit driving area UDA without display-on driving, it may mean that a second low-potential voltage VSS2 of a predefined level is supplied to the corresponding row line RL. When display-off driving is performed for a specific row line RL, the light emitting devices ED arranged corresponding to the corresponding row line RL may not emit light.

The first low-potential voltage VSS1 may be a low-potential voltage VSS for display-on driving, and the second low-potential voltage VSS2 may be a low-potential voltage VSS for display-off driving. The second low-potential voltage VSS2 may be a voltage higher than the first low-potential voltage VSS1.

Referring to FIG. 6, any one row line RL among the n row lines RL(1) to RL(n) arranged in the unit driving area UDA may be supplied with the first low-potential voltage VSS1 during a first period, and may be supplied with the second low-potential voltage VSS2 higher than the first low-potential voltage VSS1 during a second period different from the first period. For example, the first period and the second period may be included in one display driving period D. For another example, the first period and the second period may be included in different display driving periods D.

For example, among the n row lines RL(1) to RL(n) arranged in the unit driving area UDA, the first row line RL(1) may be supplied with a first low-potential voltage VSS1 during a first display-on driving period D_ON(1), and may be supplied with a second low-potential voltage VSS2 higher than the first low-potential voltage VSS1 during a second display-on driving period D_ON(2) to D_ON(n) different from the first display-on driving period D_ON(1).

For example, during the first display-on driving period D_ON(1), the first row line RL(1) may be supplied with a first low-potential voltage VSS, and the second to n-th row lines RL(2) to RL(n) may be supplied with a second low-potential voltage VSS2. During the second display-on driving period D_ON(2), the second row line RL(2) may be supplied with a first low-potential voltage VSS1, and the first row line RL(1) and the third to n-th row lines RL(3) to RL(n) may be supplied with a second low-potential voltage VSS2.

For example, during the first display-on driving period D_ON(1), a plurality of light emitting devices ED overlapping with the first row line RL(1) and arranged in the first row may emit light, and a plurality of light emitting devices ED overlapping with the second to n-th row lines RL(2) to RL(n) and arranged in the second to n-th rows may not emit light. During the second display-on driving period D_ON(2), a plurality of light emitting devices ED overlapping with the second row line RL(2) and arranged in the second row may emit light, and a plurality of light emitting devices ED overlapping with the first row line RL(1) and the third to n-th row lines RL(3) to RL(n) and arranged in the first row and the third to n-th rows may not emit light.

For example, the first display-on driving period D_ON(1) and the second display-on driving period D_ON(2) to D_ON(n) may be included in one display driving period D. For another example, the first display-on driving period D_ON(1) and the second display-on driving period D_ON(2) to D_ON(n) may be included in different display driving periods D.

Referring to FIG. 6, (m×k) column lines CL may be arranged in a unit driving area UDA. In the unit driving area UDA, the (m×k) column lines CL may intersect with n row lines RL(1) to RL(n). The column line CL illustrated in FIG. 7 may be one of the (m×k) column lines CL.

During the display driving period D, each of the (m×k) column lines CL intersecting the n row lines RL(1) to RL(n) may be supplied with a display voltage VEM required to emit light from the corresponding light emitting device ED in synchronization with the display-on driving period D_ON(1) to D_ON(n) of each of the n row lines RL(1) to RL(n). Here, the display voltage VEM may also be referred to as a light emitting driving voltage or an emission driving voltage.

During the display driving period D, during all remaining times except for the display-on driving period D_ON(1) to D_ON(n) of each of the n row lines RL(1) to RL(n), a reset voltage VRST may be applied to each of the (m×k) column lines CL intersecting the n row lines RL(1) to RL(n).

The display voltage VEM may be a constant voltage or a voltage that varies depending on the image signal. The reset voltage VRST may be a voltage that is lower than the display voltage VEM, and may be a constant voltage or a variable voltage.

During the display driving period D, during the display-on driving period D_ON(1) to D_ON(n) of each of the n row lines RL(1) to RL(n), the voltage difference VEM-VSS1 between the display voltage VEM applied to the corresponding column line CL and the first low-potential voltage VSS1 applied to the corresponding row line RL may be a display-on voltage ΔVon.

A light emitting device ED may be connected between the corresponding column line CL and the corresponding row line RL. A display voltage VEM and a first low-potential voltage VSS1 may be applied to each of the first electrode Ecl and the second electrode Erl of the light emitting device ED.

The display-on voltage ΔVon is a voltage difference between the first electrode Ecl and the second electrode Erl of the light emitting device ED, and may be a voltage that can cause the light emitting device ED to emit light. For example, the display-on voltage ΔVon may be equal to or higher than a threshold voltage, which is a unique characteristic value of the light emitting device ED.

During the display driving period D, during all the remaining time except for the display-on driving period D_ON(1) to D_ON(n) of each of the n row lines RL(1) to RL(n), the voltage difference VRST-VSS2 between the reset voltage VRST applied to the corresponding column line CL and the second low-potential voltage VSS2 applied to the corresponding row line RL may be a display-off voltage ΔVoff.

A light emitting device ED may be connected between the corresponding column line CL and the corresponding row line RL. A reset voltage VRST and a second low-potential voltage VSS2 may be applied to each of the first electrode Ecl and the second electrode Erl of the light emitting device ED.

The display-off voltage ΔVoff is a voltage difference between the first electrode Ecl and the second electrode Erl of the corresponding light emitting device ED, and may be a voltage that does not allow the corresponding light emitting device ED to emit light. For example, the display-off voltage ΔVoff may be less than the threshold voltage, which is a unique characteristic of the corresponding light emitting device ED. That is, the display-on voltage ΔVon may be greater than or equal to the display-off voltage ΔVoff.

Hereinafter, it will be described in more detail a circuit for driving n light emitting devices ED(1) to ED(n) connected to one column line CL in the display panel 110 according to embodiments of the present disclosure.

Figure 7:
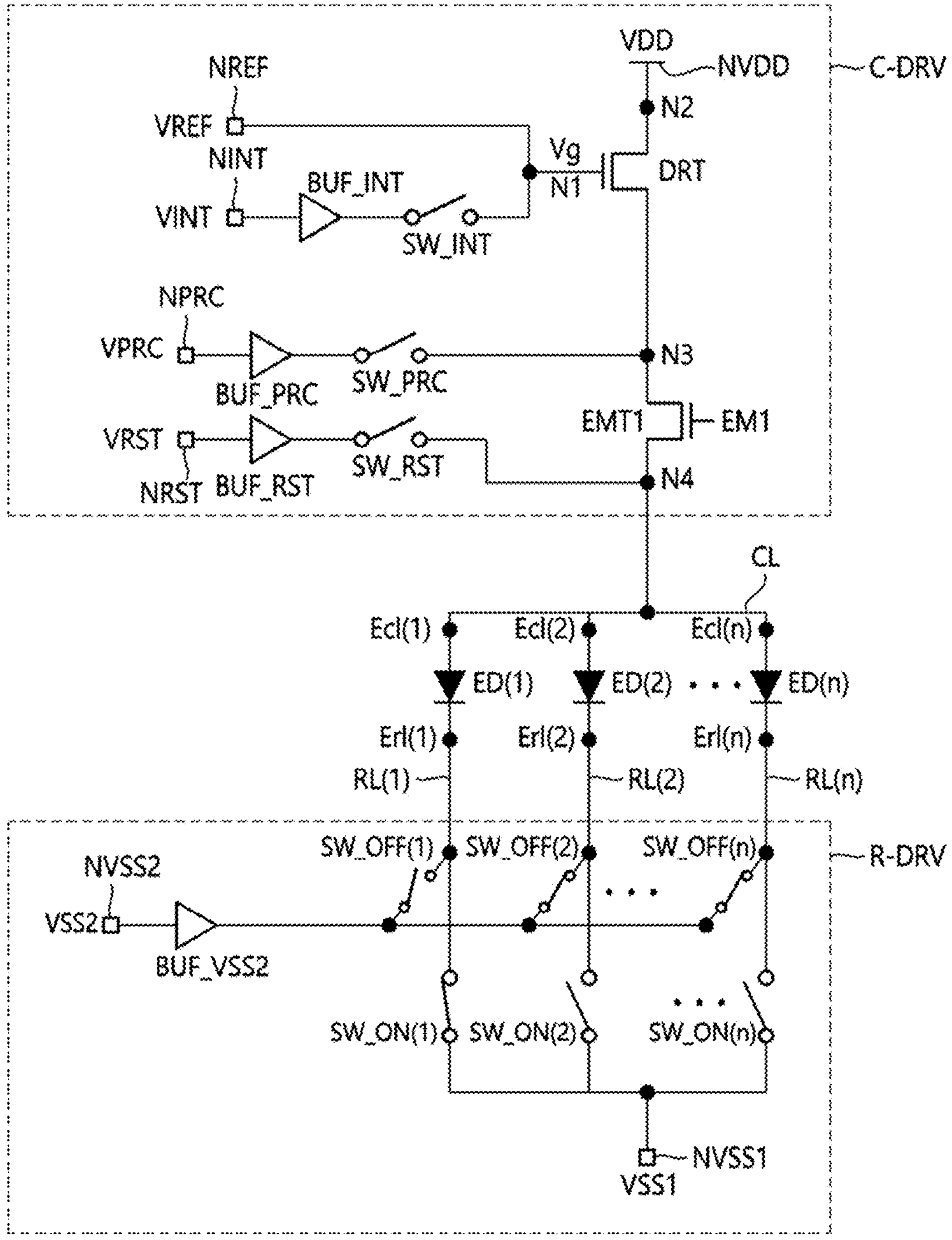
FIG. 7 and FIG. 8 illustrate circuits for driving n light emitting devices connected to one column line included in a first sub-driving area of a display panel according to embodiments of the present disclosure.

FIG. 7 illustrates a circuit for driving n light emitting devices ED(1) to ED(n) connected to one column line CL included in a first sub-driving area SDA1 of a display panel 110 according to embodiments of the present disclosure. FIG. 4 and FIG. 5 may also be referred to in the following description.

Referring to FIG. 7, n light emitting devices ED(1) to ED(n) connected to one column line CL may be arranged in the same column. The n light emitting devices ED(1) to ED(n) arranged in the same column may be connected to one column line CL. The n light emitting devices ED(1) to ED(n) connected to one column line CL may be arranged in one of the first sub-driving area SDA1 and the second sub-driving area SDA2 included in the unit driving area UDA.

The n light emitting devices ED(1) to ED(n) connected to one column line CL may be light emitting devices emitting the same color light. The n light emitting devices ED(1) to ED(n) arranged in the same column may be light emitting devices emitting the same color light.

For example, the n light emitting devices ED(1) to ED(n) arranged in the same column may emit light sequentially. As another example, the n light emitting devices ED(1) to ED(n) arranged in the same column may emit light simultaneously. As another example, two or more of n light emitting devices ED(1) to ED(n) arranged in the same column may emit light simultaneously.

Referring to FIG. 7, n light emitting devices ED(1) to ED(n) arranged in the same column may include first electrodes Ecl(1) to Ecl(n) and second electrodes Erl(1) to Erl(n).

All first electrodes Ecl(1) to Ecl(n) of n light emitting devices ED(1) to ED(n) arranged in the same column may be connected to one column line CL. The second electrodes Erl(1) to Erl(n) of the n light emitting devices ED(1) to ED(n) arranged in the same column may be respectively connected to the n row lines RL(1) to RL(n).

Referring to FIG. 7, a circuit for driving the n light emitting devices ED(1) to ED(n) arranged in the same column may include a column driver C-DRV and a row driver R-DRV.

The column driver C-DRV may be configured to drive the column line CL connected to all of the first electrodes Ecl(1) to Ecl(n) of the n light emitting devices ED(1) to ED(n) arranged in the same column.

The row driver R-DRV may be configured to drive n row lines RL(1) to RL(n) which are respectively connected to the second electrodes Erl(1) to Erl(n) of n light emitting devices ED(1) to ED(n) arranged in the same column.

Referring to FIG. 7, the column driver C-DRV may include first to fourth nodes N1 to N4, and may include a driving transistor DRT and a first emission control transistor EMT1.

The first node N1 may be a node to which a voltage Vg for controlling the on-off of the driving transistor DRT is applied. The second node N2 may be a node electrically connected to a high-potential voltage node NVDD to which a high-potential voltage VDD is applied. The third node N3 may be a node to which the driving transistor DRT and the first emission control transistor EMT1 are connected. The fourth node N4 may be a node to which the first emission control transistor EMT1 and the n light emitting devices ED(1) to ED(n) are electrically connected, and may be a node to which the column line CL is electrically connected. Here, the source electrode or the drain electrode of the first emission control transistor EMT1 and the first electrodes Ecl(1) to Ecl(n) of the n light emitting devices ED(1) to ED(n) may be commonly connected to the column line CL.

The driving transistor DRT supplies a driving current to emit light to n light emitting devices ED(1) to ED(n), is connected between the second node N2 and the third node N3, and may control the connection between the second node N2 and the third node N3 according to the voltage of the first node N1.

The gate electrode of the driving transistor DRT is electrically connected to the first node N1, and is supplied with a gate voltage Vg. The drain electrode or the source electrode of the driving transistor DRT may be electrically connected to the second node N2. The source electrode or the drain electrode of the driving transistor DRT may be electrically connected to the third node N3.

The first emission control transistor EMT1 may control the connection of a path through which the driving current flows, and may play a role in controlling an emission of the light emitting device ED.

The first emission control transistor EMT1 is connected between the third node N3 and the fourth node N4, and may control the connection between the third node N3 and the fourth node N4 according to the first emission control signal EM1. The first emission control signal EM1 may be applied to the gate electrode of the first emission control transistor EMT1. The drain electrode or the source electrode of the first emission control transistor EMT1 may be electrically connected to the third node N3. The source electrode or the drain electrode of the first emission control transistor EMT1 may be electrically connected to the fourth node N4.

The first emission control signal EM1 may be a pulse width modulation signal that varies at a predefined time (for example, each frame, or each sub-frame included in one frame), but the embodiments of the present disclosure are not limited thereto.

The first emission control signal EM1 may be generated from the driver DRV or supplied to the driver DRV from a driving-related circuit such as a timing controller.

Referring to FIG. 7, the column driver C-DRV may further include a reference voltage node NREF electrically connected to the first node N1. A reference voltage VREF may be applied to the reference voltage node NREF. Here, the reference voltage VREF may be a gate voltage Vg of the driving transistor DRT.

For example, the reference voltage VREF may have a constant voltage value.

For another example, the reference voltage VREF may have a different voltage value depending on the color light emitted from the light emitting device ED in which the display-on operation is performed. For example, the reference voltage VREF applied to the first node N1 during the driving period for emitting light of the light emitting device EDa emitting a first color light, the reference voltage VREF applied to the first node N1 during the driving period for emitting light of the light emitting device EDb emitting a second color light, and the reference voltage VREF applied to the first node N1 during the driving period for emitting light of the light emitting device EDc emitting a third color light may have different voltage values.

Referring to FIG. 7, the column driver C-DRV may further include an initialization voltage node NINT electrically connected to the first node N1 through an initialization switch SW_INT. An initialization voltage VINT may be applied to the initialization voltage node NINT. Here, the initialization voltage VINT may be a gate voltage Vg of the driving transistor DRT.

The column driver C-DRV may further include an initialization buffer BUF_INT connected between the initialization switch SW_INT and the initialization voltage node NINT. The initialization buffer BUF_INT may amplify the initialization voltage VINT applied to the initialization voltage node NINT and supply an amplified initialization voltage to the first node N1.

Referring to FIG. 7, the column driver C-DRV may further include a pre-charge voltage node NPRC electrically connected to a third node N3 through a pre-charge switch SW_PRC. A pre-charge voltage VPRC may be applied to the pre-charge voltage node NPRC.

The column driver C-DRV may further include a pre-charge buffer BUF_PRC connected between the pre-charge switch SW_PRC and the pre-charge voltage node NPRC. The pre-charge buffer BUF_PRC may amplify the pre-charge voltage VPRC applied to the pre-charge voltage node NPRC and supply it to the third node N3.

Referring to FIG. 7, the column driver C-DRV may further include a reset voltage node NRST electrically connected to a fourth node N4 through a reset switch SW_RST. A reset voltage VRST may be applied to the reset voltage node NRST.

The column driver C-DRV may further include a reset buffer BUF_RST connected between the reset switch SW_RST and the reset voltage node NRST. The reset buffer BUF_RST may amplify the reset voltage VRST applied to the reset voltage node NRST and supply it to the fourth node N4. Here, the fourth node N4 may be electrically connected to the corresponding column line CL.

Referring to FIG. 7, the row driver R-DRV may be configured to drive n row lines RL(1) to RL(n) each connected to the second electrodes Erl(1) to Erl(n) of n light emitting devices ED(1) to ED(n) arranged in the same column.

Referring to FIG. 7, the row driver R-DRV may include n display-on switches SW_ON(1) to SW_ON(n) that electrically connect each of n row lines RL(1) to RL(n) to a first low-potential voltage node NVSS1. A first low-potential voltage VSS1 may be applied to the first low-potential voltage node NVSS1.

The turn-on timing of each of the n display-on switches SW_ON(1) to SW_ON(n) may be different from each other. Accordingly, display-on driving for the n row lines RL(1) to RL(n) may be sequentially performed.

Referring to FIG. 7, the row driver R-DRV may include n display-off switches SW_OFF(1) to SW_OFF(n) that electrically connect each of the n row lines RL(1) to RL(n) to a second low-potential voltage node NVSS2 to which a second low-potential voltage VSS2 is applied. The second low-potential voltage VSS2 may be a low-potential voltage higher than the first low-potential voltage VSS1. The row driver R-DRV may further include a second low-potential buffer BUF_VSS2 connected between the n display-off switches SW_OFF(1) to SW_OFF(n) and the second low-potential voltage node NVSS2.

The turn-on timing of each of the n display-off switches SW_OFF(1) to SW_OFF(n) may be different from each other. Accordingly, the display-off driving for the n display-off switches SW_OFF(1) to SW_OFF(n) may be performed at different timings.

According to the example of FIG. 7, the row driver R-DRV may perform display-on driving for the first row line RL(1) among the n row lines RL(1) to RL(n), and perform display-off driving for the second to n-th row lines RL(2) to RL(n).

To this end, among the n display-on switches SW_ON(1) to SW_ON(n), a first display-on switch SW_ON(1) may be in a turn-on state, and a second to n-th display-on switches SW_ON(2) to SW_ON(n) may be in a turn-off state. In addition, among the n display-off switches SW_OFF(1) to SW_OFF(n), the first display-off switch SW_OFF(1) may be in a turn-off state, and the second to n-th display-off switches SW_OFF(2) to SW_OFF(n) may be in a turn-on state.

Accordingly, among the n row lines RL(1) to RL(n), a first low-potential voltage VSS1 may be applied to the first row line RL(1), and a second low-potential voltage VSS2 may be applied to the second to n-th row lines RL(2) to RL(n). Here, the first low-potential voltage VSS1 may have a lower voltage value than the second low-potential voltage VSS2.

Referring to FIG. 7, each of the transistors DRT and EM1 included in the column driver C-DRV may be an n-type transistor or a p-type transistor. The switches SW_ON(1) to SW_ON(n), SW_OFF(1) to SW_OFF(n) included in the row driver R-DRV may be implemented as an n-type transistor or a p-type transistor. The column driver C-DRV may further include at least one capacitor.

Referring to FIG. 7, all or part of the column driver C-DRV and the row driver R-DRV may be internal circuits included in the driver DRV. As another example, all or part of the column driver C-DRV and the row driver R-DRV may be circuits formed on the substrate 210 of the display panel 110 and not included in the driver DRV.

Hereinafter, it will be described the different circuit structures of the column driver C-DRV and the row driver R-DRV with reference to FIG. 8.

Figure 8:
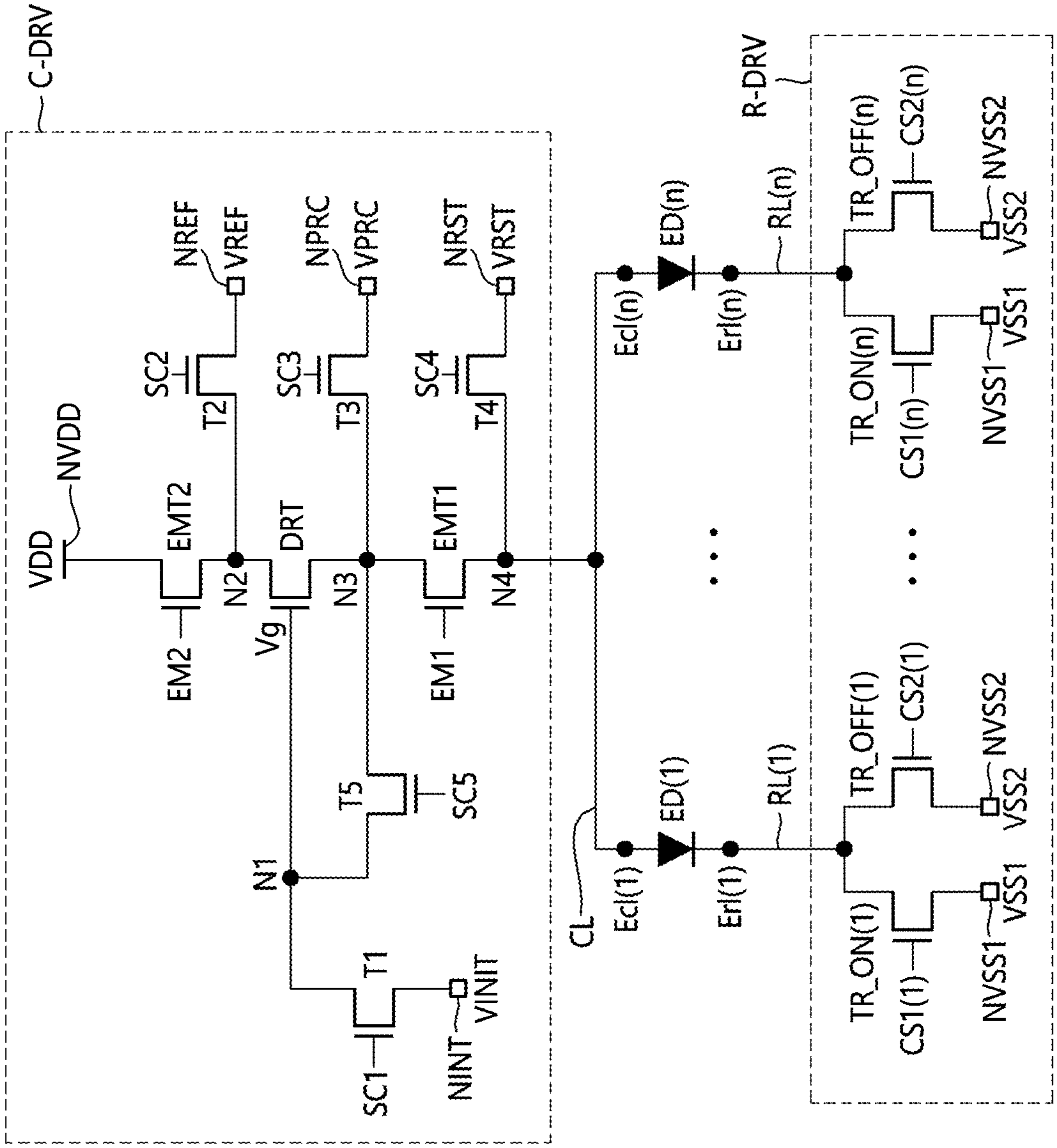

FIG. 8 illustrates another circuit for driving n light emitting devices ED(1) to ED(n) connected to one column line CL included in the first sub-driving area SDA1 of the display panel 110 according to the embodiments of the present disclosure. In the following description, the description of the same content as in the circuit of FIG. 8 may be omitted.

Referring to FIG. 8, n light emitting devices ED(1) to ED(n) connected to one column line CL may be arranged in the same column. The n light emitting devices ED(1) to ED(n) arranged in the same column may be connected to one column line CL. The n light emitting devices ED(1) to ED(n)

connected to one column line CL may be arranged in one of the first sub-driving area SDA1 and the second sub-driving area SDA2 included in the unit driving area UDA.

The n light emitting devices ED(1) to ED(n) connected to one column line CL may be light emitting devices emitting the same color light. The n light emitting devices ED(1) to ED(n) arranged in the same column may be light emitting devices emitting the same color light.

Referring to FIG. 8, the n light emitting devices ED(1) to ED(n) arranged in the same column may include first electrodes Ecl(1) to Ecl(n) and second electrodes Erl(1) to Erl(n).

The first electrodes Ecl(1) to Ecl(n) of the n light emitting devices ED(1) to ED(n) arranged in the same column may all be connected to one column line CL. The second electrodes Erl(1) to Erl(n) of the n light emitting devices ED(1) to ED(n) arranged in the same column may be respectively connected to the n row lines RL(1) to RL(n).

Referring to FIG. 8, a circuit for driving the n light emitting devices ED(1) to ED(n) arranged in the same column may include a column driver C-DRV and a row driver R-DRV.

Referring to FIG. 8, the column driver C-DRV may include first to fourth nodes N1 to N4, and may include a driving transistor DRT, a first emission control transistor EMT1, and a second emission control transistor EMT2.

The first node N1 may be a node to which a voltage Vg for controlling on-off of the driving transistor DRT is applied. The second node N2 may be a node to which the second emission control transistor EMT2 and the driving transistor DRT are connected. The third node N3 may be a node to which the driving transistor DR and the first emission control transistor EMT1 are connected. The fourth node N4 may be a node to which the first emission control transistor EMT1 and the n light emitting devices ED(1) to ED(n) are electrically connected, and may be a node to which the column line CL is electrically connected. Here, the source electrode or the drain electrode of the first emission control transistor EMT1 and the first electrodes Ecl(1) to Ecl(n) of the n light emitting devices ED(1) to ED(n) may be commonly connected to the column line CL.

The driving transistor DRT supplies a driving current to emit light to n light emitting devices ED(1) to ED(n), is connected between the second node N2 and the third node N3, and may control the connection between the second node N2 and the third node N3 according to the voltage of the first node N1.

The gate electrode of the driving transistor DRT is electrically connected to the first node N1, and may be supplied with a gate voltage Vg. The drain electrode or the source electrode of the driving transistor DRT may be electrically connected to the second node N2. The source electrode or the drain electrode of the driving transistor DRT may be electrically connected to the third node N3.

The first emission control transistor EMT1 and the second emission control transistor EMT2 may control the connection of a path through which a driving current flows, and may play a role in controlling an emission of a light emitting device ED.

The first emission control transistor EMT1 is connected between the third node N3 and the fourth node N4, and may control the connection between the third node N3 and the fourth node N4 according to a first emission control signal EM1. The first emission control signal EM1 may be applied to the gate electrode of the first emission control transistor EMT1. The drain electrode or the source electrode of the first emission control transistor EMT1 may be electrically connected to the third node N3. The source electrode or the drain electrode of the first emission control transistor EMT1 may be electrically connected to the fourth node N4.

The first emission control signal EM1 may be a pulse width modulation signal that varies at a predefined time (for example, each frame, or each sub-frame included in a frame), but the embodiments of the present disclosure are not limited thereto. The first emission control signal EM1 may be generated by the driver DRV, or may be supplied to the driver DRV from a driving-related circuit such as a timing controller.

The second emission control transistor EMT2 is connected between the high-potential voltage node NVDD and the second node N2, and may control the connection between the high-potential voltage node NVDD and the second node N2 according to a second emission control signal EM2. The second emission control signal EM2 may be applied to the gate electrode of the second emission control transistor EMT2. The drain electrode or the source electrode of the second emission control transistor EMT2 may be electrically connected to the high-potential voltage node NVDD. The source electrode or drain electrode of the second emission control transistor EMT2 may be electrically connected to the second node N2. Here, the second emission control signal EM2 may be the same as or different from the first emission control signal EM1.

Referring to FIG. 8, the column driver DRV may further include a first transistor T1 whose on-off is controlled according to a first scan signal SC1 and controls the connection between the first node N and the initialization voltage node NINT. Here, the initialization voltage VINT may be applied to the initialization voltage node NINT.

Referring to FIG. 8, the column driver DRV may further include a second transistor T2 whose on-off is controlled according to a second scan signal SC2 and controls the connection between the second node N2 and the reference voltage node NREF. Here, a reference voltage VREF may be applied to the reference voltage node NREF.

Referring to FIG. 8, the column driver DRV may further include a third transistor T3 whose on-off is controlled according to a third scan signal SC3 and controls the connection between the third node N3 and the pre-charge voltage node NPRC. Here, a pre-charge voltage VPRC may be applied to the pre-charge voltage node NPRC.

Referring to FIG. 8, the column driver DRV may further include a fourth transistor T4 whose on-off is controlled according to a fourth scan signal SC4 and controls the connection between the fourth node N4 and the reset voltage node NRST. Here, a reset voltage VRST may be applied to the reset voltage node NRST.

Referring to FIG. 8, the column driver DRV may further include a fifth transistor T5 that controls the connection between the first node N1 and the third node N3 by controlling the on-off according to a fifth scan signal SC5. If the fifth transistor T5 is turned on, the first node N1 and the third node N3 are electrically connected, so that the driving transistor DRT may be in a diode-connected state. Here, for example, the fifth scan signal SC5 may be a scan signal that is different from or the same as the second scan signal SC2.

Referring to FIG. 8, the row driver R-DRV may be configured to drive n row lines RL(1) to RL(n) that are respectively connected to the second electrodes Erl(1) to Erl(n) of n light emitting devices ED(1) to ED(n) arranged in the same column.

Referring to FIG. 8, the row driver R-DRV may include n display-on transistors TR_ON(1) to TR_ON(n) that electrically connect each of n row lines RL(1) to RL(n) to a first low-potential voltage node NVSS1. A first low-potential voltage VSS1 may be applied to the first low-potential voltage node NVSS1. The n display-on transistors TR_ON (1) to TR_ON(n) may be turned on and off by n display-on control signals CS1(1) to CS1(*n*).

The turn-on timing of each of the n display-on transistors TR_ON(1) to TR_ON(n) may be different from each other. Accordingly, display-on driving for the n row lines RL(1) to RL(n) may be sequentially performed.

Referring to FIG. 8, the row driver R-DRV may include n display-off transistors TR_OFF(1) to TR_OFF(n) that electrically connect each of n row lines RL(1) to RL(n) to a second low-potential voltage node NVSS2 to which a second low-potential voltage VSS2 is applied. The second low-potential voltage VSS2 may be a low-potential voltage higher than the first low-potential voltage VSS1. The n display-off transistors TR_OFF(1) to TR_OFF(n) may be turned on and off by n display-off control signals CS2(1) to CS1(*n*).

The turn-on timing of each of the n display-off transistors TR_OFF(1) to TR_OFF(n) may be different from each other. Accordingly, display-off driving for n display-off transistors TR_OFF(1) to TR_OFF(n) may be performed at different timings.

That is, one display-on transistor among n display-on transistors TR_ON(1) to TR_ON(n) and one display-off transistor among n display-off transistors TR_OFF(1) to TR_OFF(n) may be connected to each of n row lines RL(1) to RL(n).

Only one of the display-on transistors and display-off transistors connected to each of n row lines RL(1) to RL(n) may be selectively turned on.

For example, if a display-on driving is performed for the first row line RL(1) among the n row lines RL(1) to RL(n), among the first display-on transistor TR_ON(1) and the first display-off transistor TR_OFF(1) connected to the first row line RL(1), the first display-on transistor TR_ON(1) may be turned on and the first display-off transistor TR_OFF(1) may be turned off. At this time, if display-on driving is performed for the second to n-th row lines RL(2) to RL(n), among the display-on transistors and display-off transistors connected to each of the second to n-th row lines RL(2) to RL(n), the display-on transistor may be turned off and the display-off transistor may be turned on. Accordingly, a first low-potential voltage VSS1, which is a low-potential voltage for driving the display-on, may be applied only to the first row line RL(1) among the n row lines RL(1) to RL(n), and a second low-potential voltage VSS2, which is a low-potential voltage for driving the display-off, may be applied to the remaining second to n-th row lines RL(2) to RL(n). Referring to FIG. 8, the driving timing of the sub-pixel SP is as follows.

During a first driving period, the first transistor T1 among the first to fifth transistors T1 to T5 may be turned on, and the initialization voltage VINT may be applied to the first node N1. The driving transistor DRT may be turned on by the initialization voltage VINT applied to the first node N1.

Thereafter, during a second driving period, the second transistor T2 may be turned on, and the reference voltage VRE may be applied to the second node N2. In this case, the fifth transistor T5 may also be turned on.

Thereafter, during a third driving period, the third transistor T3 may be turned on, so that the pre-charge voltage VPRC may be applied to the third node N3.

Then, during a fourth driving period, one of the n light emitting devices ED(1) to ED(n) may emit light. During the fourth driving period, the light emitting devices in an emission state among the n row lines RL(1) to RL(n) may be supplied with the first low-potential voltage VSS1, which is a low-potential voltage for display-on driving, and the light emitting devices in a non-emission state may be supplied with the second low-potential voltage VSS2, which is a low-potential voltage for display-off driving.

To this end, among the n row lines RL(1) to RL(n), the row line on which display-on driving is performed may be supplied with the first low-potential voltage VSS1, and the remaining row lines on which display-off driving is performed may be supplied with the second low-potential voltage VSS2.

Therefore, among the display-on transistor and the display-off transistor connected to the row line where the display-on driving is performed, the display-on transistor may be in a turn-on state and the display-off transistor may be in a turn-off state.

Among the display-on transistor and the display-off transistor connected to the row line where the display-off driving is performed, the display-on transistor may be in a turn-off state and the display-off transistor may be in a turn-on state.

Thereafter, during a fifth driving period, the fourth transistor T4 may be turned on, so that the reset voltage VRST may be applied to the fourth node N4. Accordingly, the column line CL may be reset to the reset voltage VRST. In addition, all of the first electrodes Ecl(1) to Ecl(n) of the n light emitting devices ED(1) to ED(n) connected to the column line CL may be reset to the reset voltage VRST.

The first to fourth scan signals SC1 to SC4 and the first and second emission control signals EM1 and EM2 may be generated by the corresponding driver DRV, or may be supplied to the corresponding driver DRV from a driving-related circuit such as a timing controller.

Referring to FIG. 8, each of the transistors DRT and T1 to T5 included in the column driver C-DRV may be an n-type transistor or a p-type transistor. Each of the transistors TR_ON(1) to TR_ON(n), TR_OFF(1) to TR_OFF(n) included in the row driver R-DRV may be an n-type transistor or a p-type transistor. The column driver C-DRV may further include at least one capacitor.

Referring to FIG. 8, all or part of the column driver C-DRV and the row driver R-DRV may be internal circuits included in the driver DRV. As another example, all or part of the column driver C-DRV and the row driver R-DRV may be circuits formed on the substrate 210 of the display panel 110 and not included in the driver DRV.

In order for the plurality of drivers DRV included in the display device 100 according to the embodiments of the present disclosure to perform a driving operation, the plurality of drivers DRV are required to be supplied with power required for the driving operation. Accordingly, hereinafter, it will be described a power supply structure for supplying power required for the driving operation to the plurality of drivers DRV with reference to FIG. 9.

Figure 9:
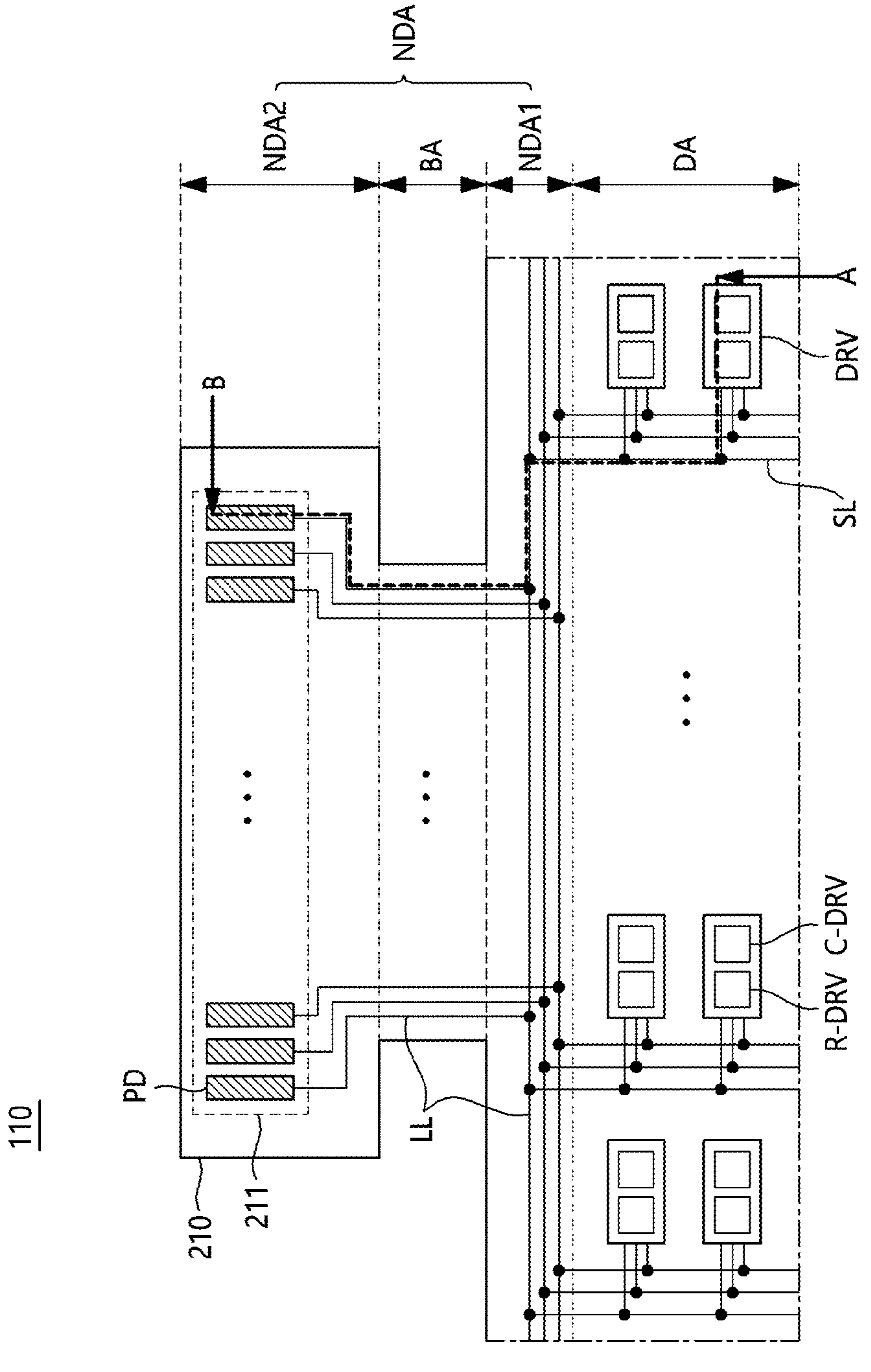
FIG. 9 is a plan view of a display panel according to embodiments of the present disclosure.

FIG. 9 is a plan view of the display panel 110 according to the embodiments of the present disclosure.

Referring to FIG. 9, the substrate 210 of the display panel 110 according to the embodiments of the present disclosure may include a display area DA and a non-display area NDA, and the non-display area NDA may include a first non-display area NDA1, a bending area BA, and a second non-display area NDA2.

Referring to FIG. 9, a plurality of drivers DRV may be arranged in the display area DA. Each of the plurality of drivers DRV may be a circuit for driving light emitting devices of a plurality of sub-pixels included in a corresponding unit driving area (UDA of FIGS. 4 and 5). Each of the plurality of drivers DRV may include a row driver R-DRV for driving a plurality of row lines and a column driver C-DRV for driving a plurality of column lines, in order to drive a plurality of light emitting devices ED included in a corresponding unit driving area (UDA of FIGS. 4 and 5).

Referring to FIG. 9, a pad section 211 including a plurality of pads PD may be arranged in the second non-display area NDA2.

Referring to FIG. 9, a plurality of signal lines SL and a plurality of link lines LL for signal transmission between a plurality of drivers DRV arranged in the display area DA and the pad section 211 may be arranged on the substrate 210. The plurality of signal lines SL may be electrically connected between the plurality of link lines LL and the plurality of drivers DRV. The plurality of link lines LL may electrically connect the plurality of pads PD and the plurality of signal lines SL.

Referring to FIG. 9, the plurality of link lines LL may be arranged in the non-display area NDA, and all or part of each of the plurality of signal lines SL may be arranged in the display area DA.

Each of the plurality of drivers DRV may receive various signals to perform a driving operation through the plurality of link lines LL and the plurality of signal lines SL. Here, the various signals may include various power voltages and various signals required for the driving operation of each of the plurality of drivers DRV.

Figure 10:
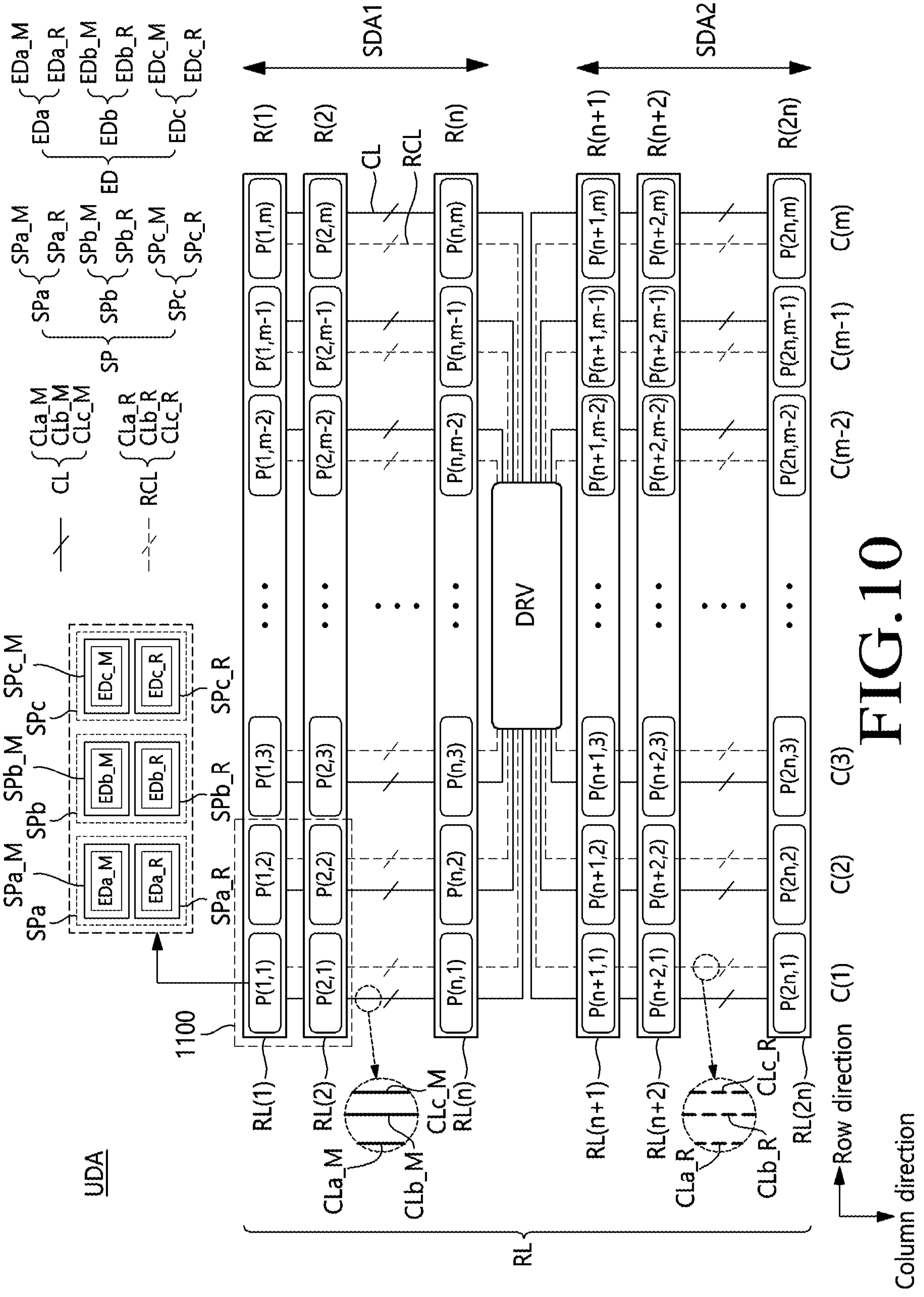
FIG. 10 illustrates a unit driving area of a display panel according to embodiments of the present disclosure.

FIG. 10 illustrates a unit driving area UDA of a display panel 110 according to embodiments of the present disclosure.

Referring to FIG. 10, the display panel 110 according to embodiments of the present disclosure may include a plurality of pixels P, a plurality of row lines RL, and a plurality of column lines CL.

According to the example of FIG. 10, the plurality of pixels P may include pixels P(1, 1), . . . , P(1, m), P(2, 1), . . . , P(2, m), . . . , P(2n, 1), . . . , P(2n, m) of (2n×m) pixels arranged in the unit driving area UDA. The plurality of row lines RL may include 2n row lines RL(1) to RL(2n) arranged in the unit driving area UDA.

Referring to FIG. 10, the display panel 110 according to the embodiments of the present disclosure may include a redundancy structure.

Referring to FIG. 10, according to the redundancy structure, each of the plurality of pixels P may include k main sub-pixels and k redundancy sub-pixels. Each of the k main sub-pixels may include a main light emitting device, and each of the k redundancy sub-pixels may include a redundancy light emitting device. In other words, each of the plurality of pixels P may include k main light emitting devices EDa_M, EDb_M and EDc_M and k redundancy light emitting devices EDa_R, EDb_R and EDc_R.

Referring to FIG. 10, each of the plurality of pixels P(1, 1), . . . , P(1, m), P(2, 1), . . . , P(2, m), . . . , P(2n, 1), . . . , P(2n, m) may include a first sub-pixel SPa, a second sub-pixel SPb, and a third sub-pixel SP.

The first sub-pixel SPa may include a first main sub-pixel SPa_M and a first redundancy sub-pixel SPa_R. The first main sub-pixel SPa_M may include a first main light emitting device EDa_M, and the first redundancy sub-pixel SPa_R may include a first redundancy light emitting device EDa_R.

The first sub-pixel SPa may include a first light emitting device EDa that emits a first color light, and the first light emitting device EDa may include a first main light emitting device EDa_M and a first redundancy light emitting device EDa_R.

The second sub-pixel SPb may include a second main sub-pixel SPb_M and a second redundancy sub-pixel SPb_R. The second main sub-pixel SPb_M may include a second main light emitting device EDb_M, and the second redundancy sub-pixel SPb_R may include a second redundancy light emitting device EDb_R.

The second sub-pixel SPb may include a second light emitting device EDb that emits second color light, and the second light emitting device EDb may include a second main light emitting device EDb_M and a second redundancy light emitting device EDb_R.

The third sub-pixel SPc may include a third main sub-pixel SPc_M and a third redundancy sub-pixel SPc_R. The third main sub-pixel SPc_M may include a third main light emitting device EDc_M, and the third redundancy sub-pixel SPc_R may include a third redundancy light emitting device EDc_R.

The third sub-pixel SPc may include a third light emitting device EDc that emits a third color light, and the third light emitting device EDc may include a third main light emitting device EDc_M and a third redundancy light emitting device EDc_R.

Referring to FIG. 10, the plurality of column lines CL may include a plurality of main column lines CLa_M, CLb_M and CLc_M and a plurality of redundancy column lines CLa_R, CLb_R and CLc_R.

In each of the plurality of columns (i.e., a plurality of pixel columns) included in each of the first sub-driving area (SDA and the second sub-driving area SDA2, k main column lines CLa_M, CLb_M and CLc_M, and k redundancy column lines CLa_R, CLb_R and CLc_R may be arranged.

In each column (i.e., each pixel column), k main column lines CLa_M, CLb_M and CLc_M may be connected to the first electrodes Ecl of k main light emitting devices EDa_M, EDb_M and EDc_M.

In each column (i.e., each pixel column), k redundancy column lines CLa_R, CLb_R and CLc_R may be connected to the first electrodes Ecl of k redundancy light emitting devices EDa_R. EDb_R and EDc_R.

Since this redundancy structure is configurations for repair, the redundancy configurations may be excluded from the display device.

Hereinafter, in order to examine the planar structure of the display panel 110 according to the embodiments of the present disclosure in more detail, it will be described the planar structure of a portion 1100 of the planar view of FIG. 10 in more detail as an example.

Figure 11:
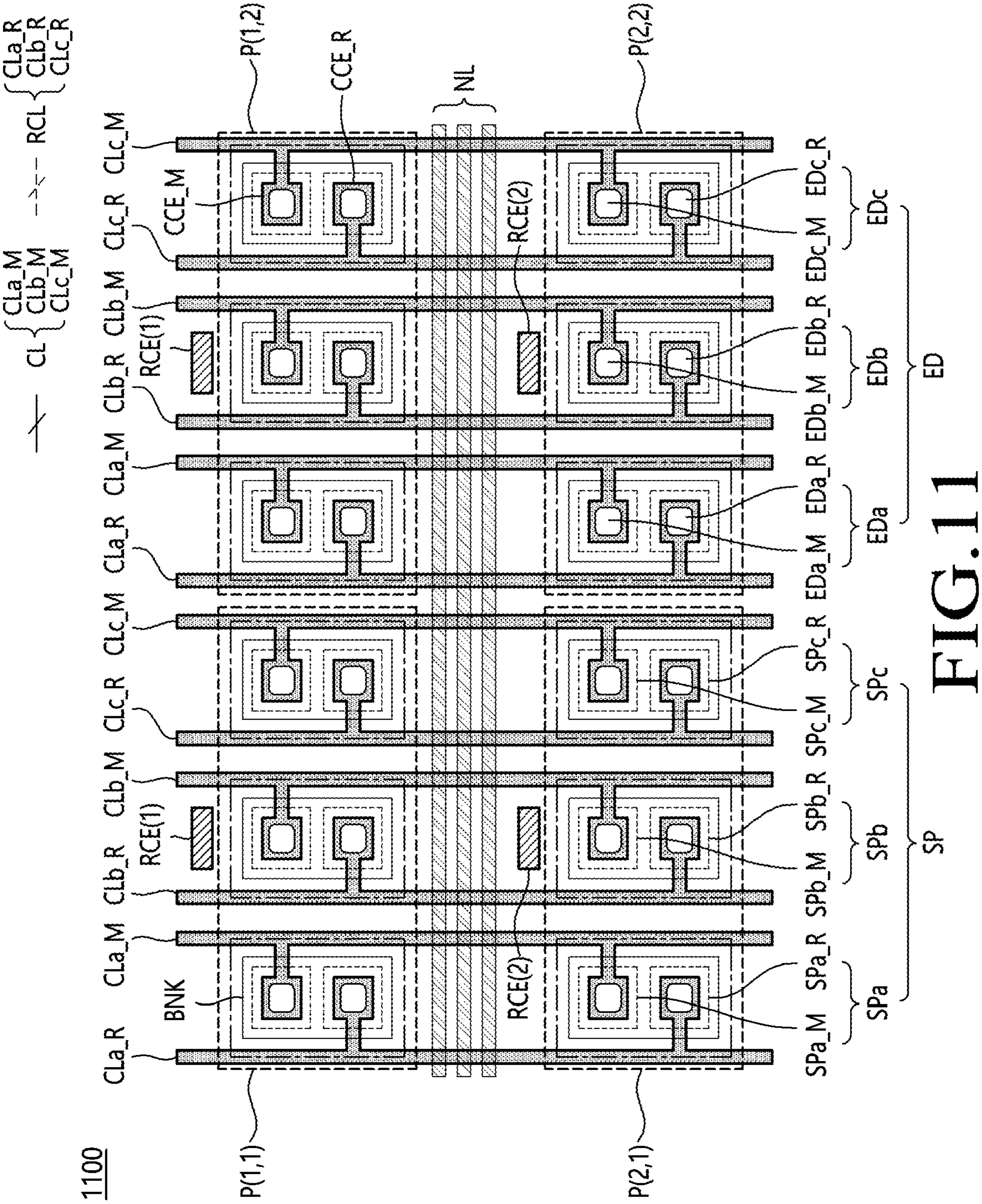
FIG. 11 and FIG. 12 are plan views of a portion of a display panel according to embodiments of the present disclosure.
Figure 12:
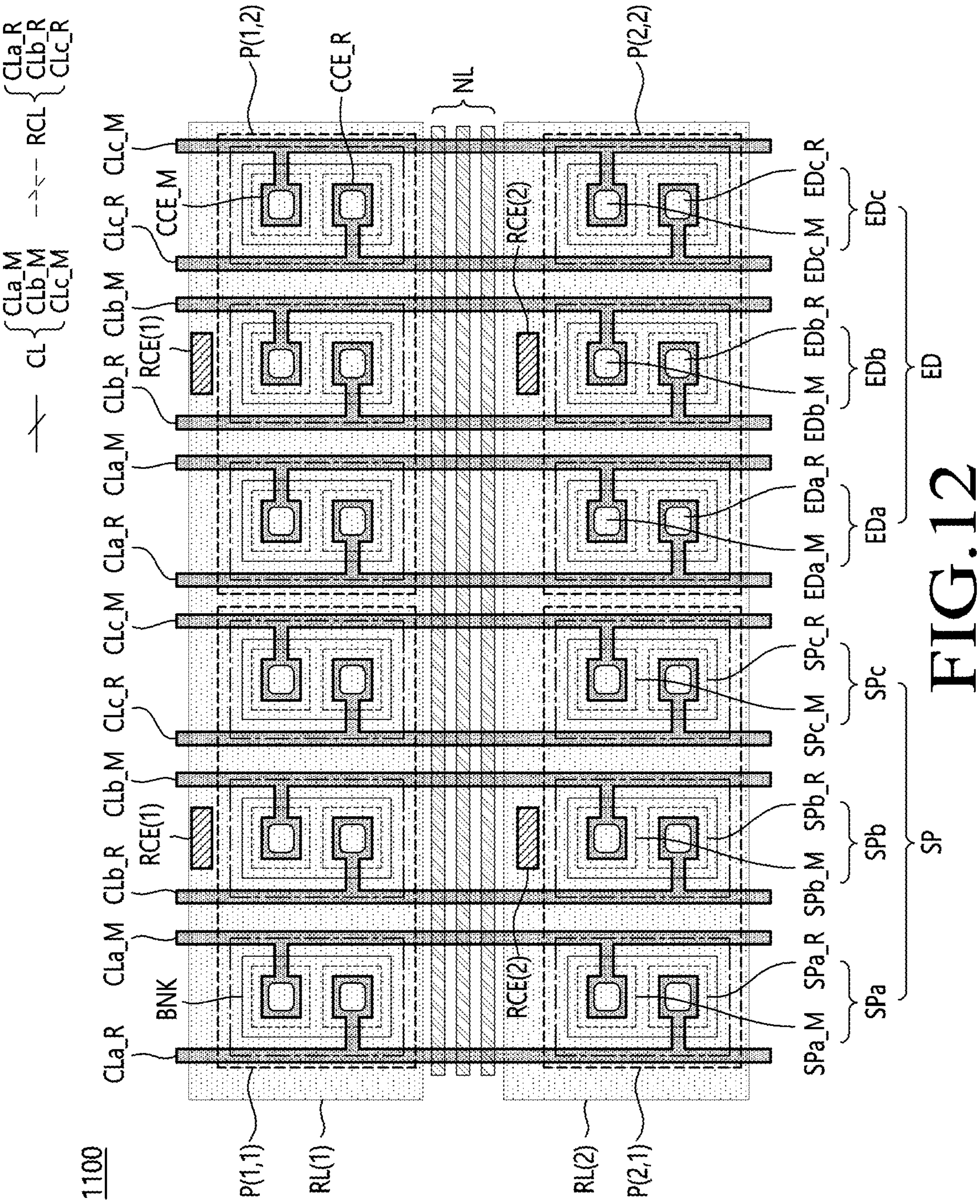

FIG. 11 and FIG. 12 are plan views of a portion 1100 of a display panel 110 according to embodiments of the present disclosure.

FIG. 11 and FIG. 12 are enlarged plan views of a portion 1100 of the plan view of FIG. 10, and are enlarged plan views of a two-row, two-column area 1100.

FIG. 11 is a plan view that does not represent two row lines RL(1) and RL(2) arranged in a two-row, two-column area 1100, and FIG. 12 is a plan view in which two rows and lines RL(1) and RL(2) arranged in a two-row, two-column area 1100 are added to a plan view of FIG. 11.

Referring to FIG. 11 and FIG. 12, in the two-row, two-column area 1100, four pixels P(1, 1), P(1, 2), P(2, 1), P(2, 2) may be arranged in two rows and two columns. That is, in the two-row, two-column area 1100, two pixels P(1, 1) and P(1, 2) may be arranged in a first row (e.g., a first pixel row), and two pixels P(2, 1) and P(2, 2) may be arranged in a second row (e.g., a second pixel row). In addition, two pixels P(1, 1) and P(2, 1) may be arranged in a first column (e.g., a first pixel column), and two pixels P(1, 2) and P(2, 2) may be arranged in a second column (e.g., a second pixel column).

Referring to FIG. 11 and FIG. 12, in the two-row, two-column area 1100, each of the four pixels P(1, 1), P(1, 2), P(2, 1) and P(2, 2) arranged in two rows and two columns may include k sub-pixels. Here, k is the number of sub-pixels included in one pixel.

In FIG. 11 and FIG. 12, it is exemplified a case where k is 3 is as an example. Accordingly, in the two-row, two-column area 1100, each of the four pixels P(1, 1), P(1, 2), P(2, 1) and P(2, 2) arranged in two rows and two columns may include three sub-pixels SPa, SPb and SPc. In the following description, it may be explained assuming the case where k is 3.

The three sub-pixels may include a first sub-pixel SPa including a first light emitting device EDa that emits a first color light, a second sub-pixel SPb including a second light emitting device EDb that emits a second color light, and a third sub-pixel SPc including a third light emitting device EDc that emits a third color light.

If the display panel 110 according to the embodiments of the present disclosure has a redundancy structure, the sub-pixel redundancy structure is as follows.

The first sub-pixel SPa may include a first main sub-pixel SPa_M including a first main light emitting device EDa_M and a first redundancy sub-pixel SPa_R including a first redundancy light emitting device EDa_R, the second sub-pixel SPb may include a second main sub-pixel SPb_M including a second main light emitting device EDb_M and a second redundancy sub-pixel SPb_R including a second redundancy light emitting device EDb_R, and the third sub-pixel SPc may include a third main sub-pixel SPc_M including a third main light emitting device EDc_M and a third redundancy sub-pixel SPc_R including a third redundancy light emitting device EDc_R.

If the display panel 110 according to the embodiments of the present disclosure has a redundancy structure, the light emitting device redundancy structure is as follows.

The first light emitting device EDa may include a first main light emitting device EDa_M that emits a first color light and a first redundancy light emitting device EDa_R that emits a first color light, the second light emitting device EDb may include a second main light emitting device EDb_M that emits a second color light and a second redundancy light emitting device EDb_R that emits a second color light, and the third light emitting device EDb may include a third main light emitting device EDc_M that emits a third color light and a third redundancy light emitting device EDc_R that emits a third color light.

Referring to FIG. 11 and FIG. 12, in the two-row, two-column area 1100, a first row line RL(1) and a second row line RL(2) may be arranged. The first row line RL(1) may be arranged in the first row (i.e., the first pixel row), and the second row line RL(2) may be arranged in the second row (i.e., the second pixel row).

The first row line RL(1) may correspond to two pixels P(1, 1) and P(1, 2) arranged in the first row (or the first pixel row), and may correspond to three sub-pixels SPa, SPb and SPc included in each of the two pixels P(1, 1) and P(1, 2) arranged in the first row (or the first pixel row).

In terms of the sub-pixel redundancy structure, the first row line RL(1) may be connected to the first main sub-pixel SPa_M, the first redundancy sub-pixel SPa_R, the second main sub-pixel SPb_M, the second redundancy sub-pixel SPb_R, the third main sub-pixel SPc_M, and the third redundancy sub-pixel SPc_R arranged in the first row (or the first pixel row).

At least a portion of the first row line RL(1) may overlap with the first main sub-pixel SPa_M, the first redundancy sub-pixel SPa_R, the second main sub-pixel SPb_M, the second redundancy sub-pixel SPb_R, the third main sub-pixel SPc_M, and the third redundancy sub-pixel SPc_R arranged in the first row (or the first pixel row).

From the perspective of the light emitting device redundancy structure, the first row line RL(1) may be connected to the second electrode Erl of each of the first main light emitting device EDa_M, the first redundancy light emitting device EDa_R, the second main light emitting device EDb_M, the second redundancy light emitting device EDb_R, the third main light emitting device EDc_M, and the third redundancy light emitting device EDc_R arranged in the first row (or the first pixel row).

At least a part of the first row line RL(1) may overlap with the first main light emitting device EDa_M, the first redundancy light emitting device EDa_R, the second main light emitting device EDb_M, the second redundancy light emitting device EDb_R, the third main light emitting device EDc_M, and the third redundancy light emitting device EDc_R arranged in the first row (or the first pixel row).

The second row line RL(2) may correspond to two pixels P(2, 1) and P(2, 2) arranged in a second row (or the second pixel row), and may correspond to three sub-pixels SPa, SPb and SPc included in each of the two pixels P(2, 1) and P(2, 2) arranged in the second row (or the second pixel row).

In terms of the sub-pixel redundancy structure, the second row line RL(2) may be connected to the first main sub-pixel SPa_M, the first redundancy sub-pixel SPa_R, the second main sub-pixel SPb_M, the second redundancy sub-pixel SPb_R, the third main sub-pixel SPc_M, and the third redundancy sub-pixel SPc_R arranged in the second row (or the second pixel row).

At least a portion of the second row line RL(2) may overlap with the first main sub-pixel SPa_M, the first redundancy sub-pixel SPa_R, the second main sub-pixel SPb_M, the second redundancy sub-pixel SPb_R, the third main sub-pixel SPc_M, and the third redundancy sub-pixel SPc_R arranged in the second row (or the second pixel row).

In terms of the light emitting device redundancy structure, the second row line RL(2) may be connected to the second electrode Erl of each of the first main light emitting device EDa_M, the first redundancy light emitting device EDa_R, the second main light emitting device EDb_M, the second redundancy light emitting device EDb_R, the third main light emitting device EDc_M, and the third redundancy light emitting device EDc_R arranged in the second row (or the second pixel row).

At least a portion of the second row line RL(2) may overlap with the first main light emitting device EDa_M, the first redundancy light emitting device EDa_R, the second main light emitting device EDb_M, the second redundancy light emitting device EDb_R, the third main light emitting device EDc_M, and the third redundancy light emitting device EDc_R arranged in the second row (or the second pixel row).

Referring to FIG. 11 and FIG. 12, a plurality of column lines CL may be arranged in the two-row two-column area 1100. A plurality of column lines CL arranged in a two-row two-column area 1100 may include a plurality of first column lines CL connected to two pixels P(1, 1) and P(2, 1) arranged in a first column (or a first pixel column), and a plurality of second column lines CL connected to two pixels P(1, 2) and P(2, 2) arranged in a second column (or a second pixel column).

Referring to FIGS. 11 and 12, from the perspective of sub-pixel redundancy, a plurality of first column lines CL arranged in a first column (or first pixel column) may include a first main column line CLa_M that is commonly connected to a first main sub-pixel SPa_M included in each of two pixels P(1, 1) and P(2, 1) arranged in the first column (or first pixel column), and a first redundancy column line CLa_R that is commonly connected to a first redundancy sub-pixel SPa_R included in each of two pixels P(1, 1) and P(2, 1) arranged in the first column (or first pixel column).

The first main sub-pixel SPa_M included in each of the two pixels P(1, 1) and P(2, 1) arranged in the first column (or the first pixel column) may include a first main light emitting device EDa_M, and the first redundancy sub-pixel SPa_R included in each of the two pixels P(1, 1) and P(2, 1) arranged in the first column (or the first pixel column) may include a first redundancy light emitting device (EDa_R).

The first main column line CLa_M arranged in the first column (or the first pixel column) may be commonly connected to the first electrodes Ecl of the two first main light emitting devices EDa_M arranged in the first column (or the first pixel column).

The first redundancy column line CLa_R arranged in the first column (or the first pixel column) may be commonly connected to the first electrodes Ecl of two first redundancy light emitting devices EDa_R arranged in the first column (or the first pixel column).

In addition, the plurality of first column lines CL arranged in the first column (or the first pixel column) may further include a second main column line CLb_M commonly connected to a second main sub-pixel SPb_M included in each of the two pixels P(1, 1) and P(2, 1) arranged in the first column (or the first pixel column), and a second redundancy column line CLb_R commonly connected to a second redundancy sub-pixel SPb_R included in each of the two pixels P(1, 1) and P(2, 1) arranged in the first column (or the first pixel column).

The second main sub-pixel SPb_M included in each of the two pixels P(1, 1) and P(2, 1) arranged in the first column (or the first pixel column) may include a second main light emitting device EDb_M, and the second redundancy sub-pixel SPb_R included in each of the two pixels P(1, 1) and P(2, 1) arranged in the first column (or the first pixel column) may include a second redundancy light emitting device EDb_R.

The second main column line CLb_M arranged in the first column (or the first pixel column) may be commonly connected to the first electrodes Ecl of the two second main light emitting devices EDb_M arranged in the first column (or the first pixel column).

The second redundancy column line CLb_R arranged in the first column (or the first pixel column) may be commonly connected to the first electrodes Ecl of the two second redundancy light emitting devices EDb_R arranged in the first column (or the first pixel column).

In addition, the plurality of first column lines CL arranged in the first column (or the first pixel column) may further include a third main column line CLc_M commonly connected to the third main sub-pixel SPc_M included in each of the two pixels P(1, 1) and P(2, 1) arranged in the first column (or the first pixel column), and a third redundancy column line CLc_R commonly connected to the third redundancy sub-pixel SPc_R included in each of the two pixels P(1, 1) and P(2, 1) arranged in the first column (or the first pixel column).

The third main sub-pixel SPc_M included in each of the two pixels P(1, 1) and P(2, 1) arranged in the first column (or the first pixel column) may include a third main light emitting device EDc_M, and the third redundancy sub-pixel SPc_R included in each of the two pixels P(1, 1) and P(2, 1) arranged in the first column (or the first pixel column) may include a third redundancy light emitting device EDc_R.

The third main column line CLc_M arranged in the first column (or the first pixel column) may be commonly connected to the first electrodes Ecl of the two third main light emitting devices EDc_M arranged in the first column (or the first pixel column).

The third redundancy column line CLc_R arranged in the first column (or the first pixel column) may be commonly connected to the first electrodes Ecl of two third redundancy light emitting devices EDc_R arranged in the first column (or the first pixel column).

Referring to FIGS. 11 and 12, from the perspective of sub-pixel redundancy, a plurality of second column lines CL arranged in a second column (or second pixel column) may include a first main column line CLa_M that is commonly connected to a first main sub-pixel SPa_M included in each of two pixels P(1, 2) and P(2, 2) arranged in the second column (or second pixel column), and a first redundancy column line CLa_R that is commonly connected to a first redundancy sub-pixel SPa_R included in each of two pixels P(1, 2) and P(2, 2) arranged in the second column (or second pixel column).

The first main sub-pixel SPa_M included in each of the two pixels P(1, 2) and P(2, 2) arranged in the second column (or the second pixel column) may include a first main light emitting device EDa_M, and the first redundancy sub-pixel SPa_R included in each of the two pixels P(1, 2) and P(2, 2) arranged in the second column (or the second pixel column) may include a first redundancy light emitting device EDa_R.

The first main column line CLa_M arranged in the second column (or the second pixel column) may be commonly connected to the first electrodes Ecl of the two first main light emitting devices EDa_M arranged in the second column (or the second pixel column).

The first redundancy column line CLa_R arranged in the second column (or the second pixel column) may be commonly connected to the first electrodes Ecl of the two first redundancy light emitting devices EDa_R arranged in the second column (or the second pixel column).

In addition, the plurality of second column lines CL arranged in the second column (second pixel column) may further include a second main column line CLb_M commonly connected to a second main sub-pixel SPb_M included in each of two pixels P(1, 2) and P(2, 2) arranged in the second column (or second pixel column), and a second redundancy column line CLb_R commonly connected to a second redundancy sub-pixel SPb_R included in each of two pixels P(1, 2) and P(2, 2) arranged in the second column (or second pixel column).

The second main sub-pixel SPb_M included in each of the two pixels P(1, 2) and P(2, 2) arranged in the second column (or the second pixel column) may include a second main light emitting device EDb_M, and the second redundancy sub-pixel SPb_R included in each of the two pixels P(1, 2) and P(2, 2) arranged in the second column (or the second pixel column) may include a second redundancy light emitting device EDb_R.

The second main column line CLb_M arranged in the second column (or the second pixel column) may be commonly connected to the first electrodes Ecl of the two second main light emitting devices EDb_M arranged in the second column (or the second pixel column).

The second redundancy column line CLb_R arranged in the second column (or the second pixel column) may be commonly connected to the first electrodes Ecl of two second redundancy light emitting devices EDb_R arranged in the second column (or the second pixel column).

In addition, the plurality of first column lines CL arranged in the second column (or the second pixel column) may further include a third main column line CLc_M commonly connected to a third main sub-pixel SPc_M included in each of two pixels P(1, 2) and P(2, 2) arranged in the second column (or the second pixel column), and a third redundancy column line CLc_R commonly connected to a third redundancy sub-pixel SPc_R included in each of two pixels P(1, 2) and P(2, 2) arranged in the second column (or the second pixel column).

The third main sub-pixel SPc_M included in each of the two pixels P(1, 2) and P(2, 2) arranged in the second column (or the second pixel column) may include a third main light emitting device EDc_M, and the third redundancy sub-pixel SPc_R included in each of the two pixels P(1, 2) and P(2, 2) arranged in the second column (or the second pixel column) may include a third redundancy light emitting device EDc_R.

The third main column line CLc_M arranged in the second column (or the second pixel column) may be commonly connected to the first electrodes Ecl of the two third main light emitting devices EDc_M arranged in the second column (or the second pixel column).

The third redundancy column line CLc_R arranged in the second column (or the second pixel column) may be commonly connected to the first electrodes Ecl of two third redundancy light emitting devices EDc_R arranged in the second column (or the second pixel column).

Referring to FIGS. 11 and 12, in each of the first column (or the first pixel column) and the second column (or the second pixel column), each of the plurality of column lines CL may include at least one column connection electrode having a shape protruding above a bank BNK. For example, the at least one column connection electrode may be an electrode electrically connected to each of the plurality of column lines CL or a portion protruding from each of the plurality of column lines C.

Referring to FIGS. 11 and 12, each of the first main column line CLa_M, the second main column line CLb_M, and the third main column line CLc_M may include a main column connection electrode CCE_M protruding above the bank BNK and extending above the bank BNK.

The first main light emitting devices EDa_M, the second main light emitting devices EDb_M, and the third main light emitting devices EDc_M may be arranged on the main column connection electrodes CCE_M arranged to extend above the bank BNK.

Referring to FIGS. 11 and 12, in each of the first column (or first pixel column) and the second column (or second pixel column), each of the first redundancy column line CLa_R, the second redundancy column line CLb_R. and the third redundancy column line CLc_R may include a redundancy column connection electrode CCE_R that protrudes toward the bank BNK and extends above the bank BNK.

On the redundancy column connection electrodes CCE_R arranged to extend above the bank BNK, the first redundancy light emitting devices EDa_R, the second redundancy light emitting devices EDb_R, and the third redundancy light emitting devices EDc_R may be arranged.

The main column connection electrodes CCE_M and the redundancy column connection electrodes CCE_R arranged in the first column (or the first pixel column) may be disposed between the first main column line CLa_M and the first redundancy column line CLa_R.

The main column connection electrodes CCE_M and the redundancy column connection electrodes CCE_R arranged in the second column (or the second pixel column) may be disposed between the second main column line CLb_M and the second redundancy column line CLb_R.

The main column connection electrodes CCE_M and the redundancy column connection electrodes CCE_R arranged in the third column (or the third pixel column) may be disposed between the third main column line CLc_M and the third redundancy column line CLc_R.

The display panel 110 according to the embodiments of the present disclosure may further include at least one row connection electrode for electrically connecting each of the plurality of row lines RL to the driver DRV.

Referring to FIGS. 11 and 12, the display panel 110 according to the embodiments of the present disclosure may further include at least one first row connection electrode RCE(1) connected to a first row line RL(1) arranged in a first row (or a first pixel row), and at least one second row connection electrode RCE(2) connected to a second row line RL(2) arranged in a second row (or a second pixel row).

The first row line RL(1) may be vertically overlapped with at least one first row connection electrode RCE(1), and the second row line RL(2) may be vertically overlapped with at least one second row connection electrode RCE(2).

The first row line RL(1) may be electrically connected to the row driver R-DRV of the corresponding driver DRV through at least one first row connection electrode RCE(1). The second row line RL(2) may be electrically connected to the row driver R-DR of the corresponding driver DRV through at least one second row connection electrode RCE (2).

The bank BNK of the first main sub-pixel SPa_M and the bank BNK of the first redundancy sub-pixel SPa_R may be connected to each other, or may be formed spaced apart from each other or separately. For example, considering the design of the transfer process requirements, the bank BNK of the first main sub-pixel SPa_M and the bank BNK of the first redundancy sub-pixel SPa_R, in which light emitting devices EDa_M, EDa_R of the same type (for example, types that emit the same color light) are arranged, may be connected to each other, or may be formed spaced apart from each other or separately. In addition, the bank BNK of the second main sub-pixel SPb_M and the bank BNK of the second redundancy sub-pixel SPb_R may be connected to each other, or may be formed spaced apart from each other or separately. The bank BNK of the third main sub-pixel SPc_M and the bank BNK of the third redundancy sub-pixel SPc_R may be connected to each other, or may be formed to be spaced apart from each other or separated from each other.

The bank BNK of the first main sub-pixel SPa_M and the first redundancy sub-pixel SPa_R, the bank BNK of the second main sub-pixel SPb_M and the second redundancy sub-pixel SPb_R, and the bank BNK of the third main sub-pixel SPc_M and the third redundancy sub-pixel SPc_R may be formed in various ways, and the embodiments of the present disclosure are not limited thereto.

Referring to FIG. 11 and FIG. 12, the display panel 110 according to the embodiments of the present disclosure may further include a plurality of communication lines NL. The plurality of communication lines NL may be arranged so as not to overlap with the metal layer in a vertical direction. For example, a plurality of communication lines NL may be arranged between a first row line RL(1) and a second row line RL(2).

Referring to FIG. 11, the first row line RL(1) may be arranged above a plurality of light emitting devices arranged in the first row (or the first pixel row) and may be arranged in a bar shape overlapping with all of the plurality of light emitting devices arranged in the first row (or the first pixel row).

The second row line RL(2) may be arranged above the plurality of light emitting devices arranged in the second row (or the second pixel row), and may be arranged in a bar shape overlapping with all of the plurality of light emitting devices arranged in the second row (or the second pixel row).

Figure 13:
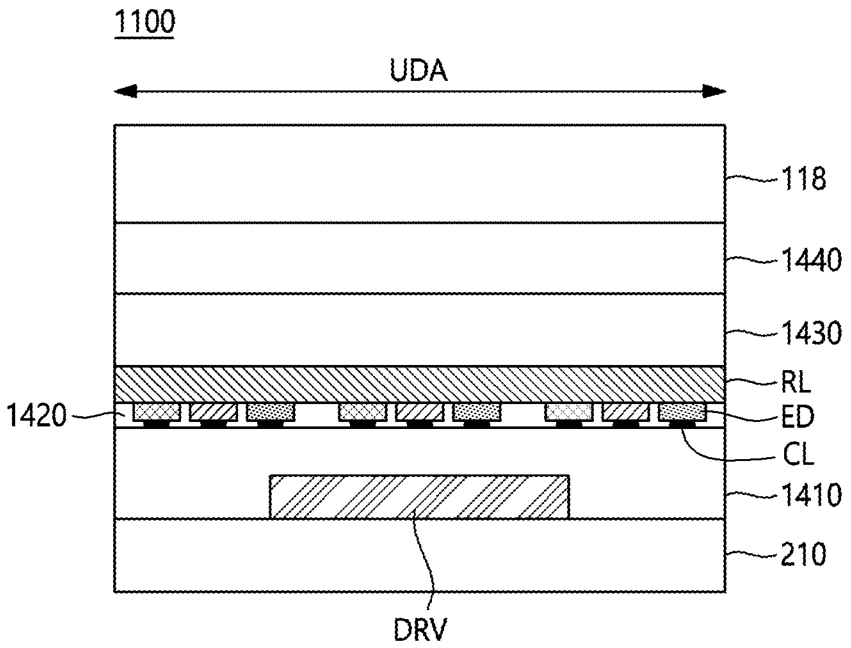
FIG. 13 is a cross-sectional view of a display panel according to embodiments of the present disclosure.

FIG. 13 is a cross-sectional view of a display panel 110 according to embodiments of the present disclosure. However, FIG. 13 is a cross-sectional view of a portion of a unit driving area UDA in which one driver DRV is arranged.

Referring to FIG. 13, a display panel 110 according to embodiments of the present disclosure may include a substrate 210, a driver DRV on the substrate 210, a layer stack 1410 on the driver DRV, a plurality of light emitting devices ED disposed on the layer stack 1410, an optical layer 1420 disposed on the layer stack 1410 and between the plurality of light emitting devices ED, an overcoat layer 1430 disposed on the plurality of light emitting devices ED and the optical layer 1420, an adhesive layer 1440 disposed on the overcoat layer 1430, and a cover member 118 disposed on the adhesive layer 1440.

Referring to FIG. 13, a plurality of column lines CL may be arranged on a layer stack 1410. Each of the plurality of column lines CL may be arranged between the layer stack 1410 and a light emitting device ED. A plurality of row lines RL may be arranged on a plurality of light emitting devices ED and an optical layer 1420.

A display panel 110 according to embodiments of the present disclosure may include a substrate 210 including a display area DA, a plurality of light emitting devices ED arranged in the display area DA, a plurality of column lines CL electrically connected to first electrodes Ecl of each of the plurality of light emitting devices ED, a plurality of row lines RL electrically connected to second electrodes Erl of each of the plurality of light emitting devices ED, and a plurality of drivers DRV configured to drive the plurality of light emitting devices ED, the plurality of column lines CL, and the plurality of row lines RL.

A plurality of drivers DRV may be disposed in the display area DA, and may be positioned closer to the substrate 210 than the plurality of light emitting devices ED.

The layer stack 1410 may include a plurality of insulating layers. The plurality of insulating layers may include a plurality of organic layers. At least one of the plurality of organic layers may be arranged on a side of the driver DRV. For example, two or more organic layers may be arranged on a side of the driver DRV.

The layer stack 1410 may further include at least one metal layer connecting the driver DRV and the column line CL, and at least one metal layer connecting the driver DRV and the row line RL.

Figure 14:
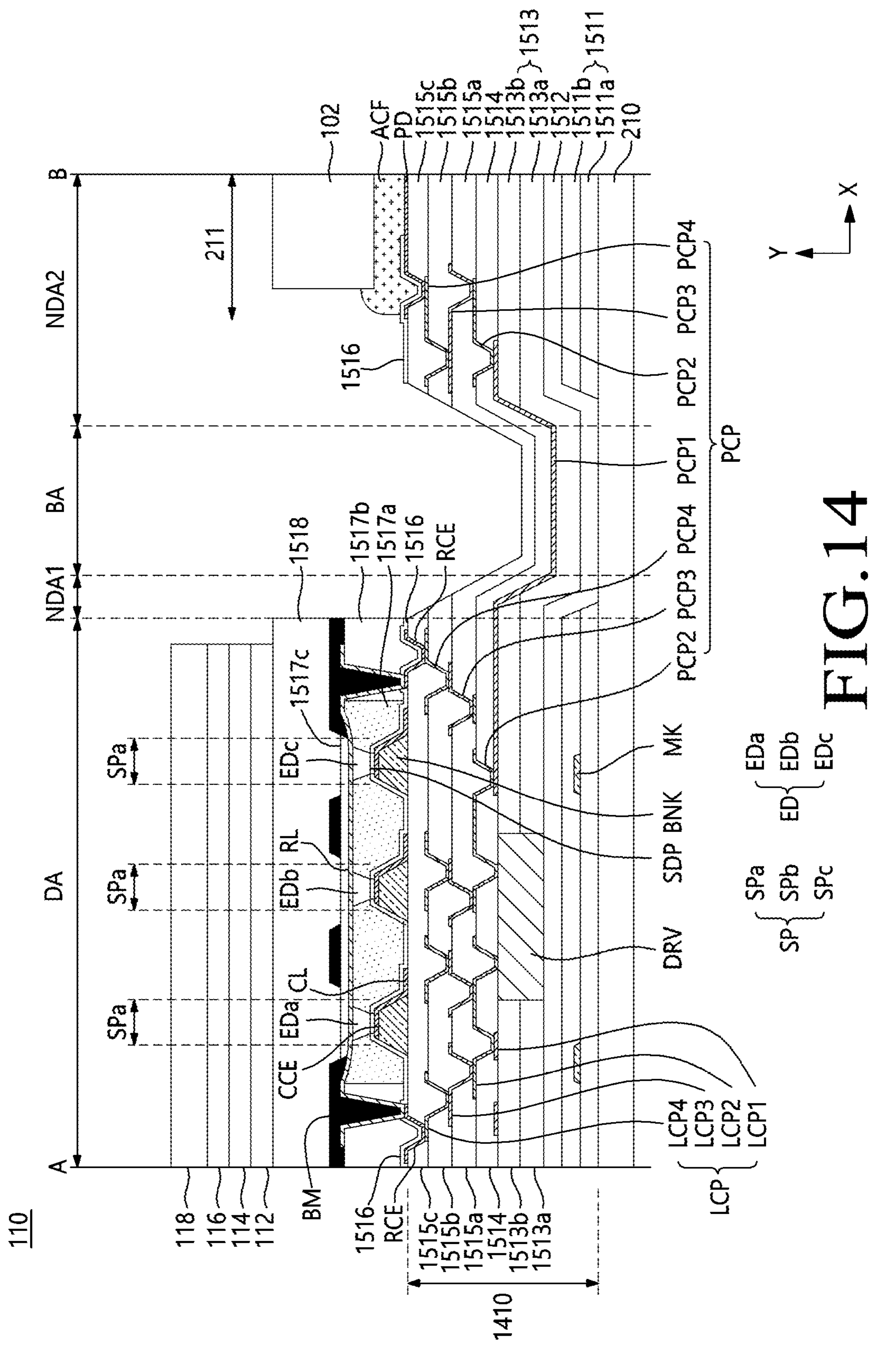
FIG. 14 is a detailed cross-sectional view of a display panel according to embodiments of the present disclosure, taken along the A-B cutting line of FIG. 10.
Figure 15:
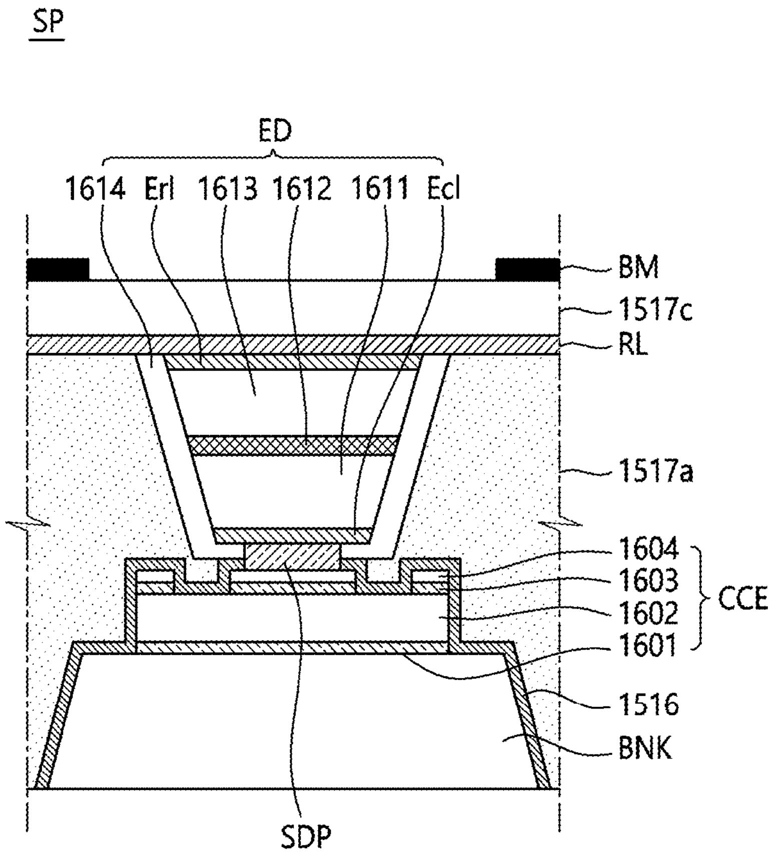
FIG. 15 is an enlarged cross-sectional view of a first sub-pixel of a display panel according to embodiments of the present disclosure.

FIG. 14 is a detailed cross-sectional view of a display panel 110 according to embodiments of the present disclosure taken along the A-B cutting line of FIG. 9, and FIG. 15 is an enlarged cross-sectional view of a sub-pixel SP of a display panel 110 according to embodiments of the present disclosure. However, FIG. 14 is a cross-sectional view of a display area DA, a first non-display area NDA, a bending area BA, and a second non-display area NDA.

Meanwhile, for convenience of illustration, the A-B cutting line in FIG. 10 is illustrated as not overlapping with a signal line SL and a link line LL, but the A-B cutting line in FIG. 9 is intended to indicate the same position as the adjacent signal line SL and the link line LL.

Referring to FIG. 14, a buffer layer 1511 may be included on the substrate 210. The buffer layer 1511 may include a first buffer layer **1511*a* and a second buffer layer 1511*b*. The first buffer layer 1511*a* and the second buffer layer 1511*b* may be arranged in the display area DA, the first non-display area NDA1**, and the second non-display area NDA, and may not be arranged in the entirety or part of the bending area BA. However, the present disclosure is not limited thereto.

The first buffer layer **1511*a* and the second buffer layer 1511*b* may reduce the penetration of moisture or impurities through the substrate 210. The first buffer layer 1511*a* and the second buffer layer 1511*b* may be made of an inorganic insulating material. For example, the first buffer layer 1511*a* and the second buffer layer 1511*b*** may be composed of a single layer or multiple layers of silicon oxide (SiOx) or silicon nitride (SiNx), but the embodiments of the present disclosure are not limited thereto.

For example, a portion of the first buffer layer **1511*a* and the second buffer layer 1511*b* on the bending area BA may be removed. The upper surface of the substrate 210 located on the bending area BA may be exposed by the area (e.g., opening) where the first buffer layer 1511*a* and the second buffer layer 1511*b*** are removed.

By removing the first buffer layer **1511*a* and the second buffer layer 1511*b* from the bending area BA, it is possible to minimize an occurrence of cracks in the first buffer layer 1511*a* and the second buffer layer 1511*b*** that may occur during bending.

A plurality of alignment keys MK may be arranged between the first buffer layer **1511*a* and the second buffer layer 1511*b*. The plurality of alignment keys MK may be configured to identify the position of the driver DRV during the manufacturing process of the display panel 110. For example, the plurality of alignment keys MK may be configured to align the position of the driver DRV transferred on the adhesive layer 1512**. In another example, the plurality of alignment keys MK may be omitted.

An adhesive layer 1512 may be disposed on the second buffer layer **1511*b*. The adhesive layer 1512 may be disposed in the display area DA, the first non-display area NDA1, the bending area BA, and the second non-display area NDA2. For another example, at least a portion of the adhesive layer 1512 may be removed in the non-display area NDA including the bending area BA. For example, the adhesive layer 1512** may be made of any one of an adhesive polymer, an epoxy resin, a UV-curable resin, a polyimide series, an acrylate series, a urethane series, and a polydimethylsiloxane (PDMS), but the embodiments of the present disclosure are not limited thereto.

A driver DRV may be disposed on the adhesive layer 1512 in the display area DA. If the driver DRV is implemented as a driving chip (e.g., driver integrated circuit), the driving driver may be mounted on the adhesive layer 1512 by a transfer process, but the embodiments of the present disclosure are not limited thereto.

The display panel 110 may further include a side protection layer 1513 disposed on the side of the plurality of drivers DRV, and an upper protection layer 1514 disposed on the plurality of drivers DRV and the side protection layer 1513.

According to embodiments of the present disclosure, in the display area DA, a plurality of line connection patterns LCP may be arranged on the second protection layer 1513*b*. The plurality of line connection patterns LCP may be wiring for electrically connecting the driver DRV to other components. For example, the driver DRV may be electrically connected to a plurality of column lines CL, a plurality of row lines RL, and a plurality of row connection electrodes RCE through the plurality of line connection patterns LCP.

For example, the plurality of line connection patterns LCP may include a first line connection pattern LCP1, a second line connection pattern LCP2, a third line connection pattern LCP3, and a fourth line connection pattern LCP4, but the embodiments of the present disclosure are not limited thereto. For example, the first line connection pattern LCP1, the second line connection pattern LCP2, the third line connection pattern LCP3, and the fourth line connection pattern LCP4 may be arranged in different metal layers.

For example, a plurality of first line connection patterns LCP1 may be arranged on the second protection layer 1513*b*. The plurality of first line connection patterns LCP1 may be electrically connected to the driver DRV. The plurality of first line connection patterns LCP1 may transmit the voltage output from the driver DRV to the column line CL or the row line RL.

The display panel 110 may further include a side protection layer 1513 including at least one of the first protection layer 1513*a* and the second protection layer 1513*b*, and an upper protection layer 1514 arranged on the plurality of drivers DRV. For example, the upper protection layer 1514 may include a third protection layer 1514, and in some cases, may further include at least one additional protection layer. The third protection layer 1514 may be disposed on the second protection layer 1513*b* and the plurality of first line connection patterns LCP1. The third protection layer 1514 may be disposed entirely in the display area DA and the non-display area NDA. In the bending area BA, the third protection layer 1514 may cover or enclose the side surface of the second protection layer 1513*b* and the upper surface of the first protection layer 1513*a*.

A plurality of second line connection patterns LCP2 may be arranged on the third protection layer 1514. The plurality of second line connection patterns LCP2 may be electrically connected or directly connected to the driver DRV. For example, some of the second line connection patterns LCP2 may be directly or indirectly connected to the driver DRV through contact holes of the third protection layer 1514. Other parts of the second line connection patterns LCP2 may be electrically connected to the first line connection pattern LCP1 through contact holes of the third protection layer 1514. However, the embodiments of the present disclosure are not limited thereto. The voltage output from the driver DRV may be transmitted to the column line CL or the row line RL through the plurality of second line connection patterns LCP2 and other connection patterns.

A first insulating layer 1515*a* may be disposed on the plurality of second line connection patterns LCP2. The first insulating layer 1515*a* may be disposed entirely over the display area DA and the non-display area NDA, but the embodiments of the present disclosure are not limited thereto. The first insulating layer 1515*a* may be composed of an organic insulating material, but the embodiments of the present disclosure are not limited thereto. For example, the first insulating layer 1515*a* may be composed of a photo resist, a polyimide (PI), or a photo acryl-based material, but the embodiments of the present disclosure are not limited thereto.

A plurality of third line connection patterns LCP3 may be disposed on the first insulating layer 1515*a*. The plurality of third line connection patterns LCP3 may be electrically connected to the plurality of second line connection patterns LCP2. For example, the third line connection pattern LCP3 may be electrically connected to the second line connection pattern LCP2 through a contact hole of the first insulating layer 1515*a*.

A second insulating layer 1515*b* may be disposed on a plurality of third line connection patterns LCP3. The second insulating layer 1515*b* may be disposed in the display area DA, the first non-display area NDA1, and the second non-display area NDA2, and may not be disposed in the entirety or part of the bending area BA, but the embodiments of the present disclosure are not limited thereto. For example, the second insulating layer 1515*b* may be removed from the entirety or part of the bending area BA. The second insulating layer 1515*b* may be composed of an organic insulating material, but the embodiments of the present disclosure are not limited thereto.

A plurality of fourth line connection patterns LCP4 may be arranged on the second insulating layer 1515*b*. The plurality of fourth line connection patterns LCP4 may be electrically connected to a plurality of third line connection patterns LCP3. For example, the fourth line connection patterns LCP4 may be electrically connected to the third line connection patterns LCP3 through a contact hole of the second insulating layer 1515*b*.

Referring to FIG. 14, according to the embodiments of the present disclosure, in the non-display area NDA, a plurality of pad connection patterns PCP may be arranged on the second protection layer 1513*b*. A plurality of pad connection patterns PCPs may be wiring for transmitting a signal transmitted from a flexible printed circuit 102 to a pad section 211 to a driver DRV of a display area DA.

The plurality of first pad connection patterns PCP1 may be arranged on the second protection layer 1513*b*. Each of the plurality of first pad connection patterns PCP1 may be arranged across the second non-display area NDA2, the bending area BA, and the first non-display area NDA1. Each of the plurality of first pad connection patterns PCP1 may include a first portion arranged in the bending area BA, a second portion extending from the first portion to the first non-display area NDA1, and a third portion extending from the first portion to the second non-display area NDA2. Each of the plurality of first pad connection patterns PCP1 may extend from the first non-display area NDA1 to a portion of the display area DA. The plurality of first pad connection patterns PCP1 may transmit a signal transmitted from the flexible printed circuit 102 to the pad portion 211 to the driver DRV of the display area DA.

Each of the plurality of first pad connection patterns PCP1 may be electrically connected to the pad PD of the pad section 211 through connection patterns arranged in the second non-display area NDA2. Here, the connection patterns electrically connecting each of the plurality of first pad connection patterns PCP1 to the pad PD may include at least one of the second pad connection pattern PCP2, the third pad connection pattern PCP3, and the fourth pad connection pattern PCP4 arranged in the second non-display area NDA2.

Each of the plurality of first pad connection patterns PCP1 may be electrically connected to the driver DRV through connection patterns arranged in the display area DA. Here, the connection patterns electrically connecting each of the plurality of first pad connection patterns PCP1 to the driver DRV may include at least one of the second pad connection pattern PCP2, the third pad connection pattern PCP3, and the fourth pad connection pattern PCP4 arranged in the display area DA.

The plurality of second pad connection patterns PCP2 may be arranged on the third protection layer 1514. The plurality of second pad connection patterns PCP2 may be arranged in the second non-display area NDA2. The second pad connection pattern PCP2 may be electrically connected to the first pad connection pattern PCP1 through a contact hole of the third protection layer 1514. Therefore, the signal supplied from the flexible printed circuit 102 can be transmitted to the first pad connection pattern PCP1 through the second pad connection pattern PCP.

The third pad connection pattern PCP3 may be arranged on the first insulating layer 1515*a*. The third pad connection pattern PCP3 may be arranged in the second non-display area NDA2. The third pad connection pattern PCP3 may be electrically connected to the second pad connection pattern PCP2 through a contact hole of the first insulating layer 1515*a*. Therefore, the signal supplied from the flexible printed circuit 102 can be transmitted to the second pad connection pattern PCP2 through the third pad connection pattern PCP3, and the signal transmitted to the second pad connection pattern PCP2 can be transmitted again to the first pad connection pattern PCP1.

The fourth pad connection pattern PCP4 may be arranged on the second insulating layer 1515*b*. The fourth pad connection pattern PCP4 may be arranged in the second non-display area NDA2. The fourth pad connection pattern PCP4 may be electrically connected to the third pad connection pattern PCP3 through a contact hole of the second insulating layer 1515*b*. The pad PD of the pad section 211 may be electrically connected to the fourth pad connection pattern PCP4 through a contact hole of the third insulating layer 1515*c*.

A signal supplied from a flexible printed circuit 102 is input to a pad PD of a pad section 211, and a signal input to the pad PD is transmitted to a third pad connection pattern PCP3 through a fourth pad connection pattern PCP4, and a signal transmitted to the third pad connection pattern PCP3 can be transmitted again to a first pad connection pattern PCP1 through a second pad connection pattern PCP2. A signal transmitted to the first pad connection pattern PCP1 can be transmitted to a driver DRV through connection patterns arranged in a display area DA.

Referring to FIG. 14, a plurality of line connection patterns LCP and a plurality of pad connection patterns PCP may be arranged in various metal layers. The plurality of line connection patterns LCP and the plurality of pad connection patterns PCP may be formed of any one of a conductive material having excellent ductility or various conductive materials used in a display area DA.

A third insulating layer 1515*c* may be disposed on the plurality of line connection patterns LCP and the plurality of pad connection patterns PCP. The third insulating layer 1515*c* is disposed in the display area DA, the first non-display area NDA1, and the second non-display area NDA2, and may be disposed in all or part of the bending area BA, but the embodiments of the present disclosure are not limited thereto. In the bending area BA, a part of the third insulating layer 1515*c* may be removed. The third insulating layer 1515*c* may be composed of an organic insulating material, but the embodiments of the present disclosure are not limited thereto.

A plurality of banks BNK may be disposed on the third insulating layer 1515*c* in the display area DA. The plurality of banks BNKs may be arranged to overlap with at least a portion of each of the plurality of sub-pixels SPa, SPb and SPc. For example, the first sub-pixel SPa may include a first light emitting device EDa that emits a first color light, the second sub-pixel SPb may include a second light emitting device EDb that emits a second color light, and the third sub-pixel SPc may include a third light emitting device EDc that emits a third color light.

As an example, one light emitting device ED may be arranged on top of each of the plurality of banks BNKs. As another example, two or more light emitting devices ED may be arranged on top of each of the plurality of banks BNK. The two or more light emitting devices EDs arranged on top of each of the plurality of banks BNK may be light emitting devices of the same type.

In the display area DA, a plurality of row connection electrodes RCE may be arranged on the third insulating layer 1515*c*. The plurality of row connection electrodes RCE may transfer a low-potential voltage VSS output from the driver DRV to the row line RL.

In the display area DA, a plurality of column lines CL may be arranged on the third insulating layer 1515*c*. The plurality of column lines CL may be arranged in an area between the plurality of banks BNK. For example, the plurality of column lines CL may be arranged adjacent to one of the plurality of banks BNK.

Each of the plurality of column lines CL may include a wiring portion and a column connection electrode CCE protruding from the wiring portion. The wiring portion and the column connection electrode CCE included in each of the plurality of column lines CL may be formed integrally or may be different metals that are electrically connected.

For example, each of the plurality of column lines CL may include a column connection electrode CCE that is a portion protruding above an adjacent bank BNK among the plurality of banks BNK. The column connection electrode CCE of each of the plurality of column lines CL may be arranged to extend along the side and upper surface of the bank BNK. The column connection electrode CCE may be an electrode electrically connected to each of the plurality of column lines CL or may be a portion protruding from each of the plurality of column lines CL.

Referring to FIG. 15, the column connection electrode CCE of the column line CL may be composed of one conductive layer or multiple conductive layers. For example, a column connection electrode CCE electrically connected to a column line CL or protruding from the column line CL may include a first conductive layer 1601, a second conductive layer 1602, a third conductive layer 1603, and a fourth conductive layer 1604, but the embodiments of the present disclosure are not limited thereto.

The first conductive layer 1601 may be disposed on a bank BNK. The second conductive layer 1602 may be disposed on the first conductive layer 1601. The third conductive layer 1603 may be disposed on the second conductive layer 1602, and the fourth conductive layer 1604 may be disposed on the third conductive layer 1603.

According to the embodiments of the present disclosure, among the plurality of conductive layers constituting the column connection electrode CCE, some conductive layers having good reflection efficiency may be configured as an alignment key and/or a reflector for aligning the light emitting devices ED. For example, among the plurality of conductive layers constituting the column connection electrode CCE, the second conductive layer 1602 may include a reflective material. For example, the second conductive layer 1602 may include aluminum (Al), but the embodiments of the present disclosure are not limited thereto. Accordingly, the second conductive layer 1602 may be configured as a reflector. In addition, due to the high reflection efficiency of the second conductive layer 1602, it can be easily identified in the manufacturing process, and thus the position or transfer position of the light emitting device ED can be aligned based on the second conductive layer 1602.

For example, in order to configure the second conductive layer 1602 as a reflector, the third conductive layer 1603 and the fourth conductive layer 1604 disposed on the second conductive layer 1602 may be partially removed or etched. For example, a portion of the third conductive layer 1603 and the fourth conductive layer 1604 disposed on the bank BNK may be removed or etched to expose the upper surface of the second conductive layer 1602. That is, the openings of the third conductive layer 1603 and the fourth conductive layer 1604 may overlap with a portion of the upper surface of the second conductive layer 1602. For example, in the third conductive layer 1603 and the fourth conductive layer 1604, the central portion and the edge portion where a solder pattern SDP is arranged may remain, and the remaining portions excluding this portion (e.g., the central portion, the edge portion) may be removed. For example, the edge portion of each of the third conductive layer 1603 made of titanium (Ti) and the fourth conductive layer 1604 made of indium tin oxide (ITO) may not be etched. Accordingly, it is possible to prevent other conductive layers of the column connection electrode CCE of the column line CL from being corroded by the TMAH (Tetra Methyl Ammonium Hydroxide) solution used in the mask process of the column connection electrode CCE.

According to the embodiments of the present disclosure, the first conductive layer 1601 and the third conductive layer 1603 may include titanium (Ti) or molybdenum (Mo). The second conductive layer 1602 may include aluminum (Al). The fourth conductive layer 1604 may include a transparent conductive oxide layer such as indium tin oxide (ITO) or indium zinc oxide (IZO) that has good adhesion to the solder pattern SDP and corrosion resistance and acid resistance. However, the embodiments of the present disclosure are not limited thereto.

The first conductive layer 1601, the second conductive layer 1602, the third conductive layer 1603, and the fourth conductive layer 1604 may be sequentially deposited and then patterned by performing a photolithography process and an etching process, but the embodiments of the present disclosure are not limited thereto.

According to embodiments of the present disclosure, two or more of the column connection electrode CCE, the column line CL, the row connection electrode RCE, and the pad PD may be arranged on the same layer. The column connection electrode CCE, the column line CL, the row connection electrode RCE, and the pad PD may be composed of a single layer or multiple layers of a conductive material, but the embodiments of the present disclosure are not limited thereto.

According to embodiments of the present disclosure, a solder pattern SDP may be arranged on the column connection electrode CCE in each of a plurality of sub-pixels. The solder pattern SDP may bond the light emitting device ED to the column connection electrode CCE.

According to the embodiments of the present disclosure, the passivation layer 1516 may be disposed on a plurality of column lines CL, a plurality of column connection electrodes CCE, a plurality of row connection electrodes RCE, and a third insulating layer 1515*c*.

Figure 16:
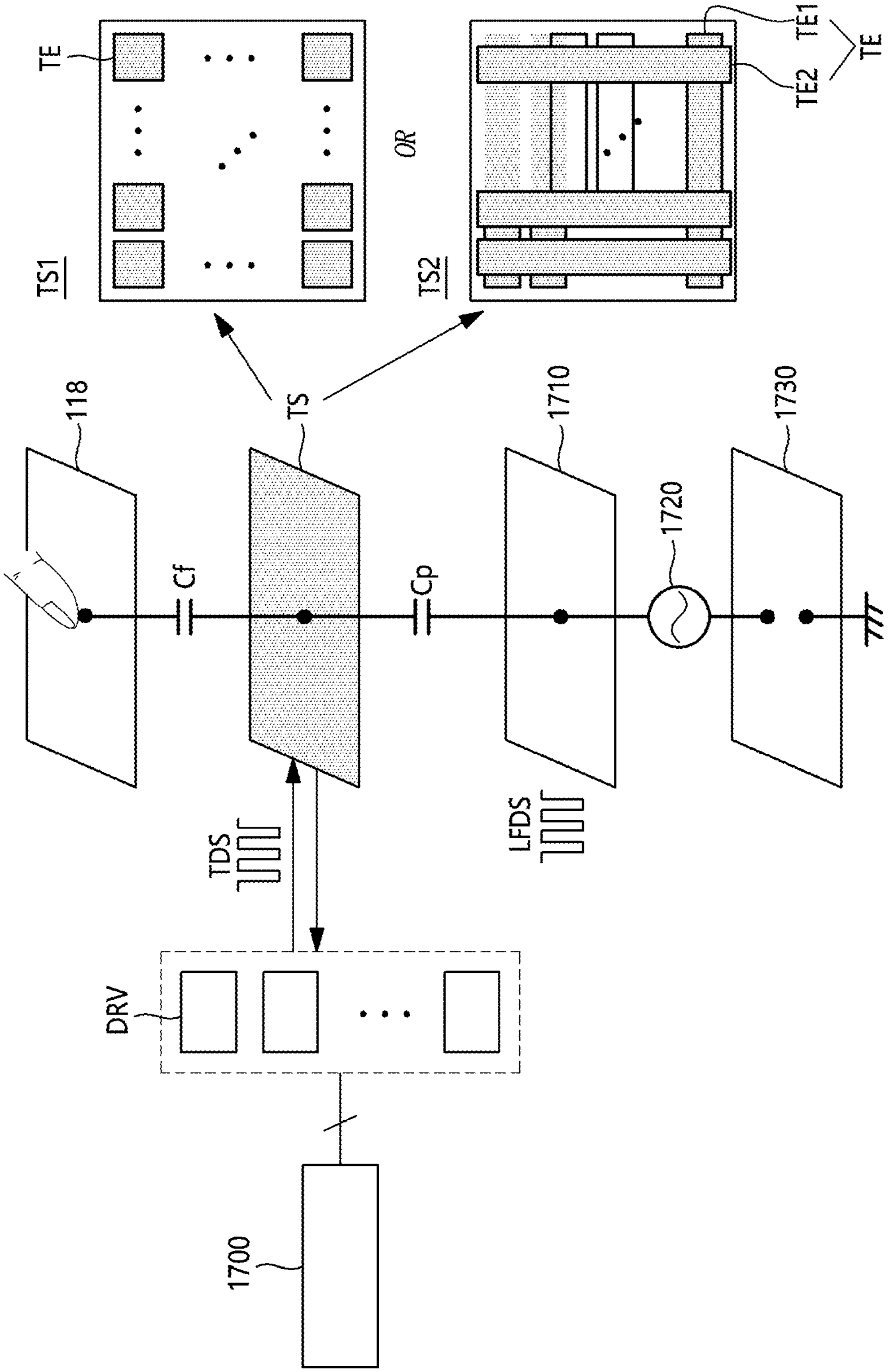
FIG. 16 briefly illustrates a touch sensing structure of a display device according to embodiments of the present disclosure.

For example, the passivation layer 1516 may be disposed on a display area DA, a first non-display area NDA1, and a second non-display area NDA2. In the entirety or a portion of the bending area BA, at least a portion of the passivation layer 1516 covering the plurality of pads PD may be removed. A portion of the passivation layer 1516 covering the plurality of pads PD in the second non-display area NDA2 may be removed. In addition, as illustrated in FIG. 16, the passivation layer 1516 may be removed from the area where the solder pattern SDP is arranged.

Since the passivation layer 1516 is arranged to cover the remaining area except for the bending area BA, the plurality of pads PD, and the area where the solder pattern SDP is arranged, the penetration of moisture or impurities into the light emitting device ED can be reduced.

Referring to FIG. 15, the light emitting device ED may include a first electrode Ecl, a first semiconductor layer 1611, an active layer 1612, a second semiconductor layer 1613, a second electrode Erl, and an encapsulation film 1614, but the embodiments of the present disclosure are not limited thereto. For example, the encapsulation film 1614 may not be included in the light emitting device ED.

The first semiconductor layer 1611 may be disposed on the solder pattern SDP. The second semiconductor layer 1613 may be disposed on the first semiconductor layer 1611.

For example, one of the first semiconductor layer 1611 and the second semiconductor layer 1613 may be implemented as a compound semiconductor of group III-V, group II-VI, and may be doped with an impurity (or dopant). For example, one of the first semiconductor layer 1611 and the second semiconductor layer 1613 may be a semiconductor layer doped with an n-type impurity, and the other may be a semiconductor layer doped with a p-type impurity, but the embodiments of the present disclosure are not limited thereto.

For example, the first semiconductor layer 1611 and the second semiconductor layer 1613 may be a nitride semiconductor including an n-type impurity and a nitride semiconductor including a p-type impurity, respectively, but the embodiments of the present disclosure are not limited thereto. For example, the first semiconductor layer 1611 may be a nitride semiconductor containing a p-type impurity, and the second semiconductor layer 1613 may be a nitride semiconductor containing an n-type impurity, but the embodiments of the present disclosure are not limited thereto.

The active layer 1612 may be arranged between the first semiconductor layer 1611 and the second semiconductor layer 1613. The active layer 1612 may receive holes and electrons from the first semiconductor layer 1611 and the second semiconductor layer 1613 to emit light. For example, the active layer 1612 may be configured as one of a single well structure, a multi-well structure, a single quantum well structure, a multi-quantum well (MQW) structure, a quantum dot structure, and a quantum wire structure, but the embodiments of the present disclosure are not limited thereto. For example, the active layer 1612 may be configured as indium gallium nitride (InGaN) or gallium nitride (GaN), but the embodiments of the present disclosure are not limited thereto.

For another example, the active layer 1612 may include a multi-quantum well (MQW) structure having a well layer and a barrier layer having a higher band gap than the well layer. For example, the active layer 1612 may be formed of InGaN as a well layer and an AlGaN layer as a barrier layer, but the embodiments of the present disclosure are not limited thereto.

The first electrode Ecl of the light emitting device ED may be arranged between the first semiconductor layer 1611 and the solder pattern SDP. For example, the first electrode Ecl of the light emitting device ED may electrically connect the first semiconductor layer 1611 and the column connection electrode CCE. The column line voltage (e.g., the anode voltage) output from the driver DRV may be applied to the first semiconductor layer 1611 through the column line CL, the column connection electrode CCE, and the first electrode Ecl. For example, the first electrode Ecl may be composed of a conductive material capable of eutectic bonding with the solder pattern SDP, but the embodiments of the present disclosure are not limited thereto.

The second electrode Erl of the light emitting device ED may be disposed on the second semiconductor layer 1613. For example, the second electrode Erl of the light emitting device ED may electrically connect the second semiconductor layer 1613 and the row line RL. A row line voltage (e.g., referred to as a low-potential voltage VSS as a cathode voltage) output from the driver DRV may be applied to the second semiconductor layer 1613 through the row connection electrode RCE, the row line RL, and the second electrode Erl. The second electrode Erl of the light emitting device ED may be made of a transparent conductive material so that light emitted from the light emitting device ED can be directed to the upper portion of the light emitting device ED, but the embodiments of the present disclosure are not limited thereto. For example, the second electrode Erl may be made of a material such as indium tin oxide (ITO), indium zinc oxide (IZO), or indium gallium zinc oxide (IGZO), but the embodiments of the present disclosure are not limited thereto.

The encapsulation film 1614 may be disposed on at least a portion of the first semiconductor layer 1611, the active layer 1612, the second semiconductor layer 1613, the first electrode Ecl, and the second electrode Erl. For example, the encapsulation film 1614 may surround at least a portion of the first semiconductor layer 1611, the active layer 1612, the second semiconductor layer 1613, the first electrode Ecl, and the second electrode Erl.

For example, the encapsulation film 1614 may protect the first semiconductor layer 1611, the active layer 1612, and the second semiconductor layer 1613. For example, the encapsulation film 1614 may be disposed on a side surface of the first semiconductor layer 1611, a side surface of the active layer 1612, and a side surface of the second semiconductor layer 161.

For example, the encapsulation film 1614 may be disposed on at least a portion of the first electrode Ecl and the second electrode Erl of the light emitting device ED. For example, the encapsulation film 1614 may be disposed on an edge portion (or one side) of the first electrode Ecl of the light emitting device ED and an edge portion (or one side) of the second electrode Erl of the light emitting device ED. At least a portion of the first electrode Ecl may be exposed from the encapsulation film 1614 so that the first electrode Ecl may be connected to the solder pattern SDP. For example, at least a portion of the second electrode Erl may be exposed from the encapsulation film 1614 so that the second electrode Erl may be connected to the row line RL. For example, the encapsulation film 1614 may be made of an insulating material such as silicon nitride (SiNx) or silicon oxide (SiOx), but the embodiments of the present disclosure are not limited thereto.

For another example, the encapsulation film 1614 may have a structure in which a reflective material is dispersed in a resin layer, but the embodiments of the present disclosure are not limited thereto. For example, the encapsulation film 1614 may be manufactured as a reflector of various structures, but the embodiments of the present disclosure are not limited thereto. Light emitted from the active layer 1612 may be reflected upward by the encapsulation film 1614, thereby improving light extraction efficiency. For example, the encapsulation film 1614 may be a reflective layer, but the embodiments of the present disclosure are not limited thereto.

According to the embodiments of the present disclosure, the light emitting device ED is described as having a vertical structure, but the embodiments of the present disclosure are not limited thereto. For example, the light emitting device ED may have a lateral structure or a flip chip structure.

The structure of the light emitting device ED illustrated in FIG. 15 may be substantially equally applied to all of the first light emitting device EDa, the second light emitting device EDb, and the third light emitting device EDc. According to embodiments of the present disclosure, a first optical layer 1517*a* may be arranged to surround a plurality of light emitting devices ED in the display area DA. For example, the first optical layer 1517*a* may be arranged to cover a plurality of light emitting devices ED and the bank BNK in the area of a plurality of sub-pixels SP. For example, the first optical layer 1517*a* may cover a bank BNK, a portion of the passivation layer 1516, and a region between the plurality of light emitting devices ED. The first optical layer 1517*a* may be arranged or covered between a plurality of light emitting devices ED included in one pixel and between a plurality of banks BNK. For example, the first optical layer 1517*a* may be arranged to extend in the first direction (X) and be spaced apart from each other in the second direction (Y). For example, the first optical layer 1517*a* may be arranged to surround the side of the light emitting devices ED and the banks BNK between the passivation layer 1516 and the row line RL, but the embodiments of the present disclosure are not limited thereto. For example, the first optical layer 1517*a* may be a diffusion layer or a sidewall diffusion layer, but the embodiments of the present disclosure are not limited thereto.

The first optical layer 1517*a* may include an organic insulating material having fine particles dispersed therein, but the embodiments of the present disclosure are not limited thereto. For example, the first optical layer 1517*a* may be composed of siloxane having fine metal particles, such as titanium dioxide (TiO2) particles, dispersed therein, but the embodiments of the present disclosure are not limited thereto. Light from a plurality of light emitting devices ED may be scattered by the fine particles dispersed in the first optical layer 1517*a* and emitted to the outside of the display device 100. Accordingly, the first optical layer 1517*a* may improve the extraction efficiency of light emitted from the plurality of light emitting devices ED.

For example, the first optical layer 1517*a* may be arranged on each of a plurality of pixels, or may be arranged together on some pixels arranged in the same row, but the embodiments of the present disclosure are not limited thereto. For example, the first optical layer 1517*a* may be arranged on each of a plurality of pixels, or the plurality of pixels may share one first optical layer 1517*a*. For another example, each of the plurality of sub-pixels may separately include a first optical layer 1517*a*, but the embodiments of the present disclosure are not limited thereto.

According to the embodiments of the present disclosure, in the display area DA, a second optical layer 1517*b* may be arranged on the passivation layer 1516. For example, the second optical layer 1517*b* may be arranged to surround the first optical layer 1517*a*. For example, the second optical layer 1517*b* may be in contact with a side surface of the first optical layer 1517*a*. For example, the second optical layer 1517*b* may be arranged in an area between the plurality of pixels. However, the embodiments of the present disclosure are not limited thereto. For example, the second optical layer 1517*b* may be a diffusion layer, a diffusion layer window, or a window diffusion layer, but the embodiments of the present disclosure are not limited thereto.

The second optical layer 1517*b* may be composed of an organic insulating material, but the embodiments of the present disclosure are not limited thereto. The second optical layer 1517*b* may be composed of the same material as the first optical layer 1517*a*, but the embodiments of the present disclosure are not limited thereto. For example, the first optical layer 1517*a* may include fine particles, and the second optical layer 1517*b* may not include fine particles. For example, the second optical layer 1517*b* may be composed of siloxane, but the embodiments of the present disclosure are not limited thereto.

For example, the thickness of the first optical layer 1517*a* may be smaller than the thickness of the second optical layer 1517*b*, but the embodiments of the present disclosure are not limited thereto. Accordingly, when viewed from a planar view, the area where the first optical layer 1517*a* is disposed may include a concave portion that is sunken inwardly from the upper surface of the second optical layer 1517*b*.

According to the embodiments of the present disclosure, a row line RL may be disposed on the first optical layer 1517*a* and the second optical layer 1517*b*. For example, the row line RL may be electrically connected to a plurality of row connection electrodes RCE through contact holes of the second optical layer 1517*b*. For example, the row line RL may be disposed on a plurality of light emitting devices ED. For example, the row line RL may include a transparent conductive oxide such as indium tin oxide (ITO) or indium zinc oxide (IZO), but the embodiments of the present disclosure are not limited thereto. For example, the row line RL may be arranged to be in contact with the second electrode Erl of the light emitting device ED. For example, the row line RL may overlap with the first optical layer 1517*a*. For example, the row line RL may cover a plane on the outside of the first optical layer 1517*a*.

The row line RL may extend continuously in the first direction (X) of the substrate 210. Accordingly, the row line RL may be commonly connected to a plurality of pixels arranged in the first direction (X) of the substrate 210. For example, the row line RL may be commonly connected to a plurality of pixels.

According to the embodiments of the present disclosure, the row line RL may be continuously extended on the first optical layer 1517*a*, the second optical layer 1517*b*, and the light emitting device ED. The area where the first optical layer 1517*a* is disposed may include a concave portion that is sunken inwardly from the upper surface of the second optical layer 1517*b*. Accordingly, the first part of the row line RL disposed on the first optical layer 1517*a* may be disposed along the concave portion, and thus may be disposed at a lower position than the second part of the row line RL disposed on the second optical layer 1517*b*.

A third optical layer 1517*c* may be disposed on the row line RL. The third optical layer 1517*c* may be disposed so as to overlap with a plurality of light emitting devices ED and the first optical layer 1517*a*. Since the third optical layer 1517*c* is arranged on the row line RL and the plurality of light emitting devices ED, it is possible to improve a mura that may occur in some of the plurality of light emitting devices ED. For example, when transferring a plurality of light emitting devices ED onto the substrate 210 of the display panel 110, there may occur an area where the spacing between the plurality of light emitting devices ED is not uniform due to process deviation. If the spacing between the plurality of light emitting devices ED is not uniform, an emission areas of each of the plurality of light emitting devices ED may be arranged unevenly, and thus a mura may be visible to the user. Accordingly, since the third optical layer 1517*c* is arranged to uniformly diffuse light over the plurality of light emitting devices ED, it is possible to reduce light emitted from some of the light emitting devices ED from being visible as a mura. Accordingly, since the light emitted from the plurality of light emitting devices EDs is evenly diffused by the third optical layer 1517*c* and extracted to the outside of the display device 100, the luminance uniformity of the display device 100 can be improved.

The third optical layer 1517*c* may be composed of an organic insulating material in which fine particles are dispersed, but the embodiments of the present disclosure are not limited thereto. For example, the third optical layer 1517*c* may be composed of siloxane in which fine metal particles such as titanium dioxide (TiO2) particles are dispersed, but the embodiments of the present disclosure are not limited thereto. For example, the third optical layer 1517*c* may be composed of the same material as the first optical layer 1517*a*, but the embodiments of the present disclosure are not limited thereto. For example, the third optical layer 1517*c* may be a diffusion layer or an upper diffusion layer, but the embodiments of the present disclosure are not limited thereto.

According to the embodiments of the present disclosure, light from a plurality of light emitting devices ED may be scattered by fine particles dispersed in a third optical layer 1517*c* and emitted to the outside of the display device 100. The third optical layer 1517*c* may evenly mix light emitted from a plurality of light emitting devices ED, thereby further improving the luminance uniformity of the display device 100. In addition, the light extraction efficiency of the display device 100 may be improved by the light scattered from the plurality of fine particles, thereby enabling the display device 100 to be driven at low power.

A black matrix BM may be arranged on the row line RL, the first optical layer 1517*a*, the second optical layer 1517*b*, and the third optical layer 1517*c* in the display area DA. For example, the black matrix BM may fill a contact hole of the second optical layer 1517*b*. The black matrix BM may be configured to cover the display area DA, so that the color mixing of light and external light reflection of the plurality of sub-pixels can be reduced. For example, the black matrix BM may also be arranged in the contact hole where the row line RL and the row connection electrode RCE are connected, so that light leakage between the neighboring plurality of sub-pixels can be prevented.

A cover layer 1518 may be arranged on the black matrix BM in the display area DA. The cover layer 1518 may protect a configuration under the cover layer 1518. For example, the cover layer 1518 may be composed of an organic insulating material, but the embodiments of the present disclosure are not limited thereto.

A polarizing layer 114 may be arranged on the cover layer 1518 via a first adhesive layer 112. A cover member 118 may be arranged on the polarizing layer 114 via a second adhesive layer 116.

According to embodiments of the present disclosure, a plurality of pads PD may be arranged on a third insulating layer 1515*c* in a second non-display area NDA2. For example, at least a portion of the plurality of pads PD may be exposed from a passivation layer 1516. For example, the plurality of pads PD may be electrically connected to a fourth pad connection pattern PCP4 through a contact hole of the third insulating layer 1515*c*.

An adhesive layer ACF may be arranged on the plurality of pads PD. The adhesive layer ACF may be an adhesive layer in which conductive balls are dispersed in an insulating material, but embodiments of the present disclosure are not limited thereto. When heat or pressure is applied to the adhesive layer ACF, the conductive balls may be electrically connected at a portion where the heat or pressure is applied, thereby having conductive properties. The adhesive layer ACF may be disposed between a plurality of pads PD and a flexible printed circuit 102, so that the flexible printed circuit 102 may be attached or bonded to the plurality of pads PD. For example, the adhesive layer ACF may be an anisotropic conductive film ACF, but the embodiments of the present disclosure are not limited thereto.

A flexible printed circuit 102 may be disposed on the adhesive layer ACF. The flexible printed circuit 102 may be electrically connected to the plurality of pads PD through the adhesive layer ACF. Accordingly, a signal supplied from the flexible printed circuit 102 may be transmitted to a driver DRV of a display area DA through the plurality of pads PD, the fourth pad connection pattern PCP4, the third pad connection pattern PCP3, the second pad connection pattern PCP2, and the first pad connection pattern PCP1.

Referring to FIG. 14, the display panel 110 according to the embodiments of the present disclosure may include a substrate 210, a layer stack 1410 on a plurality of drivers DRV disposed on the substrate 210, an optical layer 1517*a* disposed between a plurality of light emitting devices EDa, EDb and EDc on the layer stack 1410, an adhesive layer 116 disposed on the plurality of light emitting devices EDa, EDb and EDc and the optical layer 1517*a*, and a cover member 118 disposed on the adhesive layer 116.

Referring to FIG. 14, a plurality of column lines CL may be disposed between the layer stack 1410 and the plurality of light emitting devices EDa, EDb and EDc.

Referring to FIG. 14, a plurality of row lines RL may be arranged on a plurality of light emitting devices EDa, EDb and EDc and an optical layer 1517*a*. A plurality of row lines RL may be arranged between a plurality of light emitting devices EDa, EDb and EDc, an optical layer 1517*a*, and an adhesive layer 116.

Referring to FIG. 14, a layer stack 1410 may include a plurality of protection layers 1513*a*, 1513*b* and 1514 arranged on the side and upper surface of each of a plurality of drivers DRV, a plurality of insulating layers 1515*a*, 1515*b* and 1515*c* arranged on the plurality of protection layers 1513*a*, 1513*b* and 1514, and a bank BN arranged on the plurality of insulating layers.

The plurality of protection layers 1513*a*, 1513*b* and 1514 may further include a side protection layer 1513 disposed on each side of the plurality of drivers DRV and an upper protection layer 1514 disposed on the upper surface of each of the plurality of drivers DR.

The side protection layer 1513 may include a first protection layer 1513*a* disposed on the substrate 210 and a second protection layer 1513*b* disposed on the first protection layer 1513*a*.

The upper protection layer 1514 may include a second protection layer 1513*b* and a third protection layer 1514 disposed on the plurality of drivers DRV.

The plurality of insulating layers 1515*a*, 1515*b* and 1515*c* may include a first insulating layer 1515*a* disposed on the upper protection layer 1514, and a second insulating layer 1515*b* disposed on the first insulating layer 1515*a*. The plurality of insulating layers 1515*a*, 1515*b* and 1515*c* may further include a third insulating layer 1515*c* disposed on the second insulating layer 1515*b*.

Each of the plurality of light emitting devices EDa, EDb and EDc may be disposed on the bank BNK and positioned in an opening of the optical layer 1517*a*.

At least a portion of each of the plurality of column lines CL may extend onto the bank BNK on the plurality of insulating layers 1515*a*, 1515*b* and 1515*c*. Each of the plurality of row lines RL may be arranged on the optical layer 1517*a* and the plurality of light emitting devices EDa, EDb and EDc.

A first electrode Ecl of each of the plurality of light emitting devices EDa, EDb and EDc may be electrically connected to at least a portion of a column line CL extending onto the bank BNK among the plurality of column lines CL. A second electrode Erl of each of the plurality of light emitting devices EDa, EDb and EDc may be electrically connected to one of the plurality of row lines RL.

Referring to FIG. 14, the display panel 110 according to the embodiments of the present disclosure may include a plurality of line connection patterns LCPs that connect each of a plurality of lines including a plurality of row lines RL and a plurality of column lines CL to a plurality of drivers DR.

The plurality of line connection patterns LCPs may include a first line connection pattern LCP1 disposed on a side protection layer 1513, a second line connection pattern LCP2 disposed on an upper protection layer 1514 and electrically connected to the first line connection pattern LCP1 through a hole in the upper protection layer 1514, a third line connection pattern LCP3 disposed on a first insulating layer 1515*a* and electrically connected to the second line connection pattern LCP2 through a hole in the first insulating layer 1515*a*, and a fourth line connection pattern LCP4 disposed on a second insulating layer 1515*b* and electrically connected to the third line connection pattern LCP3 through a hole in the second insulating layer 1515*b*.

The first line connection pattern LCP1 may be electrically connected to one of the plurality of drivers DRV. The fourth line connection pattern LCP4 may be electrically connected to at least one second electrode Erl of the plurality of light emitting devices EDa, EDb and EDc, or may be electrically connected to at least one first electrode Ecl of the plurality of light emitting devices EDa, EDb and EDc.

The side protection layer 1513 arranged on each side of the plurality of drivers DRV may include two or more organic layers.

The first and second protection layers 1513*a* and 1513*b* as the side protection layer 1513, the third protection layer 1514 as the upper protection layer 1514, and the first to third insulating layers 1515*a*, 1515*b* and 1515*c* may each be composed of organic layers.

In the above, there have been described the structure and operation related to the display function of the display device 100 according to the embodiments of the present disclosure.

The display device 100 according to the embodiments of the present disclosure may provide not only a display function but also a touch sensing function. Accordingly, hereinafter, it will be described a structure and an operation related to the touch sensing function of the display device 100 according to the embodiments of the present disclosure.

FIG. 16 is a diagram briefly illustrating the touch sensing structure of the display device 100 according to the embodiments of the present disclosure.

Referring to FIG. 16, in order to perform touch sensing the display device 100 according to the embodiments of the present disclosure may include a touch sensor TS, a plurality of drivers DRV for driving and sensing the touch sensor TS, and a touch control circuit 1700 that controls the plurality of drivers DRV.

The plurality of drivers DRV may supply a touch driving signal TDS having a variable voltage level to at least one of the plurality of row lines RL. The touch driving signal TDS is a signal whose voltage level fluctuates, and may also be referred to as an AC signal or a pulse signal.

At least one of the plurality of drivers DRV may sense or detect an electrical state (e.g., a capacitance change) in the touch sensor TS to generate sensing data, and output the generated sensing data. Here, the sensing data may include digital sensing values.

At least one of the plurality of drivers DRV may include at least one analog-to-digital converter ADC to sense an electrical state in at least one of the touch sensor TS to obtain digital sensing values.

The touch control circuit 1700 may supply a touch driving signal TDS or a signal as a base of the touch driving signal TDS to each of the plurality of drivers DRV, and determine an occurrence of a touch or a touch position based on sensing data provided from each of the plurality of drivers RV.

The display device 100 according to the embodiments of the present disclosure may perform self-capacitance-based touch sensing and/or mutual-capacitance-based touch sensing.

Referring to FIG. 16, if a touch driving signal TDS is applied to at least one of a plurality of touch electrode TE included in the touch sensor TS for touch sensing, an unwanted parasitic capacitance Cp may be formed between the touch electrode TE supplied with the touch driving signal TDS and other electrodes or other wirings around the corresponding touch electrode TE. The parasitic capacitance Cp may be a factor causing a reduction of the touch sensitivity.

Referring to FIG. 16, the display device 100 according to the embodiments of the present disclosure may further include a load-free driving electrode 1710 arranged around the touch sensor TS. The load-free driving electrode 1710 may correspond to an electrode disposed at a position capable of forming a parasitic capacitance Cp with the touch electrode TE. For example, the load-free driving electrode 171 may include a plurality of row lines RL, a plurality of column lines CL, and a touch ground that vertically overlap with the touch electrode TE supplied with the touch driving signal TDS. Here, the touch ground may serve as a ground related to the touch sensing operation. The load-free driving electrode 1710 may further include another touch electrode TE to which the touch driving signal TDS is not applied.

Referring to FIG. 16, the display device 100 according to the embodiments of the present disclosure may further include a guard driver 1720 that supplies a load-free driving signal LFDS having a signal characteristic corresponding to a touch driving signal TDS to the load-free driving electrode 1710 in order to prevent unwanted parasitic capacitance Cp from being formed between the row line RL and the load-free driving electrode 1710.

The load-free driving signal LFDS output from the guard driver 1720 to the load-free driving electrode 1710 may be a signal having similar signal characteristics to the touch driving signal TDS output from the driver DRV to the row line RL. For example, the signal characteristics may include frequency, amplitude, and phase.

For example, the load-free driving signal LFDS may have the same frequency as the touch driving signal TDS. The load-free driving signal LFDS may have the same amplitude as the touch driving signal TDS. The load-free driving signal LFDS may have the same phase as the touch driving signal TDS.

The load-free driving signal LFDS may be supplied to other electrodes in addition to the load-free driving electrode 1710.

Referring to FIG. 16, the display device 100 according to the embodiments of the present disclosure may further include a system ground 1730 that serves as a ground for the entire system.

Referring to FIG. 16, the touch sensor TS may include a plurality of touch electrodes TE. For example, the touch sensor TS may be a first type touch sensor TS1 or a second type touch sensor TS2.

If the touch sensor TS is a first type touch sensor TS1, the plurality of touch electrodes TE may be arranged to be spaced apart from each other. For example, the first type touch sensor TS1 may be a touch sensor for self-capacitance-based touch sensing. In this case, each of the plurality of touch electrodes TE may function as both a driving electrode to which a touch driving signal TDS is applied and a sensing electrode sensed by a driver DRV.

Figure 21:
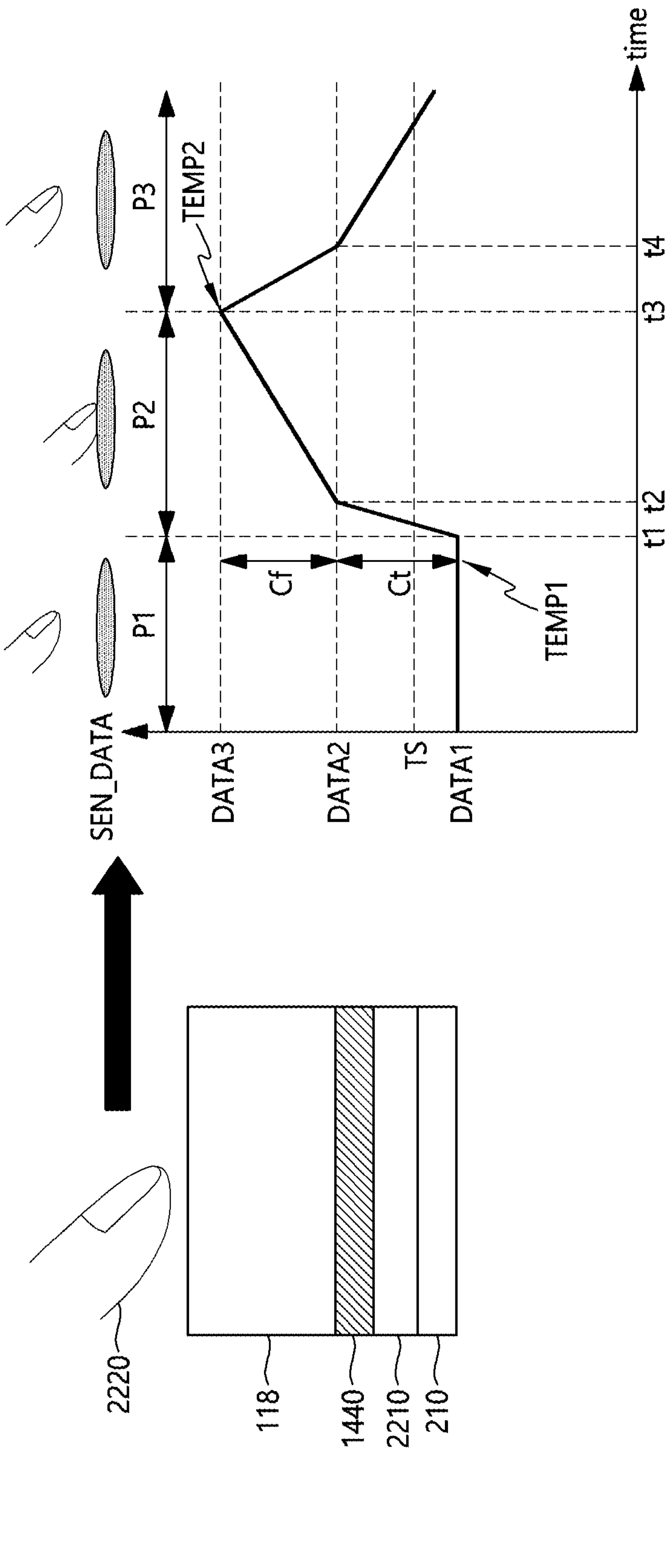
FIG. 21 is a graph of sensing data during a touch operation according to embodiments of the present disclosure.

If the touch sensor TS is a second type touch sensor TS2, the plurality of touch electrodes TE may include a plurality of first touch electrodes TE1 arranged in a first direction and a plurality of second touch electrodes TE2 arranged in a second direction different from the first direction. For example, the second type touch sensor TS2 may be a touch sensor for mutual-capacitance-based touch sensing. In this case, as an example, each of the plurality of first touch electrodes TE1 may function as a driving electrode to which a touch driving signal TDS is applied, and the plurality of second touch electrodes TE2 may function as a sensing electrode sensed by a driver DRV. As another example, each of the plurality of second touch electrodes TE2 may function as a driving electrode to which a touch driving signal TDS is applied, and the plurality of first touch electrodes TE1 may function as a sensing electrode sensed by a driver DRV. The touch sensor TS may be a first type touch sensor TS1 or a second type touch sensor TS2. The first type touch sensor TS1 and the second type touch sensor TS2 may include a plurality of touch electrodes TE, and each of the plurality of touch electrodes TE may be configured by electrically connecting a plurality of cathode electrodes that are positioned spaced apart from each other. For example, the plurality of touch electrodes TE may be configured by a plurality of sub-touch electrodes STE as illustrated in FIG. 21.

Hereinafter, for convenience of explanation, it will be described as an example a case in which the touch sensor TS is a first type touch sensor TS1. However, the present disclosure is not limited thereto.

Hereinafter, it will be described a touch sensing system and a touch sensing operation of a display device 100 according to embodiments of the present disclosure in more detail.

Figure 17:
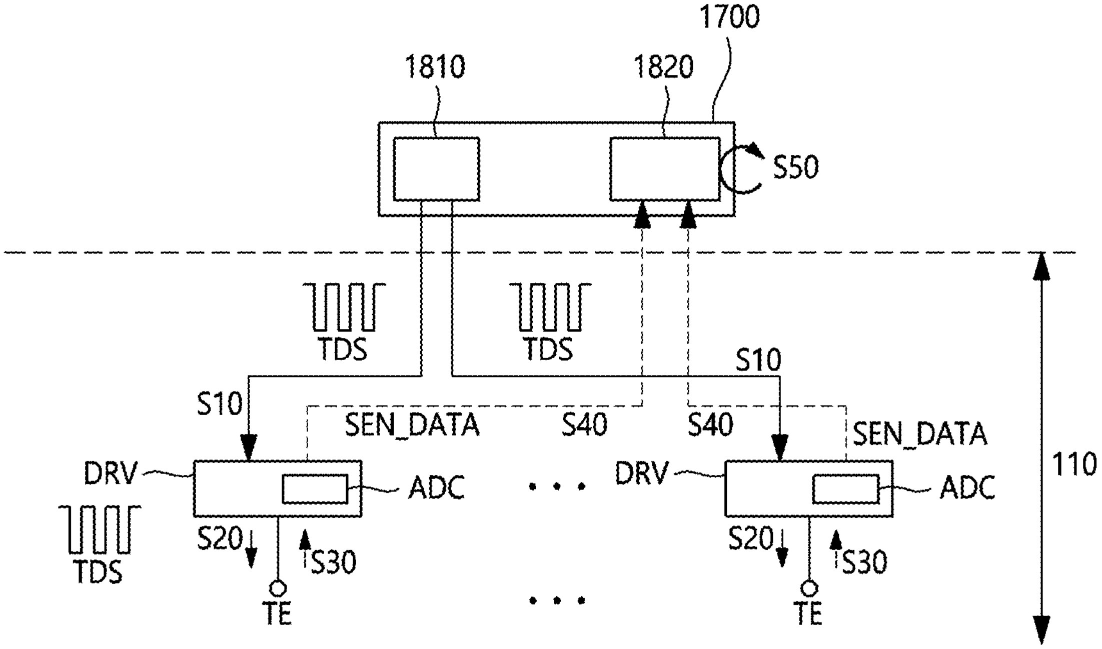
FIG. 17 illustrates a touch sensing system of a display device according to embodiments of the present disclosure.

FIG. 17 illustrates a touch sensing system of a display device 100 according to embodiments of the present disclosure.

Referring to FIG. 17, the display device 100 according to the embodiments of the present disclosure may include a plurality of row lines RL corresponding to touch sensors, a plurality of drivers DRV for driving and sensing the plurality of row lines RL, and a touch control circuit 1700 for controlling the plurality of drivers DRV.

Referring to FIG. 17, the touch control circuit 1700 may include a signal supply circuit 1810 for supplying a touch driving signal TDS to at least one of the plurality of drivers DRV, and a touch sensing circuit 1820 for receiving sensing data SEN_DATA from at least one of the plurality of drivers DRV to determine the occurrence of a touch and/or calculate a touch location (i.e., touch coordinates).

Referring to FIG. 17, each of the plurality of drivers DRV may include an analog-to-digital converter ADC that converts a signal (e.g., analog signal) sensed through a corresponding touch electrode TE into a digital sensing value. In this way, since the analog-to-digital converter ADC exists in the display panel 110, a digital signal (e.g., a digital sensing value) may exist among various signals existing in the display panel 110. That is, the display panel 110 may be a unique panel in which an analog domain in which an analog signal exists and a digital domain in which a digital signal exists coexist.

Referring to FIG. 17, the signal supply circuit 1810 of the touch control circuit 1700 may supply a touch driving signal TDS or a signal that is the basis of the touch driving signal TDS to each of the plurality of drivers DRV (S10).

Referring to FIG. 17, each of the plurality of drivers DRV may receive a touch driving signal TDS or a signal that is the basis of the touch driving signal TDS from a signal supply circuit 1810 of a touch control circuit 1700 (S10), and output the touch driving signal TDS to a touch electrode TE or a segmented electrode thereof (hereinafter, also referred to as a sub-touch electrode) arranged in a corresponding unit driving area UDA (S20).

Referring to FIG. 17, each of the plurality of driver DRV may sense a touch electrode TE or a segmented electrode thereof arranged in a corresponding unit driving area UDA (S30). Each of the plurality of drivers DRV may sense a touch electrode TE or a segmented electrode thereof, convert a sensing signal obtained according to the sensing result into a digital sensing value using an analog-to-digital converter ADC, and generate sensing data SEN_DATA including the converted digital sensing values.

Referring to FIG. 17, each of the plurality of drivers DRV may provide sensing data SEN_DATA to the touch sensing circuit 1820 of the touch control circuit 1700.

Referring to FIG. 17, the touch control circuit 1700 may determine whether a touch has occurred or a touch location based on the sensing data SEN_DATA provided from each of the plurality of drivers DRV (S50).

Figure 18:
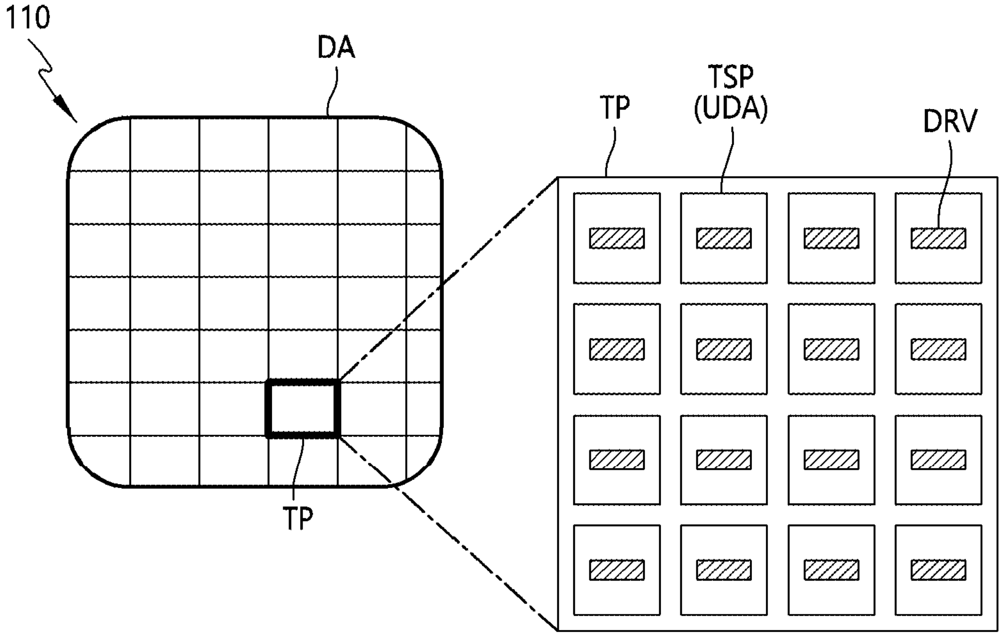
FIG. 18 illustrates a touch driving structure of a display panel according to embodiments of the present disclosure.
Figure 19:
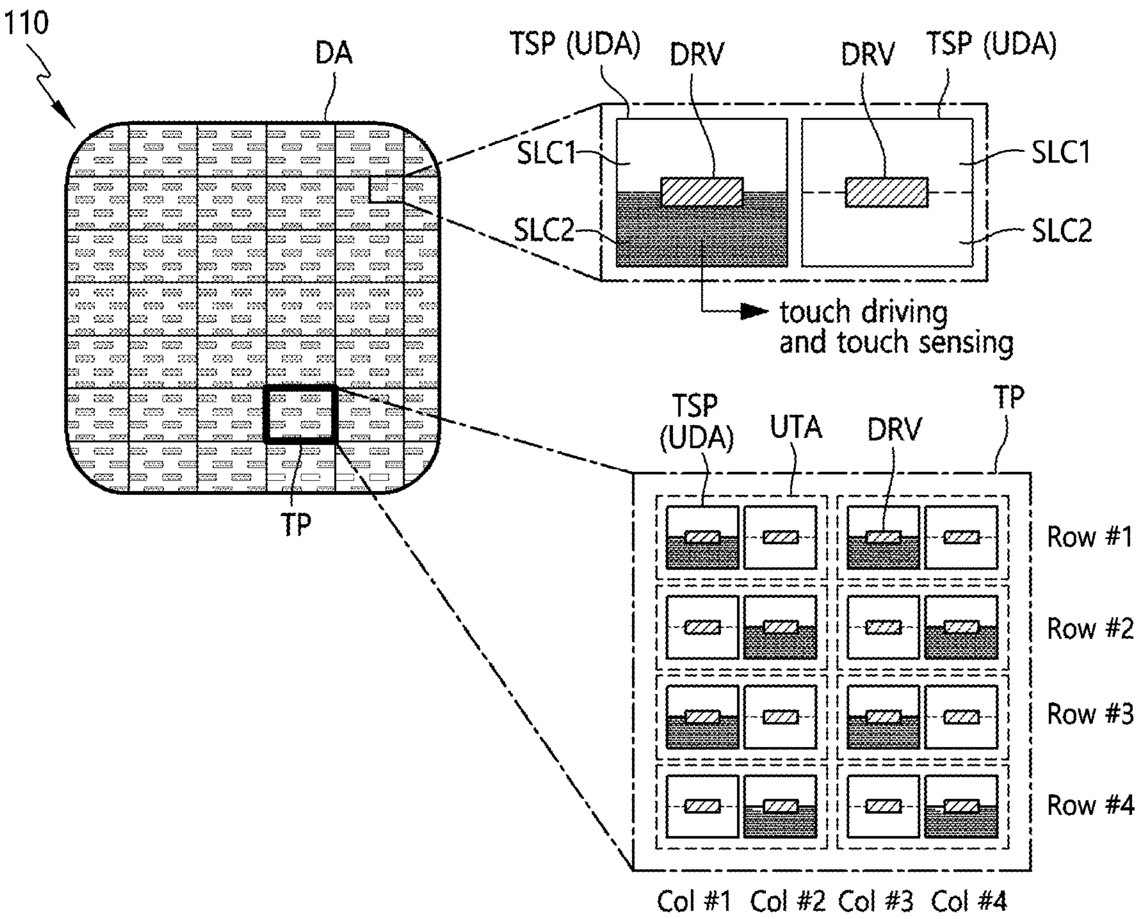
FIG. 19 is a plan view of a display panel according to embodiments of the present disclosure.

FIG. 18 and FIG. 19 illustrate a touch driving structure of a display panel 110 according to embodiments of the present disclosure. FIG. 4, FIG. 5, FIG. 10, FIG. 16, and FIG. 17 may be also referred to in the following description.

Referring to FIG. 18 and FIG. 19, the display area DA of the display panel 110 may include a plurality of touch pixel areas TP. Each of the plurality of touch pixel areas TP may be an area corresponding to one touch electrode TE. One touch electrode TE may be one unit electrode (e.g., one unit touch sensor) for touch sensing.

Each of the plurality of touch pixel areas TP may include a plurality of touch sub-pixel areas TSP. Each of the plurality of touch sub-pixel areas TSP may be an area corresponding to one driver DRV. Each of the plurality of touch sub-pixel areas TSP may correspond to one unit driving area UDA for driving the display.

One touch electrode TE may be disposed in each touch pixel area TP.

As an example, one touch electrode TE disposed in each touch pixel area TP may be formed of a metal formed integrally.

As another example, as illustrated in FIG. 18, one touch electrode TE disposed in each touch pixel area TP may be formed of a plurality of sub-touch electrodes. At least one sub-touch electrode may be disposed in each of the plurality of touch sub-pixel areas TSP. A plurality of sub-touch electrodes arranged throughout a plurality of touch sub-pixel areas TSP may be driven or sensed by a plurality of drivers DRV. For example, at least one first sub-touch electrode among the plurality of sub-touch electrodes may be driven or sensed by a first driver DRV among the plurality of drivers DRV.

Referring to FIG. 18, even if a plurality of sub-touch electrodes constituting a single touch electrode TE are driven and sensed by a plurality of drivers DRV, a touch control circuit 1700 may perform a touch algorithm by integrating sensing data received from a plurality of drivers DRV included in a single touch pixel area TP. Accordingly, a plurality of sub-touch electrodes arranged in a single touch pixel area TP may be processed as a single touch electrode TE.

That is, referring to FIG. 18, a plurality of drivers DRV disposed in one touch pixel area TP may drive and sense a plurality of sub-touch electrodes simultaneously or at different timings, and supply sensing data SENS_DATA to the touch control circuit 1700. The touch control circuit 1700 may consider the combined sensing data SEN_DATA received from the plurality of drivers DRV as sensing data obtained from one touch electrode TE, and may determine the occurrence of a touch and/or the touch coordinates based on the sensing data for the plurality of touch electrodes TE.

For example, each of the plurality of touch pixel areas TP may include 16 touch sub-pixel areas TSP. The 16 touch sub-pixel areas TSP can be arranged in 4 rows and 4 columns. Each of the 16 touch sub-pixel areas TSP may include one driver DRV. For example, each of the 16 touch sub-pixel areas TSPs may have a sub-touch electrode arranged. A plurality of sub-touch electrodes arranged throughout the 16 touch sub-pixel areas TSP may constitute one touch electrode corresponding to one touch pixel area TP.

Each of the plurality of touch sub-pixel areas TSP may include two or more row lines RL and two or more column lines CL. Each of the plurality of touch sub-pixel areas TSP may include two or more sub-pixels SP. Each of the plurality of touch sub-pixel areas TSP may include two or more light emitting devices ED.

Meanwhile, referring to FIG. 19, each of the plurality of touch pixel areas TP may include two or more unit touch driving areas UTA. Each of the two or more unit touch driving areas UTA may include at least one touch sub-pixel area TSP. According to the example of FIG. 19, each of two or more unit touch driving areas UTA may include two touch sub-pixel areas TSP. Here, the unit touch driving area UTA may be an area that becomes a basic unit of a touch driving pattern.

Referring to FIG. 19, one touch sub-pixel area TSP may include two sub-touch driving areas SLC1 and SLC2. The two sub-touch driving areas may include a first sub-touch driving area SLC1 and a second sub-touch driving area SLC2. For example, the first sub-touch driving area SLC1 may correspond to an upper area in one touch sub-pixel area TSP, and the second sub-touch driving area SLC2 may correspond to a lower area in one touch sub-pixel area TSP. However, the present disclosure is not limited thereto. The touch sub-pixel area TSP may correspond to the unit driving area UDA for driving the display of FIGS. 4, 5, and 10. The first sub-touch driving area SLC1 and the second sub-touch driving area SLC2 may correspond to the first sub-driving area SDA1 and the second sub-driving area SDA2 for driving the display of FIGS. 4, 5, and 10, respectively.

Referring to FIG. 19, at least one sub-touch electrode separated from each other may be arranged in each of the first sub-touch driving area SLC1 and the second sub-touch driving area SLC2. Each of the first sub-touch driving area SLC1 and the second sub-touch driving area SLC2 may include two or more light emitting devices ED.

Referring to FIG. 19, the sub-touch electrode arranged in the first sub-touch driving area SLC1 and the sub-touch electrode arranged in the second sub-touch driving area SLC2 may not be connected to each other, and may be arranged separately from each other.

Referring to FIG. 19, one unit touch driving area UTA may include two touch sub-pixel areas TSP. One unit touch driving area UTA may include two sub-touch driving areas SLC1 and SLC2 included in each of the two touch sub-pixel areas TSP. That is, one unit touch driving area UTA may include four sub-touch driving areas. One unit touch driving area UTA may include two drivers DRV.

For example, a touch pixel area TP may include 16 touch sub-pixel areas TSP arranged in four rows and four columns. Each of the 16 touch sub-pixel areas TSP may include one driver DRV and two sub-touch driving areas SLC1 and SLC2.

As an example, during a touch driving period for touch sensing, all four sub-touch driving areas included in one unit touch driving area UTA may be driven and sensed. Accordingly, during the touch driving period for touch sensing, each of the two drivers DRV included in one unit touch driving area UTA may drive and sense both of the two sub-touch driving areas SLC1 and SLC2 included in the corresponding touch sub-pixel area TSP.

As another example, during the touch driving period for touch sensing, only some of the four sub-touch driving areas included in one unit touch driving area UTA may be driven and sensed.

According to the example of FIG. 19, during the touch driving period for touch sensing, only one sub-touch driving area among the four sub-touch driving areas included in one unit touch driving area UTA may be driven and sensed. Accordingly, during the touch driving period for touch sensing, only one of the two drivers DRV included in one unit touch driving area UTA may drive and sense one of the two sub-touch driving areas SLC1 and SLC2 included in the corresponding touch sub-pixel area TSP.

Unlike the example of FIG. 19, during the touch driving period for touch sensing, only two of the four sub-touch driving areas included in one unit touch driving area UTA may be driven and sensed. Accordingly, during the touch driving period for touch sensing, each of the two drivers DRV included in one unit touch driving area UTA may drive and sense one of the two sub-touch driving areas SLC1 and SLC2 included in the corresponding touch sub-pixel area TSP.

According to the embodiments of the present disclosure, the fact that the sub-touch driving area SLC1 and SLC2 is driven and sensed may mean that at least one sub-touch electrode disposed in the sub-touch driving area is driven (i.e., touch driven) and sensed.

The fact that at least one sub-touch electrode disposed in the sub-touch driving area is driven (i.e., touch driven) may mean that a touch driving signal TDS having a variable voltage level is applied to at least one sub-touch electrode disposed in the sub-touch driving area.

Referring to FIG. 19, in the touch pixel area TP, the sub-touch driving area where touch driving and touch sensing occur may be arranged in a zigzag shape. For example, if a touch pixel area TP includes 16 touch sub-pixel areas TSP arranged in four rows and four columns, in each of the first touch sub-pixel row Row #1 and the third touch sub-pixel row Row #3, the second sub-touch driving area SLC2 of the two sub-touch driving areas SLC1 and SLC2 included in the touch sub-pixel area TSP located in the first column Col #1 may be driven and sensed, the two sub-touch driving areas SLC1 and SLC2 included in the touch sub-pixel area TSP located in the second column Col #2 may not be driven and sensed, the second sub-touch driving area SLC2 of the two sub-touch driving areas included in the touch sub-pixel area TSP located in the third column Col #3 may be driven and sensed, and two sub-touch driving area SCL1 and SLC2 included in the touch sub-pixel area TSP located in the fourth column Col #4 may not be driven and sensed.

In the second touch sub-pixel row Row #2 and the fourth touch sub-pixel row Row #4, the two sub-touch driving areas SLC1 and SLC2 included in the touch sub-pixel area TSP located in the first column Col #1 may not be driven and sensed, the second sub-touch driving area SLC2 among the two sub-touch driving areas included in the touch sub-pixel area TSP located in the second column Col #2 may be driven and sensed, the two sub-touch driving areas SLC1 and SLC2 included in the touch sub-pixel area TSP located in the third column Col #3 may not be driven and sensed, and the two sub-touch driving areas SLC1 and SLC2 included in the touch sub-pixel area TSP located in the fourth column Col #4 may be driven and sensed.

According to the above, the display panel 110 of the display device 100 according to the embodiments of the present disclosure may include a plurality of touch electrodes TE and a plurality of touch pixel areas TP corresponding to each other. Each of the plurality of touch sub-pixel areas TSP may include one driver DRV.

As described above, one touch pixel area TP may be an area where one touch electrode TE is arranged, and one touch sub-pixel area TSP may be an area where one driver DRV is disposed. For example, one touch electrode may be composed of one integrated metal. Alternatively, one touch electrode may be composed of a plurality of electrically connected metals.

According to the embodiments of the present disclosure, the plurality of drivers DRV may be disposed on the substrate 210, and may be located in the display area DA. In addition, a plurality of drivers DRV may be respectively arranged in a plurality of touch sub-pixel areas TSP. That is, a single driver DRV may be disposed in a single touch sub-pixel area TSP.

The plurality of drivers DRV may include a first driver DRV and a second driver DRV, and the plurality of light emitting devices ED driven by the first driver DRV and the plurality of light emitting devices ED driven by the second driver DRV may be different from each other.

The touch sensor TS may include a plurality of touch electrodes TE.

A unit driving area UDA driven by a single driver DRV may be a touch sub-pixel area TSP, and may have an area smaller than an area of a single touch pixel area TP corresponding to a single touch electrode TE.

A plurality of drivers DRV may be disposed in a single touch pixel area TP corresponding to a single touch electrode TE. According to the examples of FIGS. 18 and 19, 16 drivers DRV may be arranged in one touch pixel area TP corresponding to one touch electrode TE.

The plurality of touch pixel areas TP may include a first touch pixel area TP in which a first touch electrode TE among the plurality of touch electrodes is arranged. The first driver DRV and the second driver DRV may be arranged in the first touch pixel area TP, which is an area in which one of the plurality of touch electrodes TE is arranged.

As illustrated in FIG. 18, a plurality of touch sub-pixel areas TSP included in a first touch pixel area TP corresponding to one first touch electrode TE may each include a plurality of sub-touch electrodes. For example, at least one sub-touch electrode may be disposed in one touch sub-pixel area TSP. As another example, if one touch sub-pixel area TSP is divided into two sub-touch driving areas SLC1 and SLC2 (see FIG. 19), at least two sub-touch electrodes may be disposed in one touch sub-pixel area TSP.

For example, referring to FIG. 18, a plurality of touch sub-pixel areas TSP included in a first touch pixel area TP corresponding to one first touch electrode TE may include a first touch sub-pixel area TSP in which a first driver DRV is disposed and a second touch sub-pixel area TSP in which a second driver DRV is disposed. The first touch sub-pixel area TSP may include at least one first sub-touch electrode, and the second touch sub-pixel area TSP may include at least one second sub-touch electrode.

At least one first sub-touch electrode disposed in the first touch sub-pixel area TSP may be driven by a first driver DRV disposed in the first touch sub-pixel area TSP, and at least one second sub-touch electrode disposed in the second touch sub-pixel area TSP may be driven by a second driver DRV disposed in the second touch sub-pixel area TSP. However, at least one first sub-touch electrode disposed in the first touch sub-pixel area TSP and at least one second sub-touch electrode disposed in the second touch sub-pixel area TSP may be included in the sub-touch electrodes constituting one first touch electrode TE.

That is, the first touch electrode TE may include at least one first sub-touch electrode disposed in the first touch sub-pixel area TSP and at least one second sub-touch electrode disposed in the second touch sub-pixel area TSP.

Hereinafter, it will be described the touch sensor structure of the display panel 110 according to the embodiments of the present disclosure in detail. FIGS. 1 to 19 are also referred to in the following description.

Figure 20:
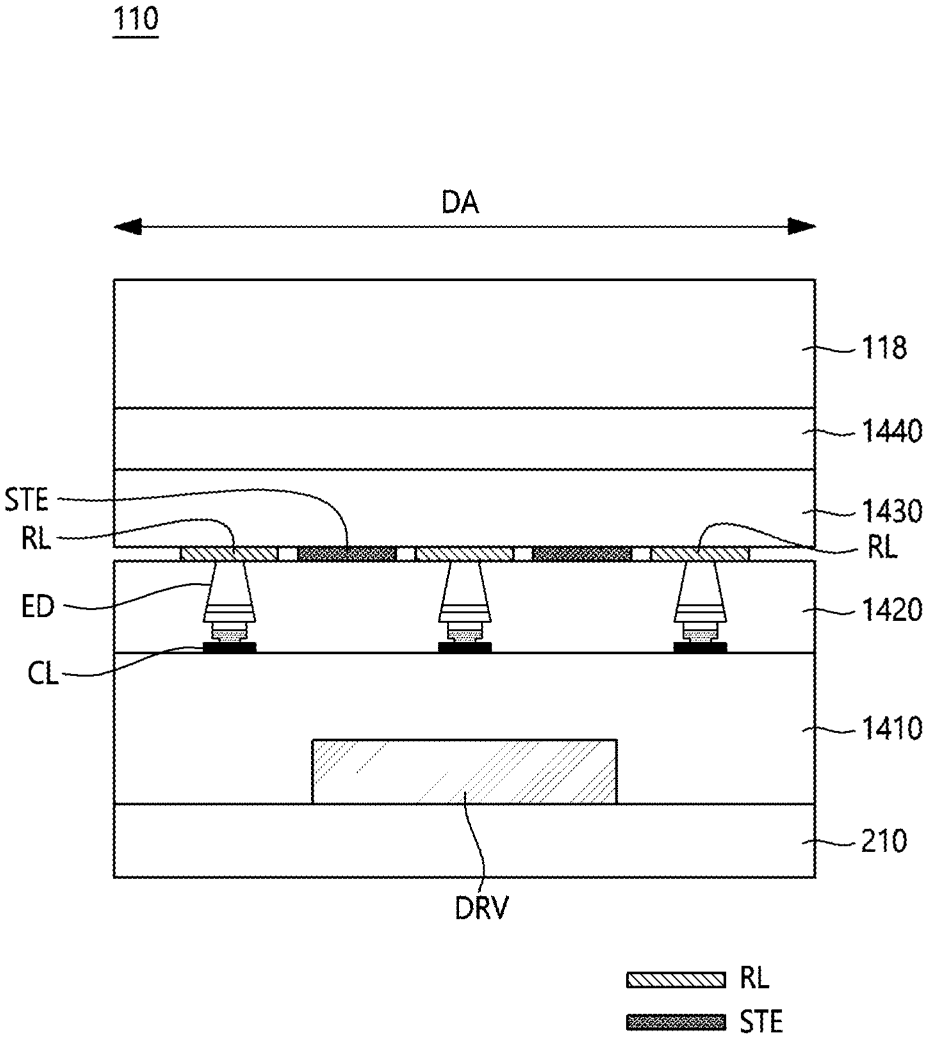
FIG. 20 is a cross-sectional view of a display panel according to embodiments of the present disclosure.

FIG. 20 is a cross-sectional view of the display panel 110 according to the embodiments of the present disclosure.

Referring to FIG. 20, a display panel 110 according to embodiments of the present disclosure may include a substrate 210, a layer stack 1410 disposed on the substrate 210, a plurality of light emitting devices ED disposed on the layer stack 1410 and positioned in a display area DA, a plurality of column lines CL electrically connected to a first electrode of each of the plurality of light emitting devices ED, a plurality of row lines RL electrically connected to a second electrode of each of the plurality of light emitting devices ED, a touch sensor TS including a plurality of sub-touch electrodes STE disposed in the same metal layer as the plurality of row lines RL, and an overcoat layer 1430 disposed on the plurality of row lines RL and the touch sensor TS.

According to the display device 100 according to embodiments of the present disclosure, the touch sensor TS may be disposed in the same metal layer as the row lines RL connected to the light emitting devices ED. This touch sensor structure may be referred to as an in-cell type touch sensor structure.

The display panel 110 according to the embodiments of the present disclosure may further include a plurality of drivers DRV. The plurality of drivers DRV may be disposed on the substrate 210, and may drive a plurality of light emitting devices ED and drive or sense a plurality of sub-touch electrodes STE included in the touch sensor TS.

The touch sensor TS may include sub-touch electrodes STE, and among the sub-touch electrodes STE included in the touch sensor TS, a plurality of sub-touch electrodes STE may form one touch electrode TE. That is, the touch sensor TS may include a plurality of touch electrodes TE, and each of the plurality of touch electrodes TE may include a plurality of sub-touch electrodes STE.

Referring to FIG. 20, in the display panel 110 according to the embodiments of the present disclosure, a plurality of drivers DRV may be disposed in the display area DA.

Referring to FIG. 20, in the display panel 110 according to the embodiments of the present disclosure, a plurality of drivers DRV may be disposed between the substrate 210 and the plurality of light emitting devices ED.

Referring to FIG. 20, the display panel 110 according to the embodiments of the present disclosure may further include an adhesive layer 1440 disposed on an overcoat layer 1430 and a cover member 118 disposed on the adhesive layer 1440.

Referring to FIG. 20, the display panel 110 according to the embodiments of the present disclosure may further include an optical layer 1420 surrounding the plurality of light emitting devices ED.

A plurality of row lines RL and a plurality of sub-touch electrodes STE may be disposed on the optical layer 120. For example, the plurality of row lines RL and the plurality of sub-touch electrodes STE may be disposed within the same metal layer on the optical layer 120. For example, the plurality of row lines RL and the plurality of sub-touch electrodes STE may include the same metal.

Referring to FIG. 20, in the display panel 110 according to the embodiments of the present disclosure, each of the plurality of row lines RL may overlap with two or more of the plurality of light emitting devices ED, and the plurality of sub-touch electrodes STE included in the touch sensor TS may not overlap with the plurality of light emitting devices ED.

The overcoat layer 1430 may be disposed on the plurality of light emitting devices ED, the plurality of row lines RL, and the plurality of sub-touch electrodes STE. For example, the overcoat layer 1430 may be a planarization layer including a transparent insulating material. Here, the transparent insulating material may be an organic insulating material.

For example, the overcoat layer 1430 may be composed of an insulating material, thereby protecting a plurality of light emitting devices ED, a plurality of row lines RL, and a plurality of sub-touch electrodes STE, and preventing a short-circuit between adjacent row lines RL and sub-touch electrodes STE.

For example, the overcoat layer 1430 may be composed of a transparent insulating material, thereby allowing light emitted from the plurality of light emitting devices ED to be transmitted upward. That is, accordingly, light emitted from the plurality of light emitting devices ED may pass through the overcoat layer 1430, and be emitted to the outside without significant loss.

For example, the optical layer 1420 may be composed of a planarization layer including an organic insulating material. Accordingly, the distance between the viewing surface (e.g., touch surface) and the light emitting devices ED may be maintained constant at any position, so that the emission characteristics can be made uniform, and the distance between the touch pointer (e.g., finger, pen, etc.) and the touch sensor TS may be maintained constant at any position, thereby improving the accuracy of touch sensing.

Referring to FIG. 20, in the display panel 110 according to the embodiments of the present disclosure, each of the plurality of light emitting devices ED may be a vertical light emitting device including a first electrode (e.g., an anode electrode or a cathode electrode) and a second electrode (e.g., a cathode electrode or an anode electrode) that are positioned vertically. For example, the plurality of column lines CL may be arranged below the plurality of light emitting devices ED, and the plurality of row lines RL may be arranged above the plurality of light emitting devices ED. In another example, the plurality of column lines CL may be arranged above the plurality of light emitting devices ED, and the plurality of row lines RL may be arranged below the plurality of light emitting devices ED.

As described above, each of the plurality of column lines CL may be electrically connected in common to a first electrode of each of two or more light emitting devices ED disposed in the same column among the plurality of light emitting devices ED. Each of the plurality of row lines RL may be electrically connected in common with a second electrode of each of two or more light emitting devices ED disposed in the same row among the plurality of light emitting devices ED.

As described above, the plurality of row lines RL may be sequentially driven. For example, at any one point in time, a first low-potential voltage VSS1 may be applied to one row line RL among the plurality of row lines RL, and a second low-potential voltage VSS2 higher than the first low-potential voltage VSS1 may be applied to the remaining row lines RL.

As described above, the display device 100 according to the embodiments of the present disclosure may include a plurality of unit driving areas UDA included in the display area DA, a plurality of light emitting devices ED disposed in each of the plurality of unit driving areas UDA, a plurality of column lines CL arranged in each of the plurality of unit driving areas UDA and electrically connected to first electrodes of each of the plurality of light emitting devices ED, a plurality of row lines RL arranged in each of the plurality of unit driving areas UDA and electrically connected to second electrodes of each of the plurality of light emitting devices ED, and a touch sensor TS including the same metal as the plurality of row lines RL.

The display device 100 according to the embodiments of the present disclosure may further include an overcoat layer 1430 disposed on the plurality of row lines RL and the touch sensor TS. The overcoat layer 1430 may be a planarization layer including a transparent insulating material.

The display device 100 according to the embodiments of the present disclosure may further include a driver DRV disposed in each of a plurality of unit driving areas UDA, driving a plurality of light emitting devices ED, and driving or sensing a touch sensor TS.

FIG. 21 is a graph of sensing data SEN_DATA during a touch operation according to the embodiments of the present disclosure.

Referring to FIG. 21, a touch display portion 2210 may be positioned on a substrate 210. The touch display portion 2210 may include a plurality of light emitting devices and a plurality of touch sensors. An adhesive layer 1440 and a cover member 118 may be disposed on the touch display portion 2210.

The display device 100 may detect a user's touch operation. For example, a user's finger 2220 may come into contact with the cover member 118. If the user's finger 2220 comes into contact with the cover member 118, the display device 100 may sense sensing data SEN_DATA based on changes in capacitance.

Referring to FIG. 21, a period for detecting the touch may include a first period P1, a second period P2, and a third period P3.

The first period P1 may be a period during which a finger approaches the cover member 118. At this time, the sensing data SEN_DATA may be a first data value DATAL. The first data value DATA1 may be lower than a reference data TS. When the sensing data SEN_DATA is lower than the reference data TS, the display device 100 may detect that there is no touch on the display device 100.

The second period P2 may be a period during which a finger is in contact with the cover member 118. The sensing data SEN_DATA is a first data value DATA1 at a first time point tU. Thereafter, the sensing data SEN_DATA increases to a second data value DATA2 at a second time point t2. The reason why the sensing data SEN_DATA increases from the first data value DATA1 to the second data value DATA2 may be due to the heat from the finger. For example, the heat from the finger may be transferred to a layer including an organic material such as an adhesive layer 1440. In this case, the inherent permittivity of the organic material may change. If the permittivity changes, the capacitance for the organic material may also change. That is, the heat from the finger may change the capacitance. The capacitance may change due to the heat from the finger, and thus the sensing data SEN_DATA value may also change. Although the temperature increase due to the finger is an example, the same applies to the temperature change due to the surrounding environment of the display device 100. The change in the sensing data SEN_DATA due to the heat from the finger will be explained through a graph.

Referring to FIG. 21, in the second period P2, the sensing data SEN_DATA may increase to a third data value DATA3. The sensing data SEN_DATA is the second data value DATA2 at the second time point t2. Thereafter, the sensing data SEN_DATA increases to the third data value DATA3 at a third time point t3. The reason why the sensing data SEN_DATA increases from the second data value DATA2 to the third data value DATA3 may be due to a change in the capacitance formed between the finger and the display device 100.

The third period P3 may be a period in which the finger touches the cover member 118 and then falls off. After the finger falls off the display device 100, the sensing data SEN_DATA value decreases. The sensing data SEN_DATA is the second data value DATA2 at the fourth time point t4 and becomes lower than the reference data TS thereafter.

Since the third period P3 is a period in which the finger is away from the cover member 118, the display device 100 should not detect a touch operation during the third period P3. However, the sensing data SEN_DATA has the second data value DATA2 at the fourth time point t4 included in the third period P3. In this case, since the second data value DATA2 is greater than the reference data TS, the display device 100 may determine that a touch operation occurred during the third period P3. There is a problem in that it is determined that a touch operation occurred even though there was no touch operation, and this phenomenon may be called a ghost touch phenomenon.

If the ambient temperature of the display device 100 changes, each of the first touch sensing value and the second touch sensing value may change. This may be due to the temperature change of the dielectric constant of the adhesive layer 1440 illustrated in FIG. 20. The insulating layer may include an organic material having a dielectric constant changing depending on the ambient temperature. However, according to the embodiments of the present disclosure, if the ambient temperature of the display device 100 changes, the sensing data SEN_DATA may not change or may change by less than a specific amount of change.

The embodiments of the present disclosure may provide a display device 100 capable of accurately sensing a touch operation through differential sensing.

The embodiments of the present disclosure may provide a display device 100 capable of removing noise from sensing data SEN_DATA for determining a touch operation through differential sensing.

The embodiments of the present disclosure can provide a display device 100 capable of low power consumption by accurately sensing a touch action through differential sensing.

Figure 22:
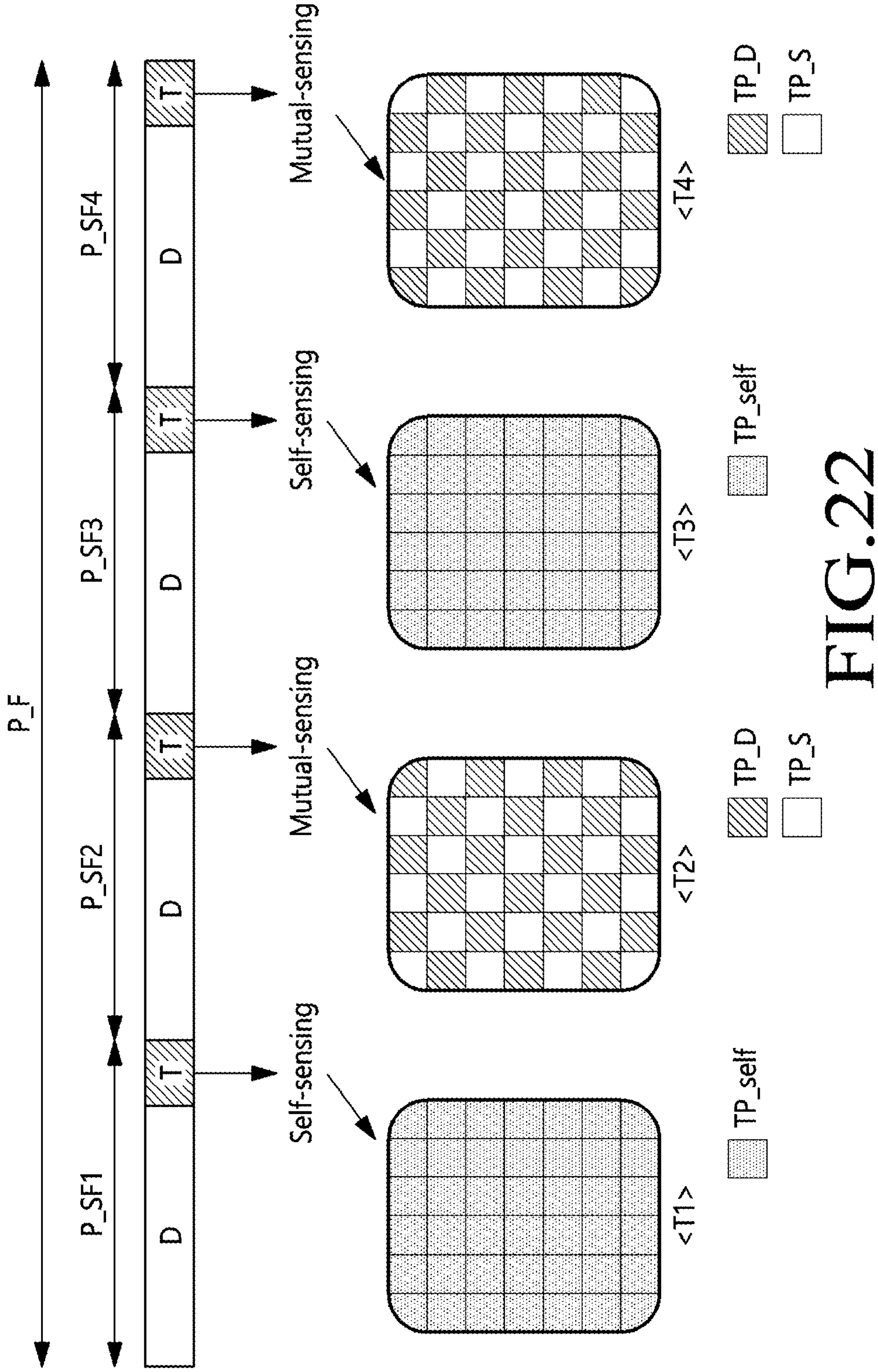
FIG. 22 is a driving timing diagram of a display device according to embodiments of the present disclosure.

FIG. 22 is a driving timing diagram of a display device 100 according to the embodiments of the present disclosure.

The display device 100 according to the embodiments of the present disclosure can may allocate a display driving period D and a touch driving period T, perform display driving during the display driving period D, and perform touch driving during the touch driving period T.

The display device 100 according to the embodiments of the present disclosure may perform display driving and touch driving according to a time-division driving method or a simultaneous driving method.

As an example, the display device 100 according to the embodiments of the present disclosure may allocate a display driving period D and a touch driving period T as separate time periods according to a time-division driving method, perform display driving during the display driving period D, and perform touch driving during a touch driving period T different from the display driving period D.

As another example, the display device 100 according to the embodiments of the present disclosure may simultaneously perform display driving and touch driving during the display driving period D and touch driving period T by allocating the display driving period D and the touch driving period T that overlap in time according to the simultaneous driving method.

Hereinafter, for the convenience of explanation, it is exemplified a case in which the display device 100 according to the embodiments of the present disclosure performs display driving and touch driving at different time periods according to the time-division driving method. However, the present disclosure is not limited thereto.

As an example of the time-division driving method, as illustrated in FIG. 22, one display driving period D and one touch driving period T may alternately proceed. That is, one display driving period D may proceed, and then a touch driving period T may proceed.

Referring to FIG. 22, one display driving period D proceeds between the touch driving periods T. However, two or more display driving periods D may be performed between touch driving periods T. For example, after one touch driving period T has elapsed, four display driving periods D may be performed. After that, one touch driving period T may be performed, and then four display driving periods D may be performed again.

One frame period P_F may include a plurality of sub-frame periods P_SF1, . . . , P_SF4. Each of the sub-frame periods P_SF1, . . . , P_SF4 may include one touch driving period T and at least one display driving period D.

Referring to FIG. 22, four touch driving periods T are illustrated. The four touch driving periods T may include a first touch driving period T1, a second touch driving period T2, a third touch driving period T3, and a fourth touch driving period T4.

The first touch driving period T1 and the third touch driving period T3 may be periods in which self-capacitance-based touch sensing is performed. Referring to FIG. 22, there are illustrated touch pixel areas TP_self to which touch driving signals are supplied in the first touch driving period T1 and the third touch driving period T3.

The second touch driving period T2 and the fourth touch driving period T4 may be periods in which mutual-capacitance-based touch sensing is performed. Referring to FIG. 22, there are illustrated touch pixel areas TP_S to which touch driving signals are supplied in the second touch driving period T2 and the fourth touch driving period T4.

The touch pixel area TP_D supplied with the touch driving signal in the second touch driving period T2 may be different from the touch pixel area TP_D supplied with the touch driving signal in the fourth touch driving period T4. The touch pixel area TP_S in which sensing of a touch action is performed in the second touch driving period T2 may be different from the touch pixel area TP_S in which sensing of a touch action is performed in the fourth touch driving period T4.

Hereinafter, the touch driving signals supplied in the touch driving periods T will be described in more detail.

Figure 23:
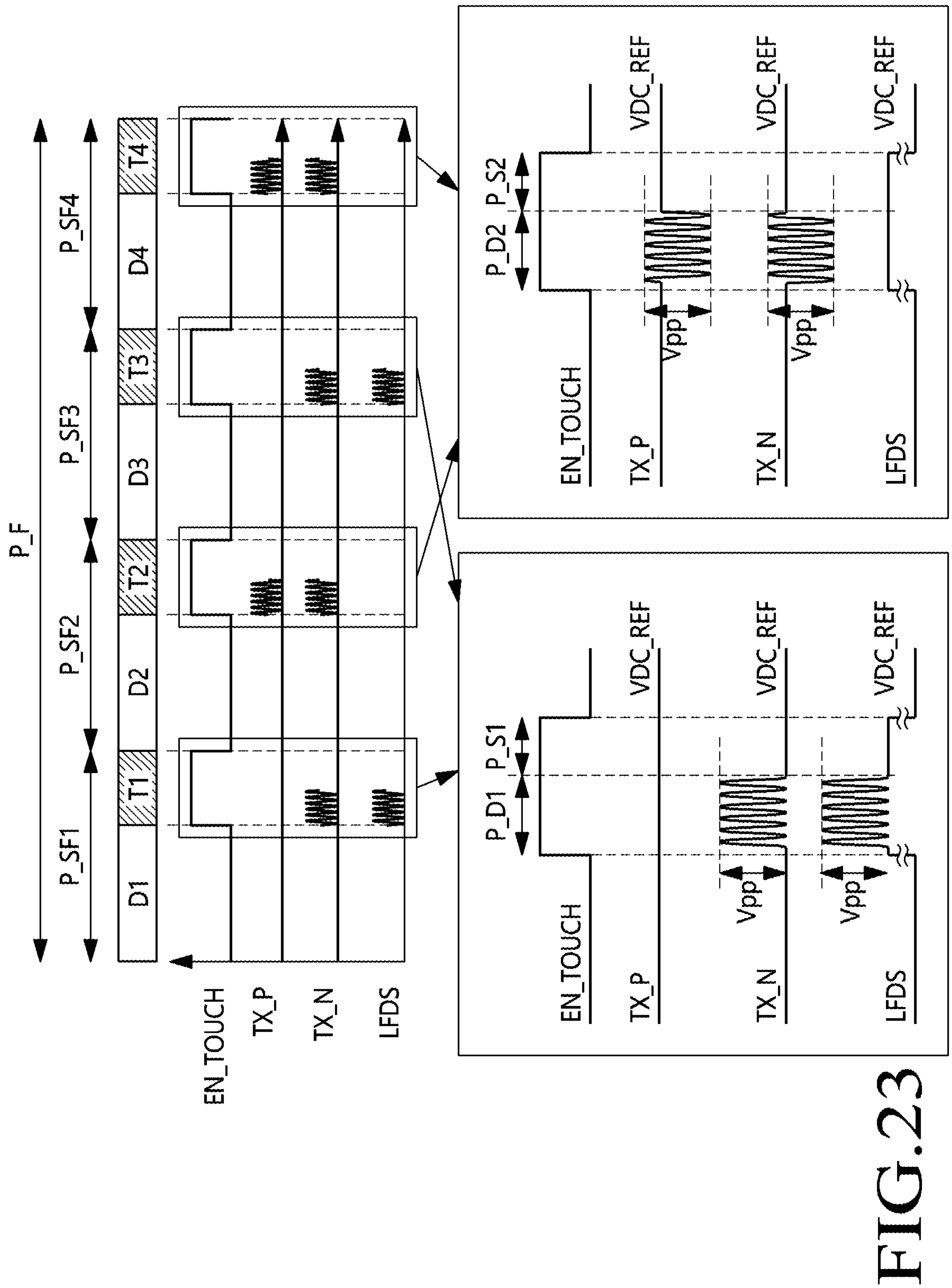
FIG. 23 illustrates signals according to driving timing of a display device according to embodiments of the present disclosure.

FIG. 23 illustrates a signal according to the driving timing of the display device 100 according to the embodiments of the present disclosure.

Referring to FIG. 23, one frame period P_F may include a plurality of sub-frame periods P_SF1, . . . , P_SF4.

A first sub-frame period P_SF1 may include a first display driving period D1 and a first touch driving period T1. A second sub-frame period P_SF2 may include a second display driving period D2 and a second touch driving period T2. A third sub-frame period P_SF3 may include a third display driving period D3 and a third touch driving period T3. A fourth sub-frame period P_SF4 may include a fourth display driving period D4 and a fourth touch driving period T4.

The display driving period D and the touch driving period T may be distinguished by a touch enable signal EN_TOUCH. The touch enable signal EN_TOUCH may be in a low level state during the display driving period D, and in a high level state during the touch driving period T. That is, the touch enable signal EN_TOUCH during the display driving period D may be different from the touch enable signal EN_TOUCH during the touch driving period T.

The first touch driving period T1 and the third touch driving period T3 may be periods in which self-capacitance-based touch sensing is performed. During the first touch driving period T1 or the third touch driving period T3, noise generated in the display device 100 may be monitored. This may be referred to as a noise monitoring. The noise monitoring may be performed when a touch operation first starts. When a touch operation first starts, an operation to find an optimal touch frequency may be performed. In addition, as noise monitoring is performed, data for detecting an optimal touch operation may be collected. For example, in the noise monitoring operation, noise caused by the display and temperature caused by the surrounding environment may be monitored. As the noise monitoring operation is performed, a touch driving frequency with the least display noise may be searched. Since the noise monitoring operation is an operation for searching an optimal touch driving frequency, a touch operation may not be detected in the noise monitoring operation. That is, a touch operation may be detected in a touch driving period after the noise monitoring operation.

After the noise monitoring operation, self-capacitance-based touch sensing may be performed. At this time, touch coordinates may be extracted. That is, the noise monitoring operation may be an operation in which self-capacitance-based touch sensing is performed and an optimal touch driving frequency is searched. In addition, the operation in which self-capacitance-based touch sensing is performed after noise detection may be an operation in which touch coordinates are extracted.

Each of the first touch driving period T1 and the third touch driving period T3 may include a first touch driving signal supply period P_D1 and a first touch sensing period P_S1. During the first touch driving signal supply period P_D1, a load-free driving signal LFDS may be supplied to the load-free driving electrodes illustrated in FIG. 16. During the first touch driving signal supply period P_D1, a touch driving signal TX_N may be supplied to a plurality of touch electrodes. The touch driving signal TX_N may be in the form of a sine wave having a peak-to-peak voltage Vpp as an amplitude. The load-free driving signal LFDS may be a signal of the same form as the touch driving signal TX_N. Referring to FIG. 23, the touch driving signal TX_N and the load-free driving signal LFDS may have a reference DC voltage VDC_REF as a minimum value. The reference DC voltage VDC_REF may be 0 V, but is not limited thereto. The touch driving signal TX_N and the load-free driving signal LFDS may be supplied to the display panel 110 during the first touch driving signal supply period P_D1, and then the first touch sensing period P_S1 proceeds. The display device 100 may sense a plurality of touch electrodes during the first touch sensing period P_S1 to acquire sensing data SEN_DATA.

The second touch driving period T2 and the fourth touch driving period T4 may be periods in which mutual-capacitance-based touch sensing is performed. The second touch driving period T2 and the fourth touch driving period T4 may include a second touch driving period P_D2 and a second touch sensing period P_S2. During the second touch driving period P_D2, a positive touch driving signal TX_P and a negative touch driving signal TX_N may be supplied to a plurality of touch electrodes. The positive touch driving signal TX_P may be in an inverse phase relationship to the negative touch driving signal TX_N. That is, the positive touch driving signal TX_P may have the same frequency and amplitude as the negative touch driving signal TX_N, but may have a different phase. Referring to FIG. 23, the form of the negative touch driving signal TX_N is the same as the inverted form of the positive touch driving signal TX_P. The positive touch driving signal TX_P and the negative touch driving signal TX_N may be sinusoidal waves having peak-to-peak voltage Vpp as an amplitude.

During the second touch driving period T2 and the fourth touch driving period T4, the voltage state of the load-free driving signal LFDS may be a reference DC voltage VDC_REF. During the second touch sensing period P_S2, the voltage state of the positive touch driving signal TX_P and the negative touch driving signal TX_N may be a reference DC voltage VDC_REF.

The positive touch driving signal TX_P and the negative touch driving signal TX_N are illustrated to be greater or less than the reference DC voltage VDC_REF during the second touch driving period P_D2. However, this is not limited thereto, and the positive touch driving signal TX_P and the negative touch driving signal TX_N may be sinusoidal waves having the reference DC voltage VDC_REF as the maximum or minimum value.

Hereinafter, it will be described in more detail a touch pixel area to which the touch driving signal TX_N for self-sensing and the positive touch driving signal TX_P and the negative touch driving signal TX_N for mutual sensing are supplied.

Figure 24:
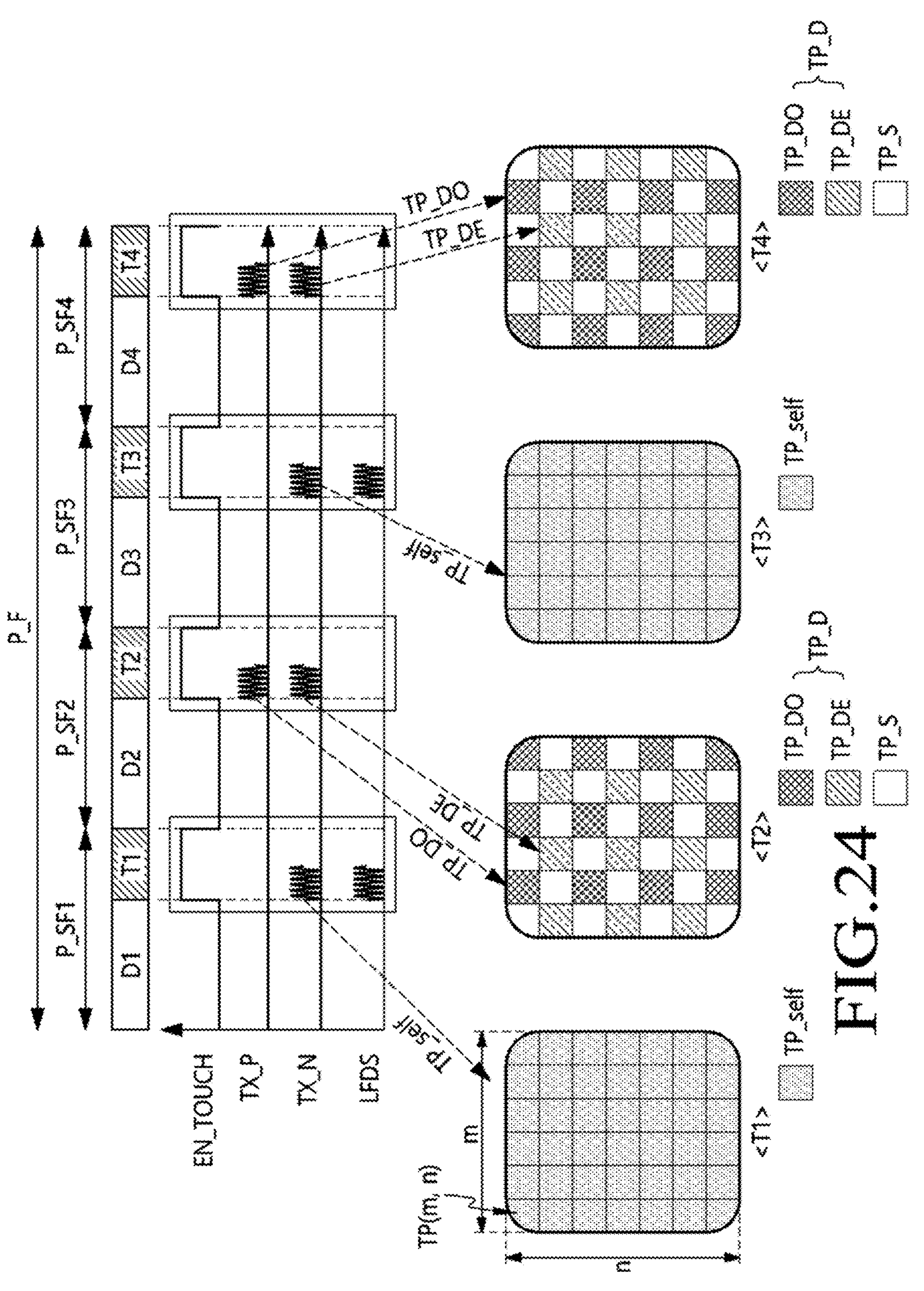
FIG. 24 illustrates signals supplied to a plurality of touch electrodes during a touch driving period according to embodiments of the present disclosure.

FIG. 24 is a diagram of signals supplied to a plurality of touch electrodes during the touch driving period T according to embodiments of the present disclosure.

Referring to FIG. 24, the touch pixel areas TP(m, n) can be arranged in a matrix form of 6*7. For example, the touch pixel areas TP(m, n) may be 42 in total, 6 can be arranged horizontally (m) and 7 can be arranged vertically (n). The touch pixel areas TP(m, n) located in the n-th row and m-th column may be defined as "an n-th row and m-th column touch pixel area TP(m, n)."

In the first touch driving period T1 and the third touch driving period T3, the touch driving signal TX_N may be supplied to all touch pixel areas TP_self. That is, when a touch operation is detected based on self-capacitance, the touch driving signal TX_N can be supplied to all touch pixel areas TP_self.

During the second touch driving period T2 and the fourth touch driving period T4, a touch driving signal may be supplied to only 21 touch pixel areas TP_D among 42 touch pixel areas TP_D and TP_S. A positive touch driving signal TX_P may be supplied to an odd-numbered touch pixel area, and a negative touch driving signal TX_N may be supplied to an even-numbered touch pixel area.

During the second touch driving period T2, a negative touch driving signal TX_N may be supplied to a second row and first column touch pixel area TP(1, 2), a fourth row and first column touch pixel area TP(1, 4), and a sixth row and first column touch pixel area TP(1, 6).

During the second touch driving period T2, a positive touch driving signal TX_P may be supplied to a first row and second column touch pixel area TP(2, 1), a third row and second column touch pixel area TP(2, 3), a fifth row and second column touch pixel area TP(2, 5), and a seventh row and second column touch pixel area TP(2, 7).

During the second touch driving period T2, a negative touch driving signal TX_N may be supplied to a second row and third column touch pixel area TP(3, 2), a fourth row and third column touch pixel area TP(3, 4), and a sixth row and third column touch pixel area TP(3, 6).

During the second touch driving period T2, a positive touch driving signal TX_P may be supplied to a first row and fourth column touch pixel area TP(4, 1), a third row and fourth column touch pixel area TP(4, 3), a fifth row and fourth column touch pixel area TP(4, 5), and a seventh row and fourth column touch pixel area TP(4, 7).

During the second touch driving period T2, a negative touch driving signal TX_N may be supplied to a second row and fifth column touch pixel area TP(5, 2), a fourth row and fifth column touch pixel area TP(5, 4), and a sixth row and fifth column touch pixel area TP(5, 6).

During the second touch driving period T2, a positive touch driving signal TX_P may be supplied to a first row and sixth column touch pixel area TP(6, 1), a third row and sixth column touch pixel area TP(6, 3), a fifth row and sixth column touch pixel area TP(6, 5), and a seventh row and sixth column touch pixel area TP(6, 7).

During the fourth touch driving period T4, a positive touch driving signal TX_P may be supplied to a first row and first column touch pixel area TP(1, 1), a third row and first column touch pixel area TP(1, 3), a fifth row and first column touch pixel area TP(1, 5), and a seventh row and first column touch pixel area TP(1, 7).

During the fourth touch driving period T4, a negative touch driving signal TX_N may be supplied to a second row and second column touch pixel area TP(2, 2), a fourth row and second column touch pixel area TP(2, 4), and a sixth row and second column touch pixel area TP(2, 6).

During the fourth touch driving period T4, a positive touch driving signal TX_P may be supplied to a first row and third column touch pixel area TP(3, 1), a third row and third column touch pixel area TP(3, 3), a fifth row and third column touch pixel area TP(3, 5), and a seventh row and third column touch pixel area TP(3, 7).

During the fourth touch driving period T4, a negative touch driving signal TX_N may be supplied to a second row and fourth column touch pixel area TP(4, 2), a fourth row and fourth column touch pixel area TP(4, 4), and a sixth row and fourth column touch pixel area TP(4, 6).

During the fourth touch driving period T4, a positive touch driving signal TX_P may be supplied to a first row and fifth column touch pixel area TP(5, 1), a third row and fifth column touch pixel area TP(5, 3), a fifth row and fifth column touch pixel area TP(5, 5), and a seventh row and fifth column touch pixel area TP(5, 7).

During the fourth touch driving period T4, a negative touch driving signal TX_N may be supplied to a second row and sixth column touch pixel area TP(6, 2), a fourth row and sixth column touch pixel area TP(6, 4), and a sixth row and sixth column touch pixel area TP(6, 6).

The supply of each of the touch driving signal, the positive touch driving signal TX_P and the negative touch driving signal TX_N has been described. Hereinafter, a method of sensing a touch operation will be described.

Figure 25:
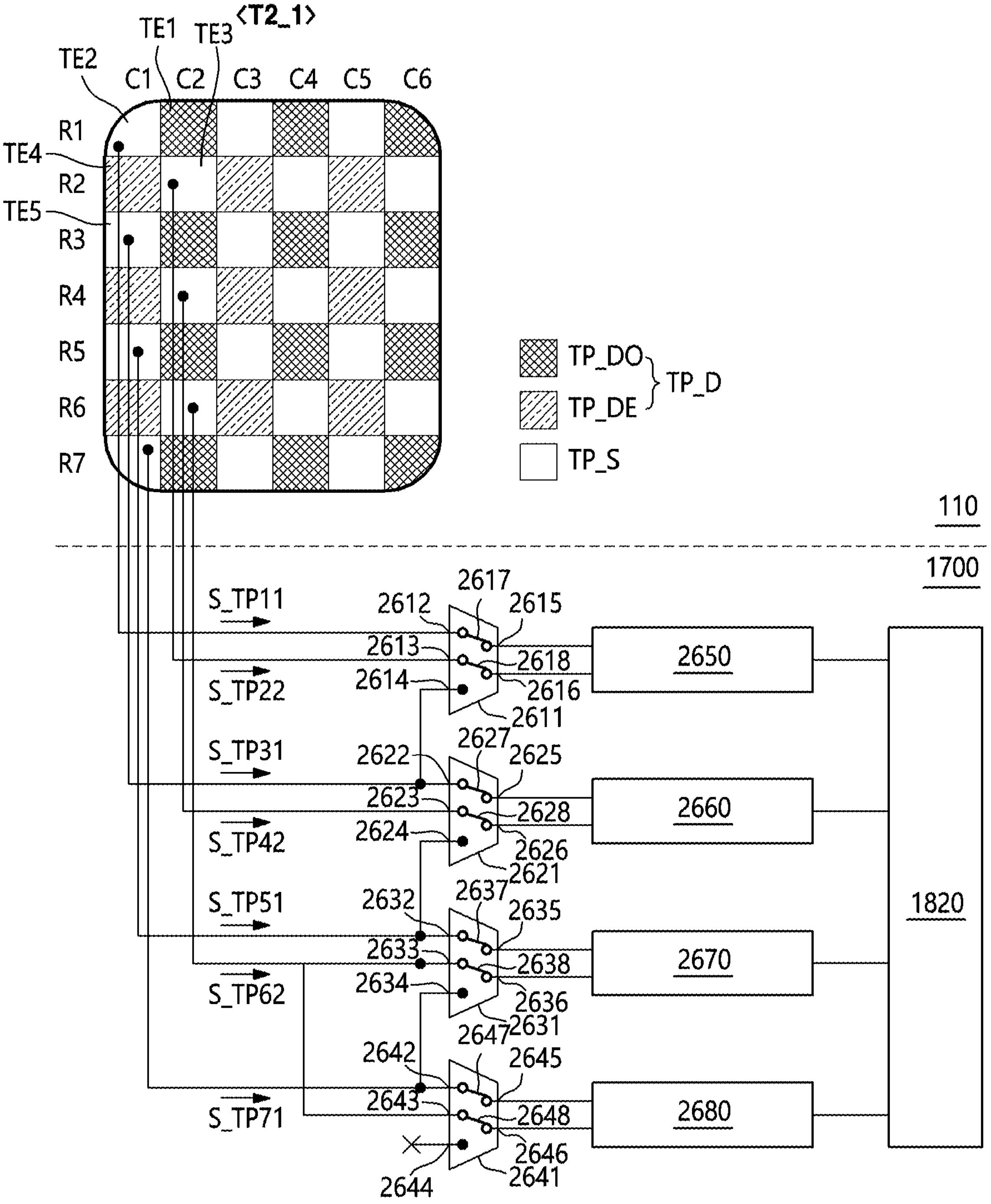
FIG. 25 and FIG. 26 are example diagrams of differential sensing according to embodiments of the present disclosure.
Figure 26:
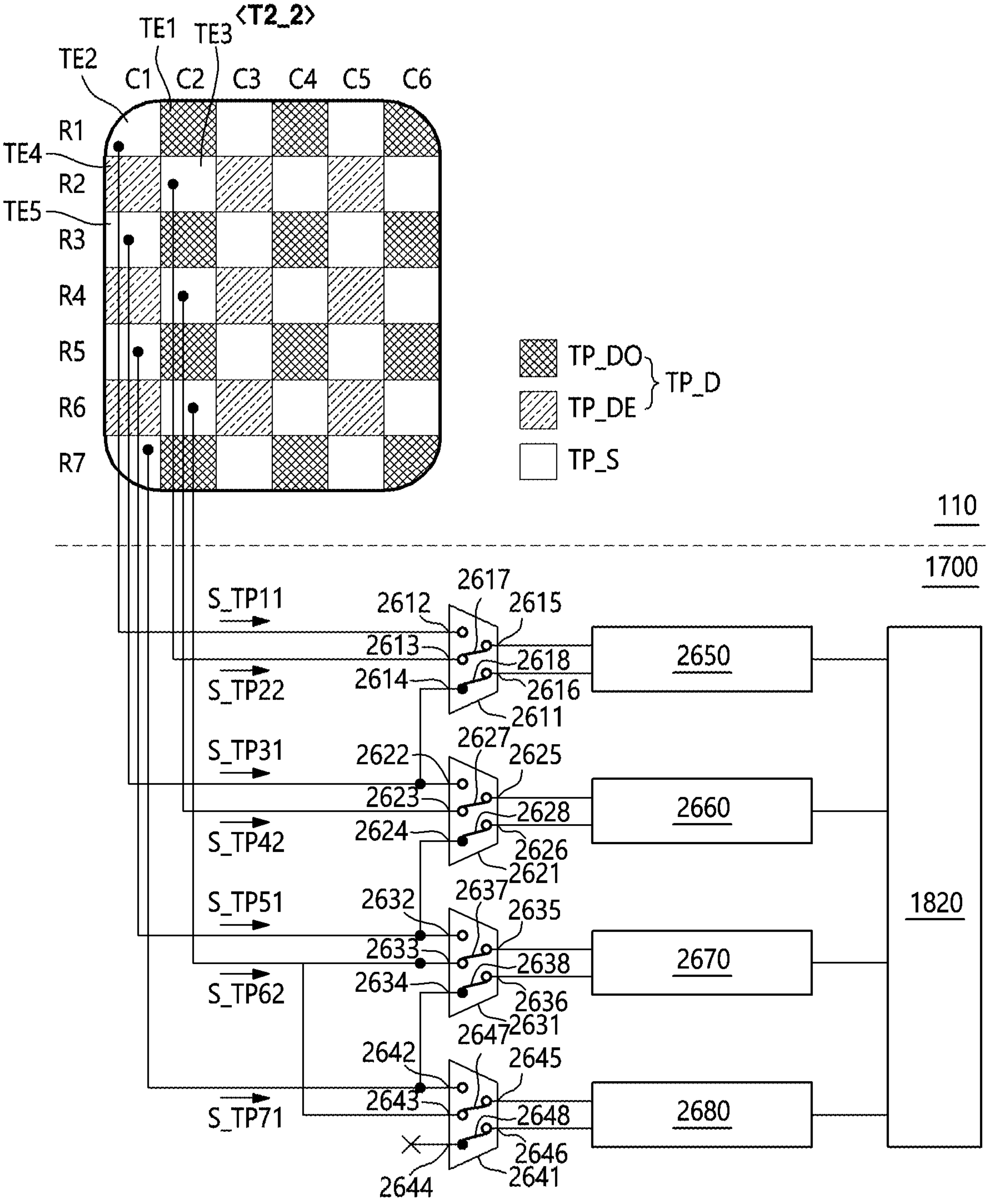

FIG. 25 and FIG. 26 are example diagrams for differential sensing according to embodiments of the present disclosure.

Referring to FIG. 25, the number of touch pixel areas TP_D and TP_S may be 42. The touch pixel areas TP_D and TP_S may be positioned in a 6*7 matrix form. In this case, a first row and first column touch pixel area (R1, C1) may be defined as an 11-th touch pixel area (R1, C1). In other words, the n-th row and m-th column touch pixel area may be defined as the nm-th touch pixel area (Rn, Cm).

Referring to FIG. 25, the touch control circuit 1700 may include a first multiplexer 2611, a second multiplexer 2621, a third multiplexer 2631, and a fourth multiplexer 2641. The multiplexers 2611, . . . , 2641 may change an input terminal connected to an output terminal by controlling a switch included in the multiplexers 2611, . . . , 2641.

The touch control circuit 1700 may include a first differential amplifier 2650, a second differential amplifier 2660, a third differential amplifier 2670, and a fourth differential amplifier 2680. The differential amplifier may differentiate two signals input to the differential amplifier and then amplify the level or size of the signal.

Each of the multiplexers 2611, . . . , 2641 may include three input terminals and two output terminals. Each of the multiplexers 2611, . . . , 2641 may include two control switches.

The first multiplexer 2611 may include an 11-th input terminal 2612, a 12-th input terminal 2613, a 13-th input terminal 2614, an 11-th output terminal 2615, a 12-th output terminal 2616, an 11-th switch 2617, and a 12-th switch 2618.

The 11-th input terminal 2612 may be electrically connected to the 11-th touch pixel area (R1, C1).

The 12-th input terminal 2613 may be electrically connected to a 22-th touch pixel area (R2, C2).

The 13-th input terminal 2614 may be electrically connected to a 21-th input terminal 2622.

The 11-th switch 2617 may be electrically connected to the 11-th input terminal 2612 or the 12-th input terminal 2613 and the 11-th output terminal 2615.

The 12-th switch 2618 may be electrically connected to the 12-th input terminal 2613 or the 13-th input terminal 2614 and the 12-th output terminal 2616.

The first differential amplifier 2650 may be electrically connected to the 11-th output terminal 2615, the 12-th output terminal 2616, and the touch sensing circuit 1820.

The second multiplexer 2621 may include a 21-th input terminal 2622, a 21-th input terminal 2623, a 23-th input terminal 2624, a 21-th output terminal 2625, a 22-th output terminal 2626, a 21-th switch 2627, and a 22-th switch 2628.

The 21-th input terminal 2622 may be electrically connected to a 31-th touch pixel area (R3, C1).

The 22-th input terminal 2623 may be electrically connected to a 42-th touch pixel area (R4, C2).

The 23-th input terminal 2624 may be electrically connected to the 31-th input terminal 2632.

The 21-th switch 2627 may be electrically connected to the 21-th input terminal 2622 or the 22-th input terminal 2623 and the 21-th output terminal 2625.

The 22-th switch 2628 may be electrically connected to the 22-th input terminal 2623 or the 23-th input terminal 2624 and the 22-th output terminal 2626.

The second differential amplifier 2660 may be electrically connected to the 21-th output terminal 2625, the 22-th output terminal 2626, and the touch sensing circuit 1820.

The third multiplexer 2631 may include a 31-th input terminal 2632, a 32-th input terminal 2633, a 33-th input terminal 2634, a 31-th output terminal 2635, a 32-th output terminal 2636, a 31-th switch 2637, and a 32-th switch 2638.

The 31-th input terminal 2632 may be electrically connected to a 51-th touch pixel area (R5, C1).

The 32-th input terminal 2633 may be electrically connected to a 62-th touch pixel area (R6, C2).

The 33-th input terminal 2634 may be electrically connected to a 41-th input terminal 2642.

The 31-th switch 2637 may be electrically connected to the 31-th input terminal 2632 or the 32-th input terminal 2633 and the 31-th output terminal 2635.

The 32-th switch 2638 may be electrically connected to the 32-th input terminal 2633 or the 33-th input terminal 2634 and the 32-th output terminal 2636.

The third differential amplifier 2670 may be electrically connected to the 31-th output terminal 2635, the 32-th output terminal 2636, and the touch sensing circuit 1820.

The fourth multiplexer 2641 may include a 41-th input terminal 2642, a 42-th input terminal 264, a 43-th input terminal 2644, a 41-th output terminal 2645, a 42-th output terminal 2646, a 41-th switch 2647, and a 42-th switch 2648.

The 41-th input terminal 2642 may be electrically connected to a 71-th touch pixel area (R7, C1).

The 42-th input terminal 2643 may be electrically connected to the 32-th input terminal 2633.

The 43-th input terminal 2644 may be electrically floating.

The 41-th switch 2647 may be electrically connected to the 41-th input terminal 2642 or the 42-th input terminal 2643 and the 41-th output terminal 2645.

The 42-th switch 2648 may be electrically connected to the 42-th input terminal 2643 or the 43-th input terminal 2644 and the 42-th output terminal 2646.

The fourth differential amplifier 2680 may be electrically connected to the 41-th output terminal 2645, the 42-th output terminal 2646, and the touch sensing circuit 1820.

Hereinafter, a first sensing period T2_1 of the second touch driving period T2 will be described with reference to FIG. 25, and a second sensing period T2_2 of the second touch driving period T2 will be described with reference to FIG. 26.

The first sensing period T2_1 may be a period for sensing signals for the 11-th touch pixel area (R1, C1), the 31-th touch pixel area (R3, C1), the 51-th touch pixel area (R5, C1), and the 71-th touch pixel area (R7, C1). During the first sensing period T2_1, sensing is also performed for the remaining touch pixel areas, but for the convenience of explanation, a description thereof will be omitted.

The second sensing period T2_2 may be a period for sensing signals for the 22-th touch pixel area (R2, C2), the 42-th touch pixel area (R4, C2), and the 62-th touch pixel area (R6, C2). During the second sensing period T2_2, sensing is also performed for the remaining touch pixel areas, but for the convenience of explanation, a description thereof will be omitted.

The first sensing period T2_1 may be defined as an odd sensing period, and the second sensing period T2_2 may be defined as an even sensing period.

Referring to FIG. 25, the 11-th switch 2617 of the first multiplexer 2611 may electrically connect the 11-th input terminal 2612 and the 11-th output terminal 2615. The 12-th switch 2618 of the first multiplexer 2611 may electrically connect the 12-th input terminal 2613 and the 12-th output terminal 2616. Accordingly, the first differential amplifier 2650 may receive a signal for the 11-th touch pixel area (R1, C1) and a signal for the 22-th touch pixel area (R2, C2). The first differential amplifier 2650 may subtract the signal for the 22-th touch pixel area (R2, C2) from the signal for the 11-th touch pixel area (R1, C1), and then amplify the subtracted signal. Then, the amplified signal may be supplied to the touch sensing circuit 1820.

The 11-th touch pixel area (R1, C1) is located adjacent to the 22-th touch pixel area (R2, C2). Therefore, the ambient temperature of the 11-th touch pixel area (R1, C1) may be similar to the ambient temperature of the 22-th touch pixel area (R2, C2). Therefore, the noise due to the temperature generated in the 11-th touch pixel area (R1, C1) may be similar to the noise due to the temperature generated in the 22-th touch pixel area (R2, C2). If the first differential amplifier 2650 subtracts the signal for the 22-th touch pixel area (R2, C2) from the signal for the 11-th touch pixel area (R1, C1), the noise due to the temperature can be removed from the signal for the 11-th touch pixel area (R1, C1). Through the above-described method, the ghost touch phenomenon generated due to the temperature of the user's finger 2220 can be prevented. Hereinafter, other multiplexers will be described.

Referring to FIG. 25, the 21-th switch 2627 of the second multiplexer 2621 may electrically connect the 21-th input terminal 2622 and the 21-th output terminal 2625. The 22-th switch 2628 of the second multiplexer 2621 may electrically connect the 22-th input terminal 2623 and the 22-th output terminal 2626. Accordingly, the second differential amplifier 2660 may receive a signal for the 31-th touch pixel area (R3, C1) and a signal for the 42-th touch pixel area (R4, C2). The second differential amplifier 2660 may generate sensing data SEN_DATA for the 31-th touch pixel area (R3, C1) from which temperature-related noise has been removed, based on the signal for the 31-th touch pixel area (R3, C1) and the signal for the 42-th touch pixel area (R4, C2).

Referring to FIG. 25, the 31-th switch 2637 of the third multiplexer 2631 may electrically connect the 31-th input terminal 2632 and the 31-th output terminal 2635. The 32-th switch 2638 of the third multiplexer 2631 may electrically connect the 32-th input terminal 2633 and the 32-th output terminal 2636. Accordingly, the third differential amplifier 2670 may be supplied with a signal for the 51-th touch pixel area (R5, C1) and a signal for the 62-th touch pixel area (R6, C2). The third differential amplifier 2670 may generate sensing data SEN_DATA for the 51-th touch pixel area (R5, C1) from which temperature-induced noise is removed, based on the signal for the 51-th touch pixel area (R5, C1) and the signal for the 62-th touch pixel area (R6, C2).

Referring to FIG. 25, the 41-th switch 2647 of the fourth multiplexer 2641 may electrically connect the 41-th input terminal 2642 and the 41-th output terminal 2645. The 42-th switch 2648 of the fourth multiplexer 2641 may electrically connect the 42-th input terminal 2643 and the 42-th output terminal 2646. Since the 42-th input terminal 2643 is electrically connected to the 32-th input terminal 2633, the 12-th output terminal 2616 may be electrically connected to the 62-th touch pixel area (R6, C2). Accordingly, the fourth differential amplifier 2680 may receive a signal for the 71-th touch pixel area (R7, C1) and a signal for the 62-th touch pixel area (R6, C2). The fourth differential amplifier 2680 may generate sensing data SEN_DATA for the 71-th touch pixel area (R7, C1) from which noise due to temperature is removed, based on the signal for the 71-th touch pixel area (R7, C1) and the signal for the 62-th touch pixel area (R6, C2).

The differential amplifiers 2650, . . . , 2680 may amplify the signals after subtracting, and the signal generated through the above-described process may be sensing data SEN_DATA. The sensing data SEN_DATA may be an analog value, or a digital value converted through an analog-to-digital converter. The sensing data SEN_DATA may be supplied to the touch sensing circuit 1820, and the touch sensing circuit 1820 can detect a touch operation based on the sensing data SEN_DATA.

However, the signal supplied to the differential amplifiers 2650, . . . , 2680 may be in a state where the analog value is converted to a digital value. That is, the differential amplifiers 2650, . . . , 2680 may receive a digital value, and then differentially amplify the digital value to generate sensing data SEN_DATA in a digital state.

The first sensing period T2_1 of the second touch driving period T2 has been described, and it will be described the second sensing period T2_2 of the second touch driving period T2.

Referring to FIG. 26, the 11-th switch 2617 of the first multiplexer 2611 may electrically connect the 12-th input terminal 2613 and the 11-th output terminal 2615. The 12-th switch 2618 of the first multiplexer 2611 can electrically connect the 13-th input terminal 2614 and the 12-th output terminal 2616. Accordingly, the first differential amplifier 2650 may receive a signal for the 22-th touch pixel area (R2, C2) and a signal for the 31-th touch pixel area (R3, C1). The first differential amplifier 2650 may subtract the signal for the 31-th touch pixel area (R3, C1) from the signal for the 22-th touch pixel area (R2, C2), and then amplify the subtracted signal. Then, the amplified signal may be supplied to the touch sensing circuit 1820. The first differential amplifier 2650 may generate sensing data SEN_DATA for the 22-th touch pixel area (R2, C2) from which temperature-related noise has been removed, based on the signal for the 22-th touch pixel area (R2, C2) and the signal for the 31-th touch pixel area (R3, C1).

Referring to FIG. 26, the 21-th switch 2627 of the second multiplexer 2621 may electrically connect the 22-th input terminal 2623 and the 21-th output terminal 2625. The 22-th switch 2628 of the second multiplexer 2621 may electrically connect the 23-th input terminal 2624 and the 22-th output terminal 2626. Accordingly, the second differential amplifier 2660 may be supplied with a signal for the 42-th touch pixel area (R4, C2) and a signal for the 51-th touch pixel area (R5, C1). The second differential amplifier 266) may generate sensing data SEN_DATA for the 42-th touch pixel area (R4, C2) from which temperature-induced noise is removed, based on the signal for the 42-th touch pixel area (R4, C2) and the signal for the 51-th touch pixel area (R5, C1).

Referring to FIG. 26, the 31-th switch 2637 of the third multiplexer 2631 may electrically connect the 32-th input terminal 2633 and the 31-th output terminal 2635. The 32-th switch 2638 of the third multiplexer 2631 may electrically connect the 33-th input terminal 2634 and the 32-th output terminal 2636. Accordingly, the third differential amplifier 2670 may receive a signal for the 62-th touch pixel area (R6, C2) and a signal for the 71-th touch pixel area (R7, C1). The second differential amplifier 2660 may generate sensing data SEN_DATA for the 62-th touch pixel area (R6, C2) from which temperature-related noise is removed, based on the signal for the 62-th touch pixel area (R6, C2) and the signal for the 71-th touch pixel area (R7, C1).

The above contents are summarized as follows. In the first sensing period T2_1 of the second touch driving period T2, sensing data SEN_DATA for the 11-th touch pixel area (R1, C1), the 31-th touch pixel area (R3, C1), the 51-th touch pixel area (R5, C1), and the 71-th touch pixel area (R7, C1) may be generated. Then, in the second sensing period T2_2 of the second touch driving period T2, sensing data SEN_DATA for the 22-th touch pixel area (R2, C2), the 42-th touch pixel area (R4, C2), and the 62-th touch pixel area (R6, C2) may be generated. That is, a method of generating sensing data SEN_DATA for 7 touch pixel areas out of 42 touch pixel areas has been described. Sensing data SEN_DATA for the remaining touch pixel areas may also be generated through multiplexers 2611, . . . , 2641 and differential amplifiers not shown in FIGS. 25 and 26.

Figure 27:
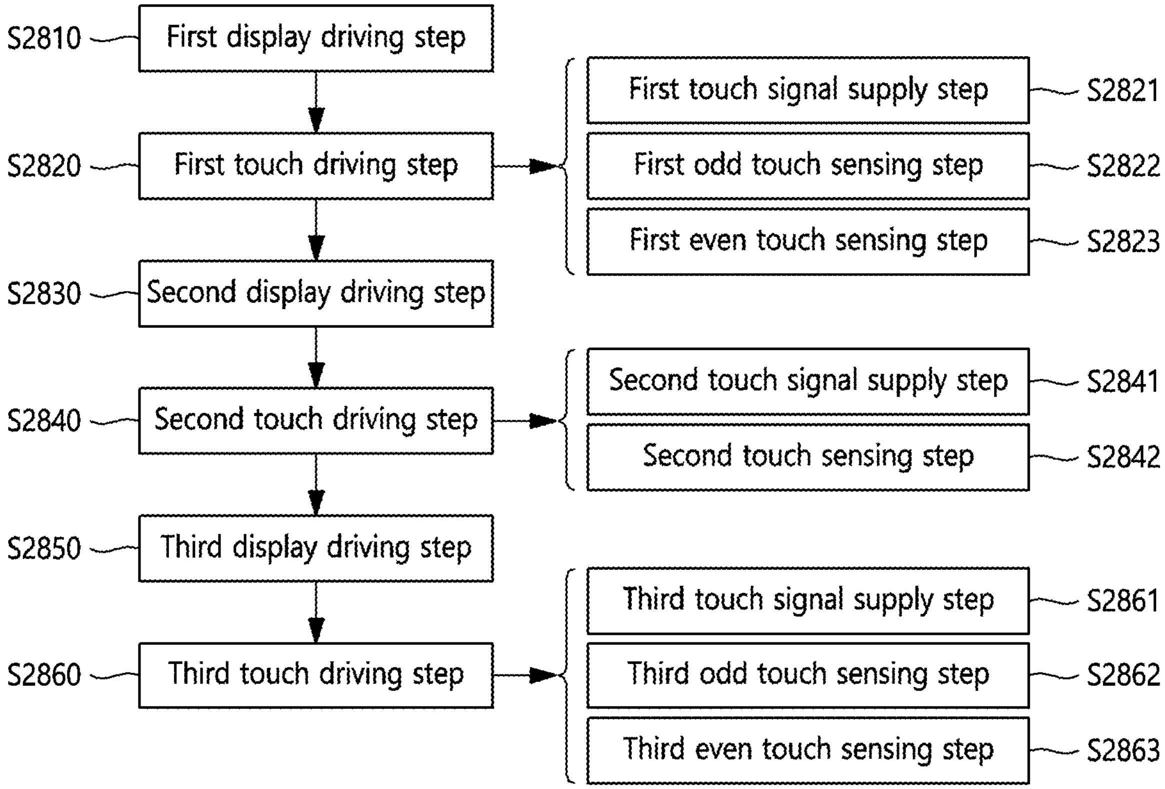
FIG. 27 is a flowchart of a driving method of a display device according to embodiments of the present disclosure.

FIG. 27 is a flowchart of a driving method of a display device 100 according to embodiments of the present disclosure.

The driving method of the display device 100 may include a first display driving operation (S2810), a first touch driving operation (S2820), a second display driving operation (S2830), and a second touch driving operation (S2840).

The first display driving operation (S2810) may be a period during which an image is expressed through the display panel 110. This may be the same as the second display driving period D2 illustrated in FIG. 24.

The first touch driving operation (S2820) may be a period during which touch sensing is performed. The first touch driving operation (S2820) may be the same as the second touch driving period (T2) illustrated in FIG. 24. The first touch driving operation (S2820) may be a period in which mutual-capacitance based touch sensing is performed.

The second display driving operation (S2830) may be a period in which an image is expressed through the display panel 110. This may be the same as the third display driving period D3 illustrated in FIG. 24.

The second touch driving operation (S2840) may be a period in which touch sensing is performed. The third touch driving operation (S2860) may be the same as the third touch driving period (T3) illustrated in FIG. 24. The second touch driving operation (S2840) may be a period in which self-capacitance based touch sensing is performed. In the second touch driving operation (S2840), a touch driving signal may be supplied to all touch electrodes.

A third display driving operation (S2850) may be a period in which an image is expressed through the display panel 110. This may be the same as the fourth display driving period D4 illustrated in FIG. 24.

A third touch driving operation (S2860) may be a period in which touch sensing is performed. The third touch driving operation (S2860) may be the same as the fourth touch driving period T4 illustrated in FIG. 24. The third touch driving operation S2860 may be a period in which mutual-capacitance-based touch sensing is performed. The touch electrode to which the touch driving signal is supplied in the third touch driving operation (S2860) may be different from the touch electrode to which the touch driving signal is supplied in the first touch driving operation (S2820).

The first touch driving operation (S2820) may include a first touch driving signal supply operation (S2821), a first odd touch sensing operation (S2822), and a first even touch sensing operation (S2823).

The first touch driving signal supply operation (S2821) may be an operation in which a first touch electrode TE1 receives a first touch driving signal, a second touch electrode TE2 and a third touch electrode TE3 do not receive the first touch driving signal, and a fourth touch electrode TE4 receives a second touch driving signal that is different from the first touch driving signal.

The first odd touch sensing operation (S2822) may be an operation in which the touch control circuit 1700 generates sensing data SEN_DATA based on the first sensing value for the second touch electrode TE2 and the second sensing value for the third touch electrode TE3.

The first even touch sensing operation (S2823) may include an operation in which the touch control circuit 1700 generates sensing data SEN_DATA based on the second sensing value for the third touch electrode TE3 and the third sensing value for a fifth touch electrode TE5.

The third touch driving operation (S2860) may include a third touch driving signal supply operation (S2861), a third odd touch sensing operation (S2862), and a third even touch sensing operation (S2863).

The third touch driving signal supply operation (S2861) may be an operation in which the second touch electrode TE2 receives the first touch driving signal, the first touch electrode TE1 and the fourth touch electrode TE4 do not receive the first touch driving signal, and the third touch electrode TE3 receives the second touch driving signal.

The third odd touch sensing operation (S2862) may be an operation in which the touch control circuit 1700 generates sensing data SEN_DATA based on the sensing value for the first touch electrode TE1 and the sensing value for the fourth touch electrode TE4.

The third even touch sensing operation (S2863) may include an operation in which the touch control circuit 1700 generates sensing data SEN_DATA based on the sensing value for the fourth touch electrode TE4 and the sensing value for a sixth touch electrode.

That is, the embodiments of the present disclosure may provide a display device 100 capable of accurately sensing a touch action through differential sensing.

The embodiments of the present disclosure can provide a display device 100 capable of removing noise from sensing data SEN_DATA for determining a touch action through differential sensing.

The embodiments of the present disclosure can provide a display device 100 capable of low power consumption by accurately sensing a touch action through differential sensing.

Figure 28:
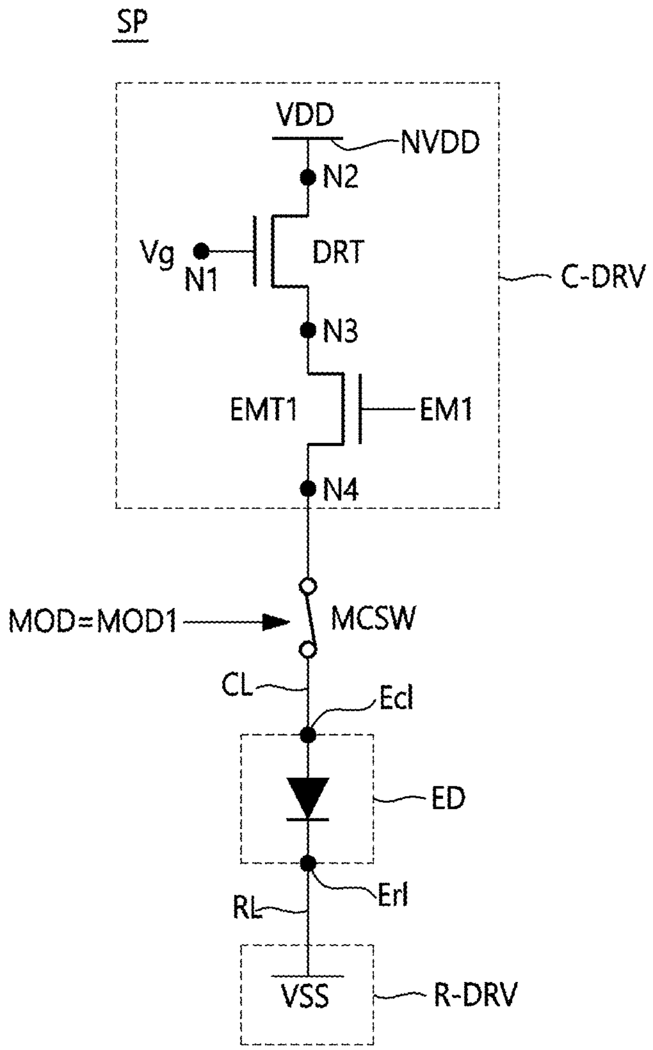
FIG. 28 and FIG. 29 illustrates states of sub-pixels according to operation modes of a display device according to embodiments of the present disclosure.
Figure 29:
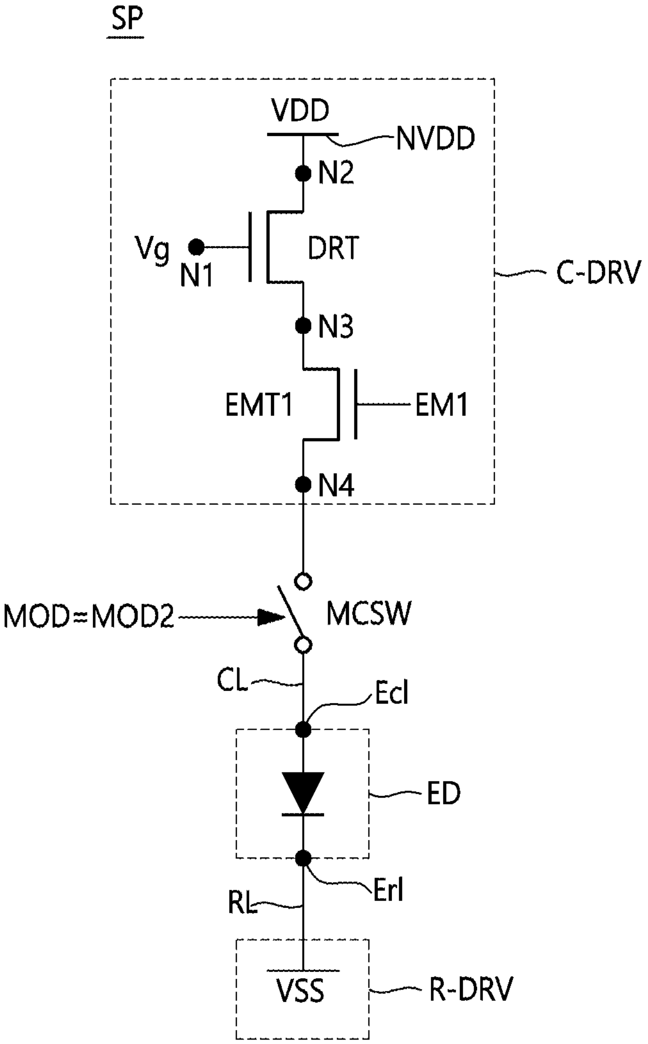

FIG. 28 and FIG. 29 illustrate the state of a sub-pixel according to the operation mode of a display device 100 according to embodiments of the present disclosure.

FIG. 28 illustrates the state of a sub-pixel when a display device 100 according to embodiments of the present disclosure is in a display mode, and FIG. 29 illustrates the state of a sub-pixel when a display device 100 according to embodiments of the present disclosure is in a touch mode. The equivalent circuits illustrated in FIG. 28 and FIG. 29 may correspond to the equivalent circuit of FIG. 4. Accordingly, the description of the equivalent circuit may be omitted. That is, the description of the internal circuit configuration of each of the column driver C-DRV and the row driver R-DRV may be omitted.

If the display device 100 operates according to the time-division driving method, during the display driving period D, the operation mode of the display device 100 may be a first mode (i.e., display mode), and during the touch driving period T, the operation mode of the display device 100 may be a second mode (i.e., touch mode).

As described above, each of the plurality of sub-pixels SP may include a light emitting device ED.

In order to drive each of the plurality of light emitting devices ED, a first driver DRV may include a column driver C-DRV electrically connected to a first electrode of each of the plurality of light emitting devices ED, and a row driver R-DRV electrically connected to a second electrode of each of the plurality of light emitting devices ED. At least one of the column driver C-DRV and the row driver R-DRV may be circuit configurations included in the sub-pixel SP.

If the light emitting device ED is in a state (e.g., on-state) capable of emitting light during touch driving, the voltage state of the touch sensor TS may be affected by the voltage state of the display driving related components (e.g., light emitting device, row lines, column lines, etc.). As a result, the touch sensitivity may deteriorate.

Accordingly, the display device 100 according to the embodiments of the present disclosure may further include a mode control switch MCSW that controls the connection between the first electrode of each of the plurality of light emitting devices ED and the column driver C-DRV according to a mode control signal MOD.

Referring to FIG. 28, if the mode control signal MOD is a first mode control signal MOD1, the mode control switch MCSW may be turned on. Accordingly, during the display driving period D, the column driver C-DRV and the light emitting device ED may be connected to each other, so that the light emitting device ED can emit light normally.

Referring to FIG. 29, if the mode control signal MOD is a second mode control signal MOD2 different from the first mode control signal MOD1, the mode control switch MCSW may be turned off. Accordingly, during the touch driving period T, the connection between the column driver C-DRV and the light emitting device ED may be disconnected, so that the light emitting device ED is in an off state (e.g., non-emission state), and does not affect the touch sensor TS.

Referring to FIG. 28 and FIG. 29, the first mode control signal MOD1 may be a signal indicating that the operation mode is the first mode (e.g., display mode). The second mode control signal MOD2 may be a signal indicating that the operation mode is the second mode (e.g., touch mode). For example, the first mode control signal MOD1 and the second mode control signal MOD2 may be signals having different voltage levels.

Referring to FIG. 28, if the mode control switch MCSW is turned on, that is, if the mode control signal MOD is the first mode control signal MOD1, a signal having a constant voltage level may be applied to the touch sensor TS. That is, the touch sensor TS may be in a state where the touch driving signal TDS is not applied.

Referring to FIG. 29, if the mode control switch MCSW is in a turn-off state, that is, if the mode control signal MOD is the second mode control signal MOD2, a signal having a variable voltage level may be applied to the touch sensor TS. That is, the touch sensor TS may be in a state in which the touch driving signal TDS is applied.

The display device 100 according to the embodiments of the present disclosure described above may be included in various devices or electronic devices. For example, the various electronic devices may include wearable devices such as smart watches, mobile devices, laptops, and monitors or televisions.

A display device according to embodiments of the present disclosure may be described as follows.

Embodiments of the present disclosure may provide a driving method of a display device including a first touch driving signal supply operation in which a first touch electrode receives a first touch driving signal, a second touch electrode and a third touch electrode do not receive the first touch driving signal, and a fourth touch electrode receives a second touch driving signal different from the first touch driving signal, and a first touch sensing operation in which a touch circuit generates sensing data based on a difference value between a first sensing value for the second touch electrode and a second sensing value for the third touch electrode.

The driving method of a display device according to embodiments of the present disclosure may further include a second touch driving signal supply operation in which the second touch electrode receives the first touch driving signal, the first and fourth touch electrodes do not receive the first touch driving signal, and the third touch electrode receives the second touch driving signal.

The driving method of a display device according to embodiments of the present disclosure may further include a second touch sensing operation in which the touch circuit generates sensing data based on the second sensing value for the third touch electrode and a third sensing value for a fifth touch electrode.

The driving method of a display device according to embodiments of the present disclosure may further include a second touch driving signal supply operation in which the first touch driving signal is supplied to the first touch electrode, the second touch electrode, the third touch electrode, and the fourth touch electrode.

In the second touch driving signal supply operation, a load-free driving signal identical to the first touch driving signal may be supplied to a load-free driving electrode.

A phase of the first touch driving signal may be in an inverse phase relationship with a phase of the second touch driving signal.

Embodiments of the present disclosure may provide a display device including a first touch electrode configured to be supplied with a first touch driving signal, a second touch electrode positioned apart from the first touch electrode in a first direction, a third touch electrode positioned apart from the first touch electrode in a second direction, and a fourth touch electrode that is configured to be supplied with a second touch driving signal different from the first touch driving signal, is positioned apart from the second touch electrode in the second direction, and is positioned apart from the third touch electrode in the first direction, and a touch circuit configured to generate sensing data based on a difference value between a first sensing value for the second touch electrode and a second sensing value for the third touch electrode.

Each of the first sensing value and the second sensing value may change if an ambient temperature of the display device changes.

If the ambient temperature of the display device changes, the difference value may not change or may change by less than a specific amount of change.

The display device according to embodiments of the present disclosure may further include a fifth touch electrode positioned apart from the fourth touch electrode in the second direction. The touch circuit may generate the sensing data based on the difference value between the first sensing value and the second sensing value in a first touch sensing period, and the touch circuit may generate the sensing data based on the second sensing value for the third touch electrode and a third sensing value for the fifth touch electrode in a second touch sensing period different from the first touch sensing period.

The touch circuit may include a first differential amplifier generating the sensing data, and a first multiplexer electrically connected to the first differential amplifier. The first multiplexer may include a first input terminal electrically connected to the second touch electrode, a second input terminal electrically connected to the third touch electrode, a third input terminal electrically connected to a fifth touch electrode, a first output terminal electrically connected to the first differential amplifier, and a second output terminal electrically connected to the first differential amplifier.

A period during which the first multiplexer operates may include a first period for electrically connecting the first input terminal to the first output terminal and electrically connecting the second input terminal to the second output terminal, and a second period for electrically connecting the second input terminal to the first output terminal and electrically connecting the third input terminal to the second output terminal.

The touch circuit may further include a second multiplexer. The second multiplexer may include a fourth input terminal electrically connected to the fifth touch electrode, a fifth input terminal electrically connected to the third touch electrode, a sixth input terminal in a floating state, a third output terminal electrically connected to a second differential amplifier different from the first differential amplifier, and a fourth output terminal electrically connected to the second differential amplifier.

A phase of the first touch driving signal may be in an inverse phase relationship to a phase of the second touch driving signal.

A period during which the touch circuit operates may include a first touch driving period in which the first touch driving signal is supplied to the first touch electrode and the second touch driving signal is supplied to the fourth touch electrode, a second touch driving period in which the first touch driving signal is supplied to the first touch electrode, the second touch electrode, the third touch electrode, and the fourth touch electrode, and a third touch driving period in which the first touch driving signal is supplied to the second touch electrode and the second touch driving signal is supplied to the third touch electrode.

The period during which the touch circuit operates may further include a first display period between the first touch driving period and the second touch driving period.

The display device according to embodiments of the present disclosure may further include a substrate, a light emitting device disposed on the substrate, a row line arranged on the light emitting device, and an insulating layer arranged on the second touch electrode. The first to fourth touch electrodes may be disposed within the same metal layer as the row line.

The insulating layer may include an organic material having a dielectric constant that changes according to a change in an ambient temperature.

The display device according to embodiments of the present disclosure may further include a driver disposed between the substrate and the light emitting device, and electrically connected to the row line.

Embodiments of the present disclosure may provide a display device including a first touch electrode configured to receive a first touch driving signal in a first touch driving period and a second touch driving period different from the first touch driving period, a second touch electrode configured to not receive the first touch driving signal in the first touch driving period, and configured to receive the first touch driving signal in the second touch driving period, a third touch electrode configured to not receive the first touch driving signal in the first touch driving period, and configured to receive the first touch driving signal in the second touch driving period, and a fourth touch electrode configured to receive a second touch driving signal in the first touch driving period, and configured to receive the first touch driving signal in the second touch driving period.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present invention. The above description and the accompanying drawings provide an example of the technical idea of the present invention for illustrative purposes only. That is, the disclosed embodiments are intended to illustrate the scope of the technical idea of the present invention. The scope of protection of the present disclosure should be construed based on the following claims, and all technical features within the scope of equivalents thereof should be construed as being included within the scope of the present disclosure.

What is claimed is:

1. A driving method of a display device, comprising:

a first touch driving signal supply operation in which a first touch electrode receives a first touch driving signal, a second touch electrode and a third touch electrode do not receive the first touch driving signal, and a fourth touch electrode receives a second touch driving signal different from the first touch driving signal; and a first touch sensing operation in which a touch circuit generates sensing data based on a difference value between a first sensing value for the second touch electrode and a second sensing value for the third touch electrode.

2. The driving method of claim 1, further comprising a second touch driving signal supply operation in which the second touch electrode receives the first touch driving signal, the first and fourth touch electrodes do not receive the first touch driving signal, and the third touch electrode receives the second touch driving signal.

3. The driving method of claim 1, further comprising a second touch sensing operation in which the touch circuit generates sensing data based on the second sensing value for the third touch electrode and a third sensing value for a fifth touch electrode.

4. The driving method of claim 1, further comprising a second touch driving signal supply operation in which the first touch driving signal is supplied to the first touch electrode, the second touch electrode, the third touch electrode, and the fourth touch electrode.

5. The driving method of claim 4, wherein, in the second touch driving signal supply operation, a load-free driving signal identical to the first touch driving signal is supplied to a load-free driving electrode.

6. The driving method of claim 1, wherein a phase of the first touch driving signal is in an inverse phase relationship with a phase of the second touch driving signal.

7. A display device, comprising:

a first touch electrode configured to be supplied with a first touch driving signal;

a second touch electrode positioned apart from the first touch electrode in a first direction;

a third touch electrode positioned apart from the first touch electrode in a second direction; and a fourth touch electrode that is configured to be supplied with a second touch driving signal different from the first touch driving signal, is positioned apart from the second touch electrode in the second direction, and is positioned apart from the third touch electrode in the first direction; and a touch circuit configured to generate sensing data based on a difference value between a first sensing value for the second touch electrode and a second sensing value for the third touch electrode.

8. The display device of claim 7, wherein each of the first sensing value and the second sensing value changes if an ambient temperature of the display device changes.

9. The display device of claim 8, wherein, if the ambient temperature of the display device changes, the difference value does not change or changes by less than a specific amount of change.

10. The display device of claim 7, further comprising a fifth touch electrode positioned apart from the fourth touch electrode in the second direction, wherein the touch circuit is configured to generate the sensing data based on the difference value between the first sensing value and the second sensing value in a first touch sensing period, wherein the touch circuit is configured to generate the sensing data based on the second sensing value for the third touch electrode and a third sensing value for the fifth touch electrode in a second touch sensing period different from the first touch sensing period.

11. The display device of claim 7, wherein the touch circuit includes:

a first differential amplifier for generating the sensing data; and a first multiplexer electrically connected to the first differential amplifier, wherein the first multiplexer includes:

a first input terminal electrically connected to the second touch electrode;

a second input terminal electrically connected to the third touch electrode;

a third input terminal electrically connected to a fifth touch electrode;

a first output terminal electrically connected to the first differential amplifier; and a second output terminal electrically connected to the first differential amplifier.

12. The display device of claim 11, wherein a period during which the first multiplexer operates includes:

a first period for electrically connecting the first input terminal to the first output terminal and electrically connecting the second input terminal to the second output terminal; and a second period for electrically connecting the second input terminal to the first output terminal and electrically connecting the third input terminal to the second output terminal.

13. The display device of claim 11, wherein the touch circuit further includes a second multiplexer, wherein the second multiplexer includes:

a fourth input terminal electrically connected to the fifth touch electrode;

a fifth input terminal electrically connected to the third touch electrode;

a sixth input terminal in a floating state;

a third output terminal electrically connected to a second differential amplifier different from the first differential amplifier; and a fourth output terminal electrically connected to the second differential amplifier.

14. The display device of claim 7, wherein a phase of the first touch driving signal is in an inverse phase relationship to a phase of the second touch driving signal.

15. The display device of claim 7, wherein a period during which the touch circuit operates includes:

a first touch driving period in which the first touch driving signal is supplied to the first touch electrode and the second touch driving signal is supplied to the fourth touch electrode;

a second touch driving period in which the first touch driving signal is supplied to the first touch electrode, the second touch electrode, the third touch electrode, and the fourth touch electrode; and a third touch driving period in which the first touch driving signal is supplied to the second touch electrode and the second touch driving signal is supplied to the third touch electrode.

16. The display device of claim 15, wherein the period during which the touch circuit operates further includes a first display period between the first touch driving period and the second touch driving period.

17. The display device of claim 7, further comprising:
- a substrate;
- a light emitting device disposed on the substrate;
- a row line arranged on the light emitting device; and
- an insulating layer arranged on the second touch electrode,
- wherein the first to fourth touch electrodes are disposed within a same metal layer as the row line.

18. The display device of claim 17, wherein the insulating layer includes an organic material having a dielectric constant that changes according to a change in an ambient temperature.

19. The display device of claim 17, further comprising a driver disposed between the substrate and the light emitting device, and electrically connected to the row line.

20. A display device, comprising:
- a first touch electrode configured to receive a first touch driving signal in a first touch driving period and a second touch driving period different from the first touch driving period;
- a second touch electrode configured to not receive the first touch driving signal in the first touch driving period, and configured to receive the first touch driving signal in the second touch driving period;
- a third touch electrode configured to not receive the first touch driving signal in the first touch driving period, and configured to receive the first touch driving signal in the second touch driving period; and
- a fourth touch electrode configured to receive a second touch driving signal in the first touch driving period, and configured to receive the first touch driving signal in the second touch driving period.

* * * * *